United States Patent
Raviv et al.

(10) Patent No.: US 10,795,801 B2
(45) Date of Patent: Oct. 6, 2020

(54) TIME TRAVEL SOURCE CODE DEBUGGER INCORPORATING ASYNCHRONOUS COLLABORATION

(71) Applicant: CODEVALUE D.T. LTD., Herzelia (IL)

(72) Inventors: Omer Raviv, Givatayim (IL); Alon Mordechai Fliess, Binyamina (IL)

(73) Assignee: OZCODE LTD, Herzelia (IL)

( * ) Notice: Subject to any disclaimer, the term of this patent is extended or adjusted under 35 U.S.C. 154(b) by 0 days.

(21) Appl. No.: 16/240,978

(22) Filed: Jan. 7, 2019

(65) Prior Publication Data
US 2019/0227910 A1 Jul. 25, 2019

Related U.S. Application Data

(60) Provisional application No. 62/614,576, filed on Jan. 8, 2018, provisional application No. 62/614,579, filed
(Continued)

(51) Int. Cl.
*G06F 9/44* (2018.01)
*G06F 9/45* (2006.01)
(Continued)

(52) U.S. Cl.
CPC ........ *G06F 11/3624* (2013.01); *G06F 3/0482* (2013.01); *G06F 8/33* (2013.01);
(Continued)

(58) Field of Classification Search
CPC .. G06F 11/3624; G06F 16/901; G06F 3/0482; G06F 8/33; G06F 8/41;
(Continued)

(56) References Cited

U.S. PATENT DOCUMENTS

| 8,050,903 B1 | 11/2011 | Bosshart et al. |
| 8,271,995 B1 | 9/2012 | Papakipos |

(Continued)

OTHER PUBLICATIONS

Microsoft, C++ Debugging and Diagnostics, 2017, pages https://devblogs.microsoft.com/cppblog/c-debugging-and-diagnostics/ (Year: 2017).*

(Continued)

*Primary Examiner* — Mongbao Nguyen
(74) *Attorney, Agent, or Firm* — Zaretsky Group PC; Howard Zaretsky

(57) ABSTRACT

A novel and useful system and method of time traveling source code debugging including several advanced capabilities that significantly improve the source code debugging process. Upon hitting a breakpoint or opening a dump file, the debugger travels to the future which can be altered by a user by modifying code on the fly (live coding) and receiving immediate feedback to validate bug fixes. Visual annotations including values of variables and expressions are provided as a heads up display effectively flattening time and space. A pivoting capability allows a user to switch the execution context of the code at any time. Point in time links that store the state of the debugging session can be created and activated. An asynchronous collaboration and messaging system enables multiple participants to share a debugging session. An optional redaction capability is also provided for obscuring or replacing sensitive private information.

20 Claims, 48 Drawing Sheets

Related U.S. Application Data on Jan. 8, 2018, provisional application No. 62/614,581, filed on Jan. 8, 2018, provisional application No. 62/614,582, filed on Jan. 8, 2018.

(51) Int. Cl.

| | |
|---|---|
| *G06F 9/455* | (2018.01) |
| *G06F 11/36* | (2006.01) |
| *G06F 21/62* | (2013.01) |
| *G06F 21/60* | (2013.01) |
| *G06F 30/20* | (2020.01) |
| *G06F 40/169* | (2020.01) |
| *G06F 3/0482* | (2013.01) |
| *G06F 16/901* | (2019.01) |
| *G06F 11/07* | (2006.01) |
| *H04L 12/58* | (2006.01) |
| *G06F 8/33* | (2018.01) |
| *G06F 8/41* | (2018.01) |
| *G06F 8/53* | (2018.01) |

(52) U.S. Cl.
CPC .............. *G06F 8/41* (2013.01); *G06F 9/4552* (2013.01); *G06F 11/0706* (2013.01); *G06F 11/0778* (2013.01); *G06F 11/362* (2013.01); *G06F 11/364* (2013.01); *G06F 11/3644* (2013.01); *G06F 11/3664* (2013.01); *G06F 16/901* (2019.01); *G06F 21/604* (2013.01); *G06F 21/6254* (2013.01); *G06F 30/20* (2020.01); *G06F 40/169* (2020.01); *H04L 51/02* (2013.01); *H04L 51/046* (2013.01); *G06F 8/53* (2013.01); *G06F 21/6245* (2013.01)

(58) Field of Classification Search
CPC .............. G06F 9/4552; G06F 11/0706; G06F 11/0778; G06F 11/364; G06F 11/3644; G06F 17/241; G06F 17/5009; G06F 21/604; G06F 21/6254; G06F 8/53; G06F 21/6245; H04L 51/02; H04L 51/046
See application file for complete search history.

(56) References Cited

U.S. PATENT DOCUMENTS

| | | | |
|---|---|---|---|
| 9,170,922 B1* | 10/2015 | Lachwani | G06F 11/3636 |
| 9,875,173 B2 | 1/2018 | Marron | |
| 9,898,385 B1* | 2/2018 | O'Dowd | G06F 11/3636 |
| 9,940,369 B1 | 4/2018 | Mola | |
| 9,957,194 B2 | 5/2018 | Soubeyrand et al. | |
| 9,959,194 B1 | 5/2018 | Mola | |
| 9,965,376 B1 | 5/2018 | Mola | |
| 10,459,824 B2 | 10/2019 | Mola | |
| 2002/0087950 A1* | 7/2002 | Brodeur | G06F 11/3636 717/124 |
| 2009/0307528 A1 | 12/2009 | Byers et al. | |
| 2012/0117541 A1* | 5/2012 | Bates | G06F 11/362 717/125 |
| 2013/0326497 A1 | 12/2013 | Boxall et al. | |
| 2014/0068568 A1 | 3/2014 | Wisnovsky | |
| 2014/0359573 A1 | 12/2014 | Ajith Kumar et al. | |
| 2015/0074392 A1* | 3/2015 | Boivie | G06F 21/602 713/164 |
| 2015/0143344 A1* | 5/2015 | Davis | G06F 8/751 717/129 |
| 2015/0161397 A1 | 6/2015 | Cook et al. | |
| 2015/0378870 A1 | 12/2015 | Marron | |
| 2016/0291942 A1 | 10/2016 | Hutchison | |
| 2016/0292061 A1* | 10/2016 | Marron | G06F 11/3636 |
| 2017/0206363 A1* | 7/2017 | Zhang | G06F 9/4843 |
| 2017/0353744 A1* | 12/2017 | Kunisetty | H04N 21/26616 |
| 2018/0024911 A1* | 1/2018 | Kruszewski | G06F 8/41 717/125 |
| 2018/0032320 A1 | 2/2018 | Aldea Lopez | |
| 2018/0060213 A1 | 3/2018 | Mola | |
| 2018/0060215 A1* | 3/2018 | Mola | G06F 11/3636 |
| 2018/0173612 A1 | 6/2018 | Law et al. | |
| 2018/0260302 A1 | 9/2018 | Mola | |
| 2018/0260306 A1 | 9/2018 | Carey | |
| 2018/0300197 A1* | 10/2018 | Marron | G06F 11/3628 |
| 2018/0365125 A1 | 12/2018 | Mola | |
| 2019/0042396 A1 | 2/2019 | Mola | |
| 2019/0065346 A1 | 2/2019 | Krauss | |
| 2019/0065347 A1 | 2/2019 | Mola | |
| 2019/0278694 A1* | 9/2019 | Tucker | G06F 11/3624 |
| 2019/0340103 A1 | 11/2019 | Nelson et al. | |
| 2019/0369849 A1 | 12/2019 | Gonzalez et al. | |
| 2020/0183669 A1 | 6/2020 | Mola | |

OTHER PUBLICATIONS

Philip J. Guo, Codechella: Multi-User Program Visualizations for Real-Time Tutoring and Collaborative Learning, 2015, pp. 1-9. https://roc-hci.com/wp-content/uploads/Codechella-multiuser-program-visualizations_VLHCC-2015.pdf (Year: 2015).*

A. Miraglia et al., "Peeking into the Past: Efficient Checkpoint-assisted Time-traveling Debugging", 2016, pp. 455-464.

J. Robbins, "Debugging Application .NET Windows", 2003, pp. 148-710.

Y.P. Cheng et al., "Toward Arbitrary Mapping for Debugging Visualizations", 2016 IEEE/ACM 38th IEEE Int Conf on Software Engineering Companion, 2016, pp. 605-608.

Kraemer et al, "How Live Coding Affects Developers' Coding Behavior", 2014, IEEE Symposium on Visual Languages and Human-Centric Computing (VL/HCC), pp. 5-8.

Barr et al, "Time-Travel Debugging forJavaScript/Node.js", 2016, pp. 1003-1006.

Grossman et al, "Efficient Checkpointing of Multi-Threaded Applications as a Tool for Debugging, Performance Tuning, and Resiliency", 2016, IEEE International Parallel and Distributed Processing Symposium, pp. 232-241.

Yung-Pin Cheng, Toward Arbitrary Mapping for Debugging Visualizations, 2016, pp. 605-608.

* cited by examiner

```
foreach (var customer in customers)
{
    switch (customer.ClubMembershipType)
    {
        case ClubMembershipTypes.Premium:
            if (customer.MembershipLevel == "A+")
            {
                SendGift(customer);
            }
            else
            {
                SendThankYouLetter(customer.GetEmailAddress());
            }
            break;
        case ClubMembershipTypes.Platinum:
            SendGift(customer);
            break;
    }
}
```

FIG. 7

```
Hook.LogEnterLoop(1);
foreach (var customer in customers)
{
    Hook.LogBeginNewIteration(2, customer);
    switch (Hook.LogValue(3, customer.ClubMembershipType))
    {
        case ClubMembershipTypes.Premium:
            Hook.LogEnterBranch(4);
            if (Hook.LogValue(5,customer.MembershipLevel) == "A+")
            {
                Hook.LogEnterBranch(6);
                SendGift(customer);
            }
            else
            {
                Hook.LogEnterBranch(7);
                SendThankYouLetter(Hook.LogValue(8,customer.GetEmailAddress()));
            }
            break;
        case ClubMembershipTypes.Platinum:
            Hook.LogEnterBranch(9);
            SendGift(customer);
            break;
    }
}
```

FIG. 8

```
                        FirstName: "Louise"
        ┌─────────────────────────────────┐
        foreach (var customer in customers) (1/30)
632 ────┤                                            ┌─── 630
        {                  Platinum
            switch (customer.ClubMembershipType)
            {
                case ClubMembershipTypes.Premium: (15)
                    if (customer.MembershipLevel == "A+") (7)
                    {
                        SendGift(customer);
                    }
                    else (8)
                    {
                        SendThankYouLetter(customer.GetEmailAddress());
                    }
                    break;
                case ClubMembershipTypes.Platinum: (12)
                                     FirstName: "Louise"
                    SendGift(    customer    );
                    break;
            }
        }
```

```
                        FirstName "Erik"
foreach (var customer in customers)
{
                 Premium
    switch (customer.ClubMembershipType)
    {
        case ClubMembershipTypes.Premium:
                                                        645
            if (customer.MembershipLevel == "A")
            {
                SendGift(customer);
            }
            else
            {
                                  "ErikASalinas@spambob.com"  646
                SendThankYouLetter(customer.GetEmailAddress());
            }
            break;
     ▷| case ClubMembershipTypes.Platinum:
            SendGift(customer);                  644
            break;
    }
}
```

|   |   |
|---|---|
| [0] | FirstName "Louise" |
| [1] | FirstName "Shirley" |
| [4] | FirstName "Roberta" |
| [7] | FirstName "Martha" |
| [10] | FirstName "Maria" |
| [11] | FirstName "Lisha" |
| [12] | FirstName "Geraldine" |
| [16] | FirstName "Joyce" |
| [19] | FirstName "Carla" |
| [25] | FirstName "Tamie" |
| [26] | FirstName "Edith" |
| [29] | FirstName "Dawn" |

Search

```
private static int GetOrderPrice(Order order)
{
    Debugger.Break();

int totalPrice = order.GetRetailPrice();

if (order.IncludesFreeShipping == false)
    {
        totalPrice = totalPrice + order.ShippingCost;
                         totalPrice ?
                                        ～590
    } return totalPrice;
}
```

INSTRUCTION POINTER

FIG. 19

```
private static int GetOrderPrice(Order order)
{
    Debugger.Break();  < 1ms elapsed int totalPrice = order.GetRetailPrice();

if (order.IncludesFreeShipping == false)
    {
    ▷   totalPrice = totalPrice + order.ShippingCost;
    }                  totalPrice  ▸  35
                       Search
    return totalPrice;
}                                              ～592
```

FIG. 20

```
private static int GetOrderPrice(Order order)
{
    Debugger.Break();  < 1ms elapsed int totalPrice = order.GetRetailPrice();

if (order.IncludesFreeShipping == false)
    {
        totalPrice = totalPrice + order.ShippingCost;
    }       totalPrice  ▸  50
                                        ～594
    return  Search
}
```

FIG. 21

```
static void Main(string[] args)
{
    int x = 10;      //point 1
    int y = 20;      //point 2
    int z = x + y;   //point 3
    x = 2 * y;       //point 4
    y = 2 * x;       //point 5

Console.WriteLine(x + y);
}
```

```
                                    ID: 15        Louise Midgett
void UpdateOrderForCustomer(Order order, Customer customer)
{  < 1ms elapsed
    Log($"Started sending order {order.ID}");

UpdateShippingCost(order, customer);
    UpdateVAT(order, customer);
    ProcessBilling(order);
    SendOrder(order, customer);

Log($"Finished sending order {order.ID}");
}
```

```
private static void SendGiftsToCustomers()
{
    foreach (var customer in GetPrizeWinners(prizesToGive: 10))
    {
        SendGift(customer);
    }
}
```

FIG. 32

```
private static void SendGiftsToCustomers()
{                                FullName: "Louise Midgett"
    foreach (var customer in GetPrizeWinners(prizesToGive: 10)) 10/10
    {              FullName: "Louise Midgett"
        SendGift(    customer    );
    }
}
```

```
                            FullName: "Louise Midgett"
private static int SendGift( Customer customer )
{
    Debugger.Break();
                      290
    int totalPrice = GetDiscountPrice();
    int shippingCost;
                    "21"                    21
    if (int.TryParse(GetShippingCostFromConfig(), out shippingCost))
    {
                       271
        totalPrice = totalPrice + shippingCost;
    }
                                  288
    return totalPrice + GetExtraFreebiesCost(customer);
}
```

FIG. 33

FIG. 56
FIG. 57

```
namespace ProductionDebuggingDemo
{
    [SensitiveDebuggingInformation]
    3 references
    class Person
    {
        [SensitiveDebuggingInformation(SensitiveType.FirstName)]
        1 reference
        public string FirstName { get; set; }

[SensitiveDebuggingInformation(SensitiveType.LastName)]
        1 reference
        public string LastName { get; set; }

[SensitiveDebuggingInformation(SensitiveType.Number, MinValue=1, MaxValue=120)]
        1 reference
        public int Age { get; set; }
        2 references
        public string NationalInsuranceNumber { get; set; }

[SensitiveDebuggingInformation(SensitiveDebuggingInformation.Ignore)]
        1 reference
        public Gender Gender { get; set; }
    }
}
```

FIG. 61

```
{
    "TyprName": "FirstName",
    "Value": [
        "James",
        "David",
        "Christopher",
        "George",
        "Ronald",
        "John"
    ]
}
```

FIG. 62

```
private static void AddAnEmployee(Person person)
{
    if (!IsValid(person.NationalInsuranceNumber))
    ...
}
```

FIG. 63

```
public static class CustomGenerator
{
    [SensitiveDebuggingInformationValueGenerator(SensitiveType.NationalInsuranceNumber)]
    public static IEnumerable<string> Generate()
    {
        for (int i = 0; i < 999999; ++i)
        {
            foreach (var letter in "ABCD")
            {
                foreach (var prefix in new []{"AA", "AB", "AE", "BA"})
                {
                    yield return prefix + $"{i:000000}" + letter;
                }
            }
        }
    }
}
```

FIG. 64

```
           1 reference                              Pro...
           static void EducateYoungEmployee(Person p)
100 ─────  {
           ✓ if (p.Age < 44)
                Educate();   <1ms elapsed
           }
```

FIG. 66

```
           1 reference                              Pro...
           static void EducateYoungEmployee(Person p)
           {
104 ─────              54        44
102 ─────  ✘ if ( p.Age  <   44 )
                Educate();
           } <1ms elapsed
```

FIG. 67

```
static int Algorithm(string data)
{
    int s = 0;
    for (int i = 0; i < 10; ++i)
    {
        if (data.Contains("s"))
        {
            s += i > 5 ? i * 2 : i * data.Length;
        }
        else
        {
            s += 1;
        }
    } return s;
}
```

FIG. 68

```
static (int, string) InstrumentedAlgorithm(string data)
{
    string _trace = "";
    int s = 0;
    for (int i = 0; i < 10; ++i)
    {
        _trace += "1";
        if (data.Contains("s"))
        {
            _trace += "2";
            if (i > 5)
            {
                _trace += "3";
                s += i * 2;
            }
            else
            {
                _trace += "4";
                s += i * data.Length;
            }
        }
        else
        {
            _trace += "5";
            s += 1;
        }
    }
    return (s, _trace);
}
```

FIG. 69

```
static void Main(string[] args)
{
    var s1 = "second";
    var s2 = "hour";
    var s3 = "moscow";

Algorithm(s1);

var (result1, trace1) = InstrumentedAlgorithm(s1);
    Console.WriteLine($"Source: {s1}\t Result: {result1},\t trace: {trace1}");

var (result2, trace2) = InstrumentedAlgorithm(s2);
    Console.WriteLine($"Source: {s2}\t Result: {result2},\t trace: {trace2}");

var (result3, trace3) = InstrumentedAlgorithm(s3);
    Console.WriteLine($"Source: {s3}\t Result: {result3},\t trace: {trace3}");

if (trace1 == trace2)
    {
        Console.WriteLine($"{s2} is a good replacement of {s1}.");
    }
    if (trace1 == trace3)
    {
        Console.WriteLine($"{s3} is a good replacement of {s1}.");
    }
}
```

FIG. 70

```
290 ┌─Source: second    Results: 150,   trace: 124124124124124124123123123123
292 ├─Source: hour      Results: 10,    trace: 15151515151515151515
294 └─Source: moscow    Results: 150,   trace: 124124124124124124123123123123
     moscow is a good replacement for second.
     Press any key to continue . . .
```

Customer Content Request Form

Choose the sensitive information correlation id, to generate a user content request.
*Required Email address* —132
John@company.com Customer name —134
John Smith Support request number —136
12345

Correlation Id* —138
Personal Information ▽

Sender name —140
The Company Support team

SUBMIT

FIG. 74

TIME TRAVEL SOURCE CODE DEBUGGER INCORPORATING ASYNCHRONOUS COLLABORATION

REFERENCE TO PRIORITY APPLICATIONS

This application claims the benefit of U.S. Provisional Application No. 62/614,576, filed Jan. 8, 2018, entitled "Software Debugging Tool And Advanced Development Environment," U.S. Provisional Application No. 62/614,579, filed Jan. 8, 2018, entitled "System And Method Of Redaction Of Sensitive Information In Production Debugging While Preserving Code Execution Flow," U.S. Provisional Application No. 62/614,581, filed Jan. 8, 2018, entitled "System And Method Of Asynchronous Collaborative Software Debugging," U.S. Provisional Application No. 62/614,582, filed Jan. 8, 2018, entitled "Collaborative Time Travel Software Debugger With Future Prediction," all of which are incorporated herein by reference in their entirety.

FIELD OF THE DISCLOSURE

The subject matter disclosed herein relates to the field of software debugging and more particularly relates to a time travel source code debugger incorporating asynchronous collaboration and messaging.

BACKGROUND OF THE INVENTION

A software bug is an error, flaw, failure or fault in a computer program or system that causes it to produce an incorrect or unexpected result, or to behave in unintended ways. The process of fixing bugs is termed "debugging", and usually takes place during the process of the software development or during quality assurance (QA). Debugging in an extremely challenging activity. Developers are forced to set breakpoints at specific points of interest, and then step over, step into, or continue execution to other points of interest. At each particular point, the developer may inspect the state of the program at that particular moment in time at a specific instruction but cannot get an understanding of the flow of execution over time. There are cases where bugs are discovered only after the product is shipped and used by the end users. The main reason for these bugs that appear only in the production environment is the use of real user scenarios with real user data. Production debugging is about solving customer-facing issues that are not easily reproducible in development or testing environments.

As software and electronic systems have become generally more complex, the various common debugging techniques have expanded with more methods to detect anomalies, assess impact, and schedule software patches or full updates to a system. The process of debugging ranges in complexity from fixing simple errors to performing lengthy and tiresome tasks of data collection, analysis, and scheduling updates. The debugging skill of the programmer can be a major factor in the ability to debug a problem, but the difficulty of software debugging varies greatly with the complexity of the system, and also depends, to some extent, on the programming languages used and the available tools, such as debuggers. A debugger is a software tool which enables the programmer to monitor the execution of a program, stop it, restart it, set breakpoints, and change values in memory. The term debuggee refers to a process or application upon which a debugger acts, i.e. the process that is being debugged.

Generally, high-level programming languages, such as Java, make debugging easier, because they have features such as exception handling and type checking that make real sources of erratic behavior easier to spot. In programming languages such as C or assembly, bugs may cause silent problems such as memory corruption, and it is often difficult to see where the initial problem happened. In those cases, memory debugger tools may be needed.

In certain situations, general purpose software tools that are language specific in nature can be very useful. These take the form of static code analysis tools. These tools look for a very specific set of known problems, some common and some rare, within the source code. concentrating more on the semantics (e.g., data flow) rather than the syntax, as compilers and interpreters do.

Normally the first step in debugging is to attempt to reproduce the problem. This can be a non-trivial task, for example as with parallel processes or some unusual software bugs. Also, specific user environment and usage history can make it difficult to reproduce the problem.

A programmer can use a debugger tool to examine program states (values of variables, plus the call stack of each execution thread) and track down the origin of the problem. Alternatively, tracing can be used. In simple cases, tracing is just a few print statements, which output the values of variables at certain points of program execution.

Development of dedicated software using a development platform such as Visual Studio is a complex task requiring many different skills and abilities. An integral part of the process is troubleshooting and fault detection, i.e. finding bugs in software code. This process is complex and tedious, and time consuming, reaching up to 50% of the time spent locating, identifying, understanding and fixing bugs in software code.

The current debugging process using current debugging tools is complex and challenging, requiring the developer to perform actions including freezing the program at a particular moment in time, performing a manual and slow transition between lines of code (i.e. stepping) and following the information that flows through to execution. Due to the complexity of the process, the programmer typically has trouble finding bugs created by themselves or by others without affecting the operation of the code. While debugging, source code writing ceases, since it requires a lot of attention from the developer. This dramatically slows down the entire development process and typically affects other parts of the code. In addition, the debugging process may require fixing other areas in the code. This may lead to regressions and more bugs in the code that must be fixed or code that is dependent on the code that is being fixed.

Usually a debugger displays information of the current execution context. Some debuggers provide information about the historical execution of the code, i.e. the events that occurred before the current point of execution. These debuggers, however, have several severe limitations. While allowing replay of a program's execution, they incur significant performance impact during the program's runtime execution since they require either instrumentation of every line of code, or deterministic "record and replay" enabled by taking snapshots at regular intervals and recording all nondeterministic inputs. Additionally, current debuggers are only able to go back in time to prove or disprove a hypothesis on what caused a particular software fault. Moreover, they can only provide information about the past and show a single code execution starting from the initial line of code they started recording to the current execution stop point. No mechanism exists to go back and take another turn, hence they cannot be used to determine whether a particular code change would solve the issue at hand.

Current debugging processes are wasteful of time. Manually debugging even a few lines of code is a process which takes time and reduces the productivity of the developer. Errors are introduced in the debugging process in identifying bugs due to human factors, mostly revolving around error in drawing conclusions (e.g., cognitive bias, failure to separate between facts and interpretations, etc.). Without an understanding of root cause of a software failure, the bug patch may (1) fix the wrong problem, be performed clumsily, and (3) inject incorrect lines of code.

Fixing a bug by modifying a few lines of code may affect the entire application. Therefore, a code change by a developer may affect the entire application and result in the creation of bugs elsewhere in the code. This problem stems from use of a debugging tool that currently only offers the programmer the ability to examine information in the program by stopping the program at a given point in time using breakpoints. Currently, there is no way to examine changes in information over time. Detection and correction of bugs carried out by the developer requires the development process to stop leading to a standstill in the development process.

The debugging process is achieved by running the software, recreating the bug, freezing execution of the program at a certain point in time (i.e. breakpoint), and then single stepping through the code line by line. Often, a programmer discovers they went too far in time and thus is forced to repeat the entire process from the beginning. This prolongs the time between making changes to the code and receiving feedback about the effects of the changes.

In addition, current debuggers lack the ability to support identifying functional programming bugs. Today, more and more developers use functional programming which emphasizes expression calculation using functions to simplify tasks, thus preferring functional programming over the old style programming. The C# programming language, for example, added functional abilities only in version 3.5 (2007). Developers today often sacrifice the readability of code along with the ability to easily maintain the code for the benefit of debuggability.

There is thus a need for an advanced debugger which is also able to debug functional code. The debugger should integrate well with the development process without affecting the code and be able to help identity and fix bugs in minimum time. This need is even more acute considering short development cycles imposed by software companies due to the need quickly release new products and upgrades to existing products.

A debugging process suitable for production code can be utilized in several ways. A developer can run a debugger on the production machine, or start a remote debugging session over a computer network. Running a debugger on production code is dangerous, and may introduce side effects to the currently running software, such as performance degradation, interruption of service, and data correctness issues. Another production debugging method is to take a memory dump from the production machine and transfer the dump file to the developer machine for further analysis. The latter approach is most common and has several advantages. The dump process has a minor performance impact on the running software, with no impact at all on data correctness and integrity. The dump capture process can be controlled, so the memory dump will hold evidence for the problem that needs to be solved. For example, taking a dump when the process throws a software exception or when a memory consumption reaches a certain level.

In modern production debugging, a fork of the running process can be accomplished by marking all the memory pages as "copy-on-write". This operation has negligible memory overhead, and can be performed extremely fast (typically <10 ms), thus its effect is completely transparent to the end user. The fork can then either be copied to a dump file on disk, or remotely debugged.

When taking a memory dump from a running software on a production machine, the dump holds a copy of the information that was in the running process memory, including personally identifiable information and sensitive information. This dump is often transferred to an unsecure developer machine and the developer uses it to inspect the code and find the bug.

A problem arises in that sensitive information will be exposed during the debug process. The problem is especially acute considering the European Union's General Data Protection Regulation (GDPR) which requires business that handle personal data to put into place strict data protection measures to safeguard and protect data including, for example, pseudonymization or full anonymization, such that the data does not become available publicly without explicit informed consent.

There is thus a need for a debugger that is able to operate in a production code environment while at the same time meet the stringent requirements of data protection and privacy regulations such as GDPR.

The debugging process is a cognitive task that requires a set of skills. Developers need to understand the software that is being debugged, the code they or their teammates have written, and the third party components and frameworks they are using. In software, as in other engineering tasks, there are many layers of abstractions, and many predefined building blocks. Developers use these building blocks to create their own solutions. The strength of the chain is the strength of the weakest link. Software stability is determined by the stability of each of the abstraction layers and building blocks. A bug can be found in the lower abstraction layer or in a reusable piece of software, but may only appear when this code is reused by other developers. To be successful at debugging, a deep understanding of the code and technologies being used is not enough; developers must apply the scientific method of experimentation in order to isolate the root cause of the issue. They need to change the code and see the effect on the running software, they need to imply tactics such as divide and conquer, to reduce the problem surface area and trap the bug to find the root cause of the problem. Developers need to create hypotheses about the problem and act to prove or to disprove their hypothesis.

Debugging is especially challenging for new developers lacking the skill of veteran developers and not yet fully educated about the technologies used. It would be useful to have a collaboration method and related tools to improve the debugging process. Having additional knowledgeable eyes see the problem and provide feedback can save time. Rookie developers can also get valuable advice allowing them to solve problems much faster. Collaborative debugging also serves as a way of doing ad-hoc mentoring.

Currently, collaborative debugging occurs in a very simple way, with two or more developers doing pair-programming and pair-debugging. Prior art tools exist that let a developer share their screen with another team member, and even have a shared debugging session between two workstations. These methods, however, require all participants to be available at the same time and debug together. This scenario is problematic to senior developers, team leaders, and software architects that are usually busy and cannot spend much time with rookie developers. Moreover, many teams work remotely from different geolocations in different time zones, thus making finding a time to do live collaboration difficult.

There is thus a need for a source code debugger that overcomes the disadvantages of prior art debuggers and can provide collaborative debugging among several participants without requiring all participants to be present at the same time.

SUMMARY OF THE INVENTION

The present invention is a time traveling source code debugger having several advanced capabilities that significantly improve the source code debugging process. Upon hitting a debug event such as breakpoint, exception or any other event that wakes the debugger, including opening a dump file, the debugger is able to travel to the future as well as the past. This allows developers to easily alter future execution results by modifying code on the fly and receiving immediate feedback in real time to validate potential bug fixes, i.e. live coding or live programming. The debugger also provides visual annotations of the code editing window in the form of a heads up display (HUD) that effectively flattens time and space to present the continuum of a method's execution through time.

The debugger provides several innovations including: (1) source code debugging that is able to predict future values of variables and expressions before code is executed by a user; (2) displaying useful information regarding future execution of the code in a heads up display (HUD) like manner; (3) providing a live coding experience whereby a user can modify the code on the fly and immediately see future predicted results of their changes; (4) providing a pivoting capability (i.e. creating pivot points) allowing a user to switch at any time the execution context of the code to any location in the code in any future or past context; (5) the creation and activation of point in time links that store the state of the debugging session, i.e. the time-space location that implies a specific state and context of the debugging session; (6) an asynchronous collaboration and messaging system enabling multiple participants to share a debugging session; and (7) a redaction capability for obscuring or replacing sensitive private information.

Collaboration can be used to share a debugging session across space and time. Utilizing a messaging service and point in time links, a debugging session can be shared asynchronously by multiple participants wherever they are located and whenever they want.

Sensitive private information originating in the production environment can be redacted while preserving the production debugging experience. In particular, the debugger provides for (1) obscuring sensitive information; (2) replacing sensitive information with meaningful fake information; or (3) requesting authorization to access sensitive personal information directly from the customer. The private data is obscured or replaced with fake data without effecting the execution of the code. Code execution analysis is performed to ensure that candidate replacement data will not affect the original code execution path. The invention can be used, for example, to protect the privacy and security of sensitive user information and personally identifiable information, and to adhere to the European Union's General Data Protection Regulation (GDPR).

This, additional, and/or other aspects and/or advantages of the embodiments of the present invention are set forth in the detailed description which follows; possibly inferable from the detailed description; and/or learnable by practice of the embodiments of the present invention.

There is thus provided in accordance with the invention, a method of asynchronous collaborative debugging of a debuggee application having source code associated therewith, the method comprising capturing both a dump file and a current debugging session state, generating and transmitting a collaboration request message to one or more participants of the debugging session, in response to the collaboration request message, obtaining the captured current debugging session state and utilizing it immediately for debugging while contemporaneously obtaining the captured dump file, once the dump file is obtained, rebuilding a memory delta buffer from the captured dump file, ceasing using the captured current debugging session state, and utilizing the captured dump file and rebuilt memory delta buffer for the debugging session, providing an asynchronous chat service for all participants of the debugging session, and generating and sharing one or more point in time links with participants in the debugging session, each point in time link indicating a specific location in the source code as well as execution context including a specific point in time in the execution of the source code.

There is also provided in accordance with the invention, a method of asynchronous collaborative debugging of a debuggee application having source code associated therewith, the method comprising generating and transmitting a share request to one or more participants of a debugging session, once the share request is accepted, downloading captured current debugging session state and utilizing it immediately for debugging while contemporaneously downloading a captured dump file, rebuilding a memory delta buffer from the captured dump file once obtained, ceasing using the captured current debugging session state, and utilizing the captured dump file and rebuilt memory delta buffer for the debugging session, providing an asynchronous chat service for all participants of the debugging session, and generating and sharing one or more point in time links with participants in the debugging session, each point in time link indicating a specific location in the source code as well as execution context including a specific point in time in the execution of the source code.

There is further provided in accordance with the invention, a method of asynchronous collaborative debugging of a debuggee application having source code associated therewith, the method comprising generating and transmitting a share request to one or more participants of a debugging session, once the share request is accepted, opening an additional view for the added participant in a cloud debugger, utilizing an existing current debugging session state and existing dump file already present on the cloud debugger in the additional view opened, providing an asynchronous chat service for all participants of the debugging session, and generating and sharing one or more point in time links with participants in the debugging session, each point in time link indicating a specific location in the source code as well as execution context including a specific point in time in the execution of the source code.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 7 is a diagram illustrating an example code fragment;

FIG. 8 is a diagram illustrating an example instrumented code fragment;

FIG. 11 is a diagram illustrating the first iteration of the loop;

FIG. 12 is a diagram illustrating the $14^{th}$ iteration of the loop;

FIG. 13 is a diagram illustrating HUD like visual annotations on the code display window;

FIG. 15 is a diagram illustrating an example pivot on an 'if' statement;

FIG. 16 is a diagram illustrating an example pivot on an 'else' statement;

FIG. 17 is a diagram illustrating example code with a grayed out segment;

FIG. 19 is a diagram illustrating an example conventional debugging experience;

FIG. 20 is a diagram illustrating an example debugging experience with the debugger of the present invention;

FIG. 21 is a diagram illustrating an example debugging experience displaying the value of an expression;

FIG. 32 is a diagram illustrating an example foreach loop;

FIG. 33 is a diagram illustrating the callee and caller method of the foreach loop;

FIG. 56 is a diagram illustrating an example email invitation to the debugging session;

FIG. 57 is a diagram illustrating a first example of source code annotated with debugging information;

FIG. 58 is a diagram illustrating an example of standard production debugger values;

FIG. 59 is a diagram illustrating an example of obscured production debugger values in accordance with the present invention;

FIG. 61 is a diagram illustrating a second example of source code annotated with debugging information;

FIG. 62 is a diagram illustrating an example table of replacement values;

FIG. 63 is a diagram illustrating an example of production debugger values replaced with fake values in accordance with the present invention;

FIG. 64 is a diagram illustrating example source code for a custom generator adapted to generate replacement values in accordance with the present invention;

FIG. 66 is a diagram illustrating example code that enters a function during normal production execution;

FIG. 67 is a diagram illustrating example code that fails to enter a function during debug execution because of the replacement value chosen;

FIG. 68 is a diagram illustrating an example original Algorithm function;

FIG. 69 is a diagram illustrating an example instrumentedAlgorithm function;

FIG. 70 is a diagram illustrating an example function that determines whether candidate fake replacement data effects the original execution path;

FIG. 71 is a diagram illustrating results of the function of FIG. 17;

FIG. 73 is a diagram illustrating a third example of source code annotated with debugging information;

FIG. 74 is a diagram illustrating an example consent request form;

DETAILED DESCRIPTION

Figure 1:
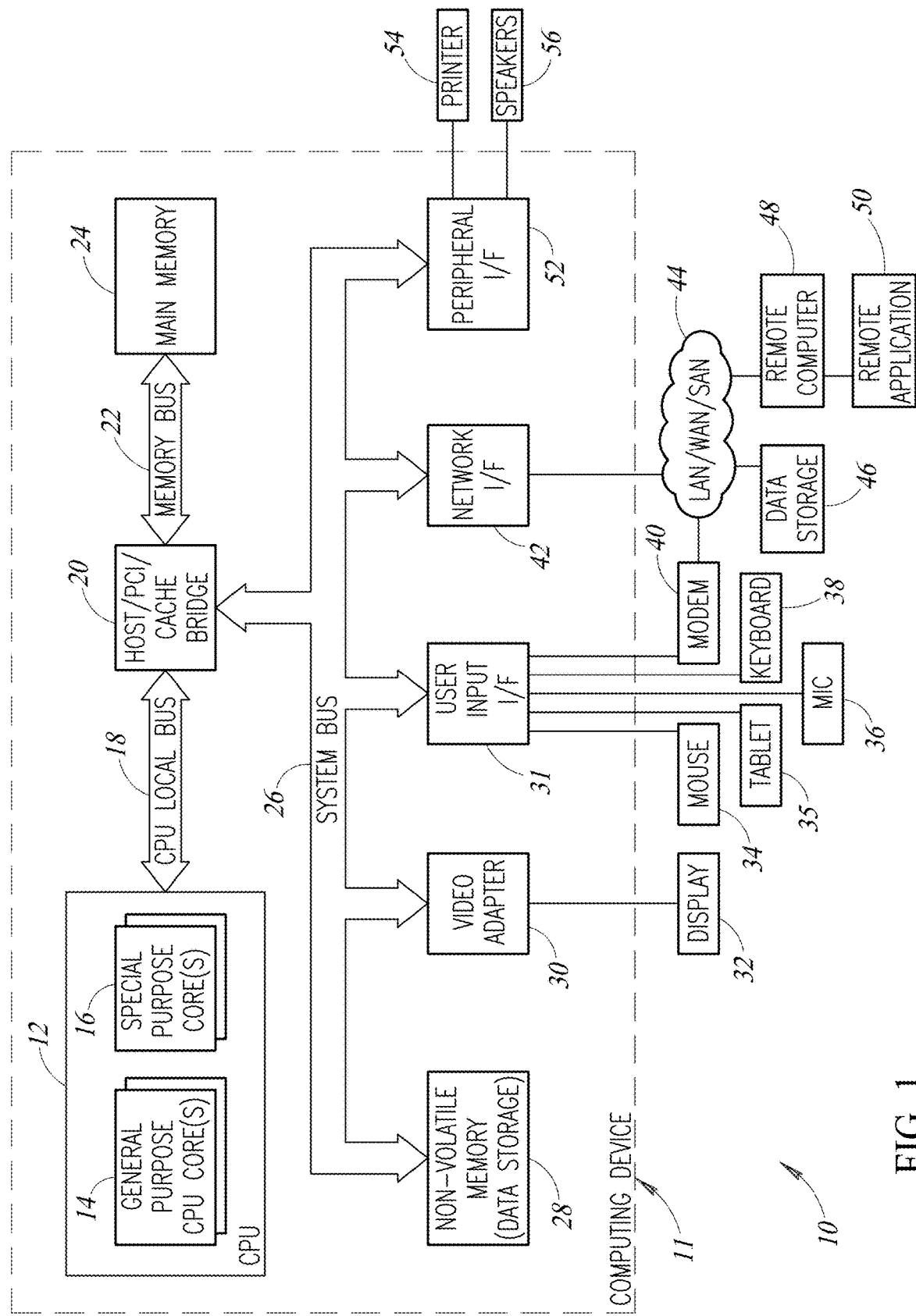
FIG. 1 is a block diagram illustrating an example computer processing system adapted to implement one or more portions of the present invention.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may be implemented using well known shared software components and methods known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object-oriented programming language such as Java, Smalltalk, C++, C# or the like, conventional procedural programming languages, such as the "C" programming language, and functional programming languages such as Prolog and Lisp, machine code, assembler or any other suitable programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network using any type of network protocol, including for example a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

In addition, the invention is operational in systems incorporating video and still cameras, sensors, etc. such as found in automated factories, autonomous vehicles, in mobile devices such as tablets and smartphones, smart meters installed in the power grid and control systems for robot networks. In general, any computation device that can host an agent can be used to implement the present invention.

A block diagram illustrating an example computer processing system adapted to implement one or more portions of the present invention is shown in FIG. 1. The exemplary computer processing system, generally referenced 10, for implementing the invention comprises a general-purpose computing device 11. Computing device 11 comprises central processing unit (CPU) 12, host/PIC/cache bridge 20 and main memory 24.

The CPU 12 comprises one or more general purpose CPU cores 14 and optionally one or more special purpose cores 16 (e.g., DSP core, floating point, GPU, and neural network optimized core). The one or more general purpose cores execute general purpose opcodes while the special purpose cores execute functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, non-volatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Time Travel Debugging

The following definitions apply throughout this document.

A network is defined as one or more data links that enable the transport of electronic data between computer systems and/or modules and/or other electronic devices. When information is transferred over a network or other communications connection, whether wired, wireless, or a combination thereof, to a computer.

A diagnostic operation is any operation responsive to information gathered from and/or related to the execution of instructions within computer architecture. Diagnostic operations include debugging operations, testing operations, profiling operations, benchmarking operations, checkpointing operations, roll back operations, comparison operations, etc.

An execution context is defined as data relevant to the execution of executable instructions, such as, for example, of a managed process. An execution context may include security context, call context, synchronization context, etc.

A virtual machine is a software implementation that models a computer system and executes or simulates programs like a computer system, such as, a Common Language Runtime (CLR) Java Runtime Environment (JRE), or Java Virtual Machine (JVM). A virtual machine may include a just in time (JIT) compiler that loads and compiles partially compiled instructions, such as, intermediate language (IL) instructions or Java bytecode, into native instructions of a computer. A virtual machine functions to manage and control the execution of the native instructions within the computer. In this document, the terms virtual machine and isolated execution environment are intended to be synonymous.

Isolated execution environment is defined as an area in the process memory of the current execution process or another process on the same machine or remote machine, that enables execution of code without effecting the current process state. In this document it is used to evaluate execution code without affecting the real execution environment. Execution environments such Microsoft VIL provide such an isolated execution environment for evaluating expressions and execution of code. Such environments can be achieved using any well-known means of process isolation such as virtual machines, software containers or by implying methods such as copy-on-write. Another way to achieve execution is to use a software transaction where the transaction is isolated and the change is rolled back after the execution.

Partially compiled instructions can be included in assemblies that are stored. In response to user commands, an isolated execution environment can load a module, compile instructions in the module into native instructions of the computer, and manage execution of the native code.

A source code debugger is computer program used to test and debug other programs, i.e. the target program or debuggee application. The debugger is configured to implement different debugging operations to debug code including: showing the position in the code where a program crashed; calling a function when stopped at a breakpoint; displaying the code in assembly; executing instructions step by step (i.e. single stepping); stopping (i.e. breaking) execution due to an event or trap such as a breakpoint; and tracking the values of variables and expressions as execution proceeds.

Instrumented code is code that has instructions added to perform out of process diagnostic operations. Instrumented code is used to generate both the nested data structure and memory delta buffer which are subsequently used to provide several advanced debugging capabilities to the user.

A debugging event is an incident in the process being debugged that causes the system to notify the debugger. Debugging events, such as on Microsoft Windows operating systems, include creating a process, creating a thread, loading a dynamic-link library (DLL), unloading a DLL, sending an output string, and generating an exception. On a Linux based operating system, the debugger is controlled by utilizing the ptrace mechanism. It serves the same purpose as Debug Events in Windows.

Time travel data is defined as values of expressions, values of variables, and numerical indicators of a total number of iterations performed for a particular code construct or segment.

Control flow data is defined as the information that represents a code execution path. The information is gathered during the execution of the code in the execution isolated environment by utilizing the code instrumentation process. Loop iteration data is the control flow data that is gathered per single loop iteration.

Pivot point is defined as the point in time-space (i.e. the code part location) whereby the debugger has collected variable and expression values and from which can be used to change the current context either backwards or forwards in time. This is referred to as pivoting or time travel navigation.

Time travel fidelity the ability of the time travel debugger to access and use different historical values, the value of a variable, but instead of searching for the current value, it searches all values of the variable that occurred in the history of the variable.

State of the debugging session is defined as the time-space location that implies a specific state and context of the debugging session.

A dump file is defined as a snapshot of process memory that shows the process that was running along with modules loaded for an application at a particular point in time, regardless of operating system. It can also be the current execution state including current process memory and other process related values. The dump file may comprise a data structure that contains the real process state or a snapshot of memory stored in a memory buffer. For example, it is referred to as a 'dump file' on Windows and as a 'core dump' on macOS and Linux.

Figure 2:
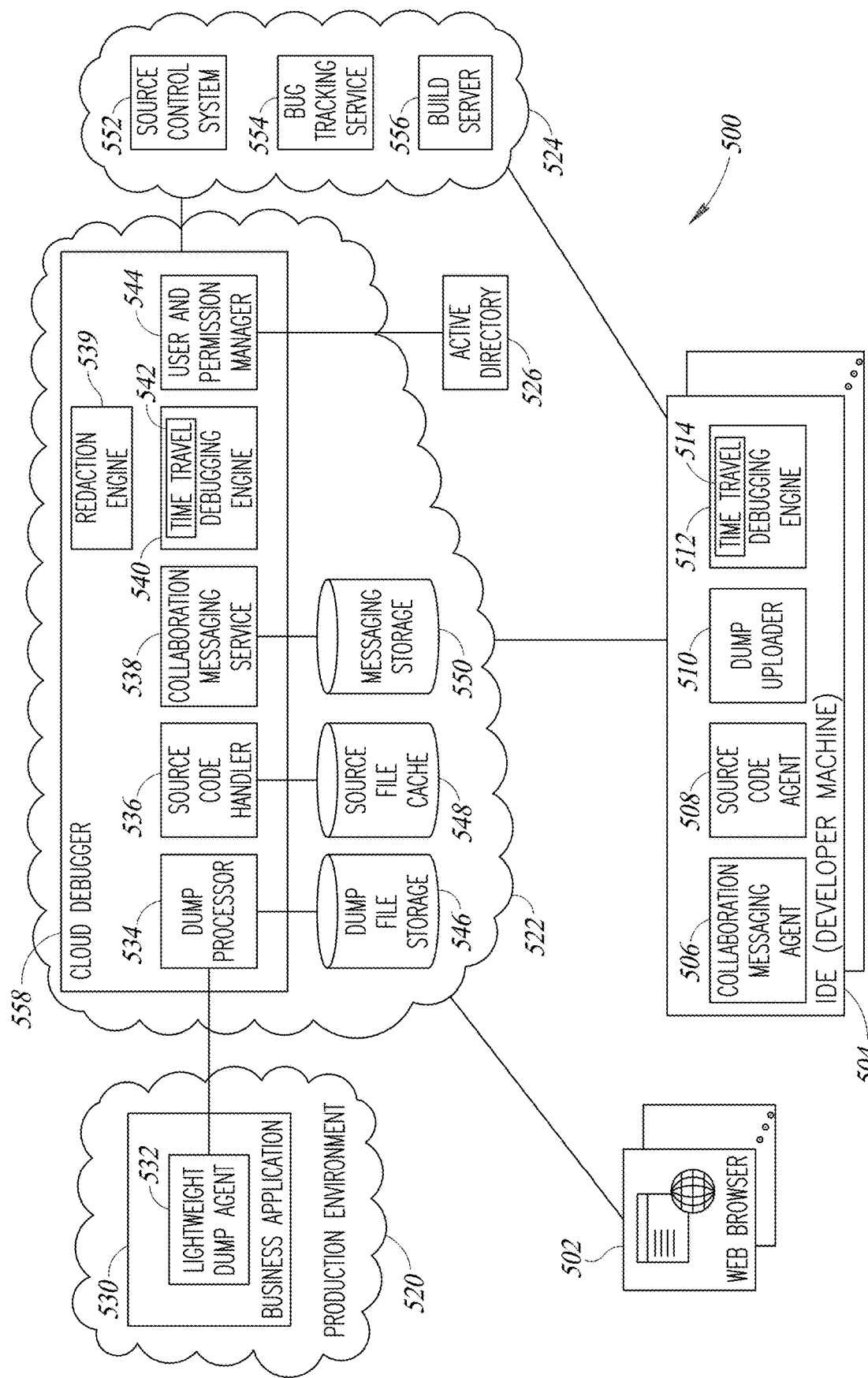
FIG. 2 is a diagram illustrating an example cloud debugging system of the present invention.

A diagram illustrating an example cloud debugging system is shown in FIG. 2. A set of components define the core technology of the cloud debugger. On the local debugger side, i.e. the developer machine, there are services that handle the debugging process, the client-side messaging system, source code and dump uploader. On the cloud side, there are similar components that reflect the behavior of the local debugger and serves as a mediator between the debugging session participants. The cloud debugger also provides a web interface for machines that use a web browser for the debugging interaction and do not have the full development IDE, e.g., tablet or other mobile device.

In particular, the system, generally referenced 500, comprises several components that reside in the cloud environment 522 and several that reside in a local integrated development environment (IDE) 504. On the cloud side, the cloud debugger 558 includes a dump processor 534 and related dump file storage 546, source code handler 536, related source file cache 548, collaboration messaging service 538 and related messaging storage 550, redaction engine 539, debugging engine 540 including time travel engine 542, and user and permission manager 544 in communication with active directory 526. In operation, the dump processer receives a dump file generated by a lightweight dump agent 532, which is part of the business application 530 in the production environment 520. The agent is deployed with the business application and shares its host.

On the local IDE side (i.e. the developer machine), the several components comprise a client-side messaging agent 506, source code agent 508, dump uploader 510, and debugging engine 512 including time travel engine 514. In addition, the cloud debugger 558 can be accessed by multiple participants via one or more web browsers 502 connected over the internet.

In one embodiment, the debugging system is integrated with a bug tracking system 524. The bug tracking system 524 comprises source control system 552, bug tracking service 554, and build server 556.

Figure 4:
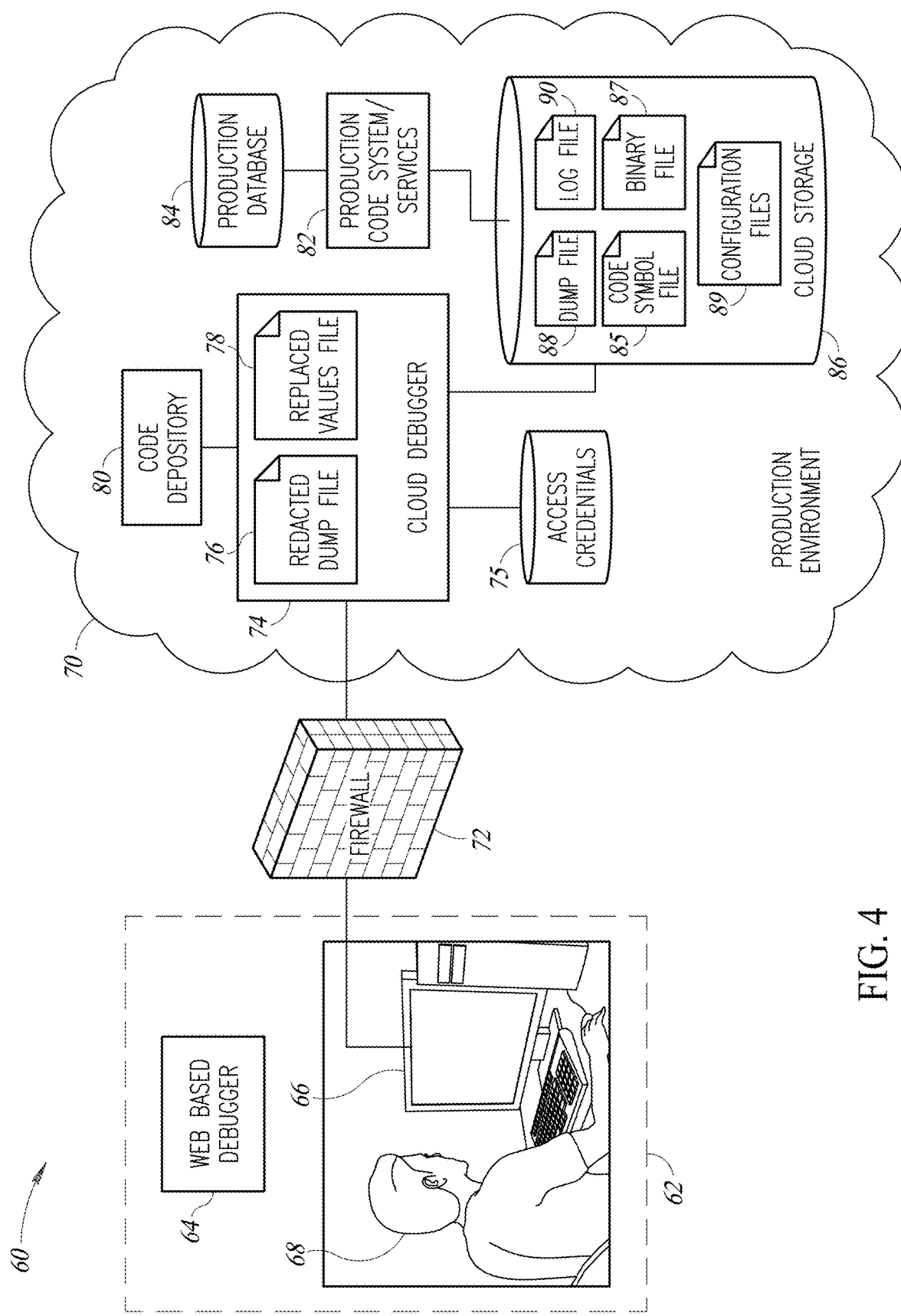
FIG. 4 is a diagram illustrating an example production environment including the software cloud debugger of the present invention.

A diagram illustrating an example production environment including the software cloud debugger of the present invention is shown in FIG. 4. The system, generally referenced 60, comprises a development station 62 connected through a firewall 72 to a production environment 70 located on the internet. At the development station 62, a developer 68 works on a development computer 66 or machine that runs a web based debugger 64 (e.g., the cloud debugger 74). Alternatively, the development machine may execute a desktop based debugger or IDE 504 (FIG. 2). In one embodiment, the production environment 70 comprises a cloud based debugger 74 with access to access credentials 75, code depository 80, and cloud storage system 86. The cloud storage 86 comprises a dump file 88, log file 90, code symbol file 85, and binary file 87. The environment also includes production code system/services 82 and production database 84.

Note that in one embodiment, the cloud debugger itself can be hosted on the same cloud farm that the debuggee is hosted. Alternatively, the cloud debugger may be implemented in a different isolated environment. The cloud debugger includes a replaced dump file 76 and replaced values files 78. The operation of the cloud debugger is described in more detail infra.

Figure 5:
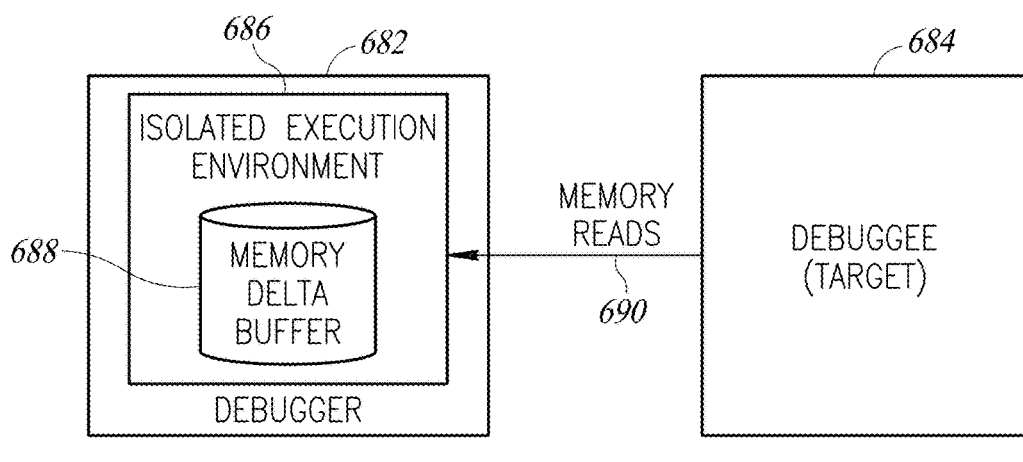
FIG. 5 is a diagram illustrating communication between the debugger and the debuggee application.

A diagram illustrating communication between the debugger and the debuggee application is shown in FIG. 5. The system, generally referenced 680, comprises a debugger 682 hosting an isolated execution environment 686. As described in more detail infra, a memory delta buffer 688 is used to record chronologically the changes (i.e. writes) made to memory in the isolated execution environment during simulated execution of the debuggee application. To handle memory reads, it is first checked whether the desired memory location value already exists in the debugger 682. If not, the memory of the debuggee 684 (i.e. target) is accessed as indicated by arrow 690. Memory read data is transferred from the debuggee memory to the isolated execution environment.

In one embodiment, the core technology of the cloud debugger is defined by a set of components. On the local debugger side is the developer machine, services that handle the debugging process, the client-side messaging system, source code, and dump uploader. On the cloud side, there are similar components that reflect the behavior of the local debugger and serve as a mediator between the debugging session participants. The cloud debugger also provides a web interface for machines that use a web browser for the debugging interaction and that do not have the full development IDE, e.g., a tablet or other mobile device or a PC with no IDE. Note that this simplifies the DevOps process since there is no need to have a complex and expensive development machine.

When a user starts a collaborative debugging session, the cloud debugger is called and a session request is made. The cloud debugger user management service checks the license and the permission of the user (via user and permission manager 544) and approves or disproves the session. It also allows the user to invite other users to share the session. The messaging service is engaged and is operative to handle the collaboration between the different users. Two main sources of information are needed for the collaborative session: (1) source code files, and (2) memory state (dump) of the program.

It is important that the source code matches the current execution binaries. The dump uploader 510 and the dump processor 534 handle the dump upload process. Note that the dump file can be obtained using any suitable method including the cloud/internet, flash drive, local network, etc. The source code agent 508 and the source code handler 536 function to make ensure the source code version that the debugger uses is correct. Dump files are obtained from the developer machine in case of local process collaborative debugging, or from a production environment in the case of cloud/production process debugging. Having the dump file go directly from the production environment to the cloud debugger storage improves the privacy and security of sensitive information in the production memory dump in the event redaction engine 439 is activated.

A typical dump file can be several hundred megabytes or more. Uploading such a large file over the internet takes time and slows the startup of the debugging session. To reduce the upload duration and the data transfer cost, the dump processor 534 uses compression and employs a diff algorithm such as rdiff. Since most of the binary images in different dump files share the same information, if the user has already uploaded a dump of the same debuggee in the past, taking only the sections that are different has a huge impact on the size of the payload that must be uploaded to the cloud debugger.

Once the cloud debugger has the session dump file, it finds the corresponding source files. The cloud debugger uses several algorithms and heuristics to perform this match. Source code files may come from the source control system, the developer local file system, or a cloud services that own the source code such as the case of Azure Functions. If there is no source code file available, it can be extracted from the binary in the dump file by utilizing a decompiler module. When a compiler compiles the source code, it usually omits symbol files that contain additional information that correlate the resulting binaries to specific lines of code in the original source code information.

Symbols (symbol variables) may be obtained from the dump file or can be stripped out to symbol files. The dump file contains a list of loaded modules. Each module has a corresponding symbol file. In one embodiment, a debugger uses a helper library such as Image Help and DbgHelp both available from Microsoft Corporation to obtain the symbols and read the symbol variable values from the dump file or the debuggee process memory.

Other tools, such as SourceLink, can even supplement the symbol files with a correlation to the source control system. In some cases, part of the original source code might be embedded in the image file binaries. It is preferable to deploy the application binaries along with the symbol files to enable better production debugging experience. The cloud debugger leverages the symbol files when it tries to find the original source code files. To obtain the source files from the source control system, the cloud debugger requires authorization to query the information from the source control system. The cloud debugger may also use a web-hook or any other synchronization mechanism with the source control system if a proactive approach is taken to prefetch the source file information whenever there is a new push (i.e. check-in), e.g., to pre-calculate the source file hash, as described below. Other communication mechanisms can provide notifications such as service buses, event hubs, etc.

Note that a webhook in web development is a method of augmenting or altering the behavior of a web page, or web application, with custom callbacks. These callbacks may be maintained, modified, and managed by third-party users and developers who may not necessarily be affiliated with the originating website or application. Webhooks are "user-defined HTTP callbacks". They are usually triggered by some event, such as pushing code to a repository or a comment being posted to a blog. When that event occurs, the source site makes an HTTP request to the URL configured for the webhook. Users can configure them to cause events on one site to invoke behavior on another.

If the debugger session originated from a production debugging dump, the source control matching algorithm checks the dump file for source information. Several tools are publicly available from Microsoft Corporation such as symbol server, and source server. These tools correlate this information to the compiled symbols and embed the symbol file path to the application binaries. Other available tools use the well-known SourceLink at GitHub to do so.

If matching source information is found, the cloud debugger source code handler 536 uses the existing services and tools to obtain the source file. Note that in a production debugging session there is typically a source control system, but there is no embedded information in the dump or binary files corresponding to the matching source files. In this case, the source code handler 536 uses a heuristic algorithm. The debugger uses the source code hash that is embedded in the symbol file. The debugger creates the hash code for all source control file versions in the source control repository and searches for a matching hash. From a performance perspective, the process of creating the hash for each source control file version can be done only once and saved as metadata either in the source control system, or in the cloud debugger storage.

Example pseudocode for finding a source code match utilizing the hash algorithm is shown below in Listing 1.

---

Listing 1: pseudocode to find sensitive information correlation IDs

1. For each checked-in version in the source control system
   a. For each source file
      i. Generate the hash key using the same mechanism that the compiler uses to generate a pdb file and store it in a persisted table. The key is the hash value, the value is the source file name and the source control file version.
2. For each code binary file in the production environment
   a. If there is source control information embedded, use it to retrieve the source code.
   b. Else
      i. Extract source code hash information for all source files
      ii. For each source file
         1. If it is already discovered, i.e. it exists in the result source file group, continue to the next file.
         2. Search in the source code hash persisted table for a matching hash. If found, use this version of the source code. Add it to the result source file group.
      iii. If there is no match, use a decompiler to obtain the source code and add it to the result source file group.
3. The result source file group contains all source files.

---

If the debugger session originated from the developer machine (i.e. IDE) then the source files on the local machine file system are used. For performance improvement, however, it may be faster to obtain the source file from the source control system 552 and transfer only the changes that occurred between the last source control push (check-in) and the current state. This is because the source control system is hosted in a cloud environment that provides fast internet connectivity and premium storage, while the development machine usually has a much smaller upload bandwidth. In some cases, the source code does not exist at all, such when the user needs to debug a third-party component. In these cases, the cloud debugger cannot find matching source code files and uses the decompiler to generate them. Decompiled files are stored in a cache to reduce the need to decompile them every time they are needed. Note that decompiled files of a commonly used third party component may be cached in a shared cloud storage so that numerous debugging sessions from different developers can use them to farther improve performance.

Figure 3:
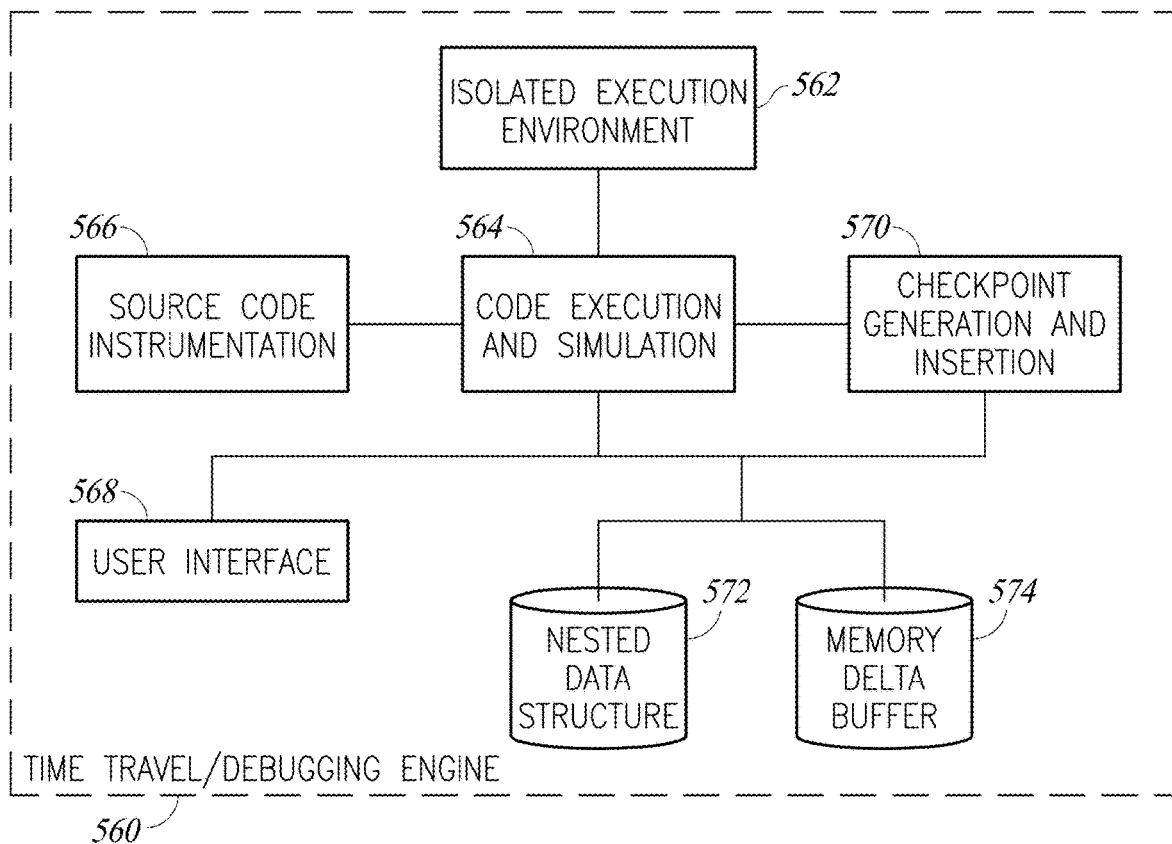
FIG. 3 is a diagram illustrating the time travel module of the debugging engine in more detail.
Figure 6:
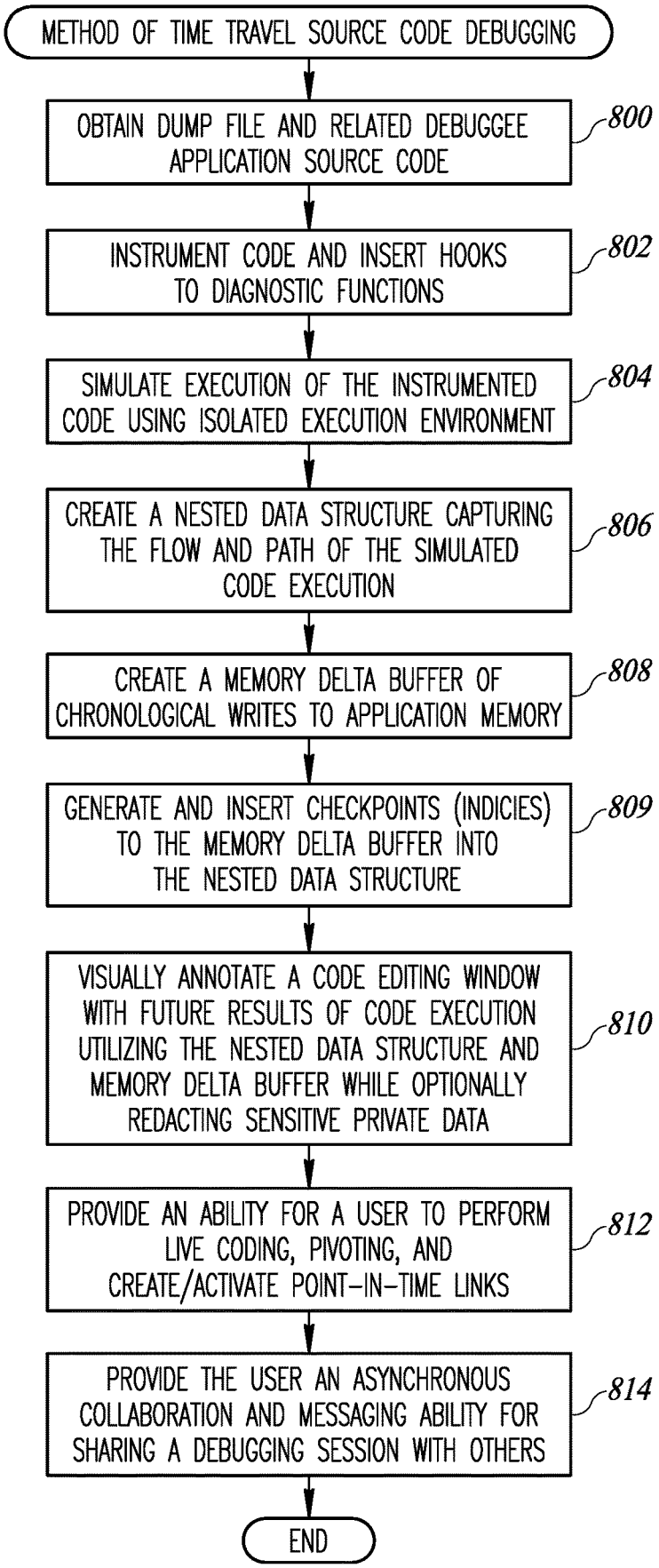
FIG. 6 is a diagram illustrating a method of time travel source code debugging.

A diagram illustrating a method of time travel source code debugging is shown in FIG. 6. With reference also to FIGS. 2 and 3, the debugger first obtains the dump file and related debuggee application source code as described supra (step 800). The dump processor 534 receives the dump file from a lightweight dump agent 532 in the production environment 520 and stores it in the dump file storage 546. Source code handler 536 on the cloud debugger (and source code agent 508 on the IDE platform) obtains the source code and caches it in the source file cache 548. In one embodiment, the source code may be obtained from the source code system 552.

The source code, once obtained is instrumented via the source code instrumentation module 566 (step 802). This is achieved by inserting statements or hooks into the source code which call diagnostic functions provided by the debugger. The code execution and simulation module 564 then simulates execution of the instrumented code using the isolated execution environment 562 (step 804). In one embodiment, the instrumented source code is converted to intermediate language first before virtual execution. Note that this can be performed for languages that do not have an intermediate language. For example, C++ code can be instrumented and compiled to machine language. In addition, script code having no compiler at all can be instrumented. In this case, an interpreter runs the instrumented code in the isolated environment.

During simulated execution, via the hook instructions, the debugger generates a nested data structure (i.e. tree or graph) 572 documenting the simulated execution of the instrumented source code (step 806). In addition, a memory delta buffer or journal 574 is created that records chronologically changes to memory as a result of the simulated code execution (step 808). Note that memory reads are obtained from the dump file while writes are journaled in the memory delta buffer so as to not make any changes to the dump file. Checkpoints into the memory delta buffer at strategic locations are generated and stored in the nested data structure (step 809).

A user interface module 568 functions to visually annotate the code editing window with 'future' results of the code execution using the contents of the nested data structure and memory delta buffer (step 810). In addition, sensitive private is optionally redacted using the redaction engine 539. The debugger also provides the ability for the user to perform live coding, pivoting (i.e. creating pivot points), and creating and activating point in time links (step 812), as described in more detail infra. In addition, an asynchronous collaboration and messaging service is provided by enabling a user to share a debugging session with others (step 814). A collaboration messaging service (module 538) is provided in the cloud debugger 558 and a collaboration messaging agent module 506 is provided on IDE platforms 504.

Thus, the debugger upon hitting a breakpoint or opening a dump file is able to travel to the future as well as the past. This allows developers to easily alter the future by modifying code on the fly and receive immediate feedback in real time to validate potential bug fixes, i.e. live coding or live programming. The debugger also provides visual annotations of the code editing window in the form of a heads-up display (HUD) that effectively flattens time and space to present the continuum of a method's execution through time.

In accordance with the present invention, upon hitting a breakpoint, trap, or other exception, a dump file of the debuggee program's state is captured. In addition, the source code used to compile the particular version of the program is retrieved. The dump file and source code are used to generate an artifact referred to a "collaborative debugging session". The execution of the code is captured along with the elements necessary to provide a collaborative debugging experience where multiple developers (i.e. participants) can access the code execution and create "what if" scenarios to attempt various bug fixes and verify their correctness. This can be achieved via a web browser or desktop IDE.

Note that an artifact is one of many kinds of tangible byproducts produced during the development of software. Some artifacts, e.g., use cases, class diagrams, and other Unified Modeling Language (UML) models, requirements and design documents, help describe the function, architecture, and design of software. Other artifacts are concerned with the process of development itself such as project plans, business cases, and risk assessments. Build tools often refer to source code compiled for testing as an artifact, because the executable is necessary to carrying out the testing plan. Without the executable to test, the testing plan artifact is limited to non-execution based testing. In non-execution based testing, the artifacts are the walkthroughs, inspections and correctness proofs. On the other hand, execution based testing requires a minimum of two artifacts: a test suite and the executable. An artifact occasionally may be used to refer to the released code (in the case of a code library) or released executable (in the case of a program) produced.

Upon hitting a breakpoint, or opening a crash dump, the debugger is operative to visualize the execution of the entire code fragment from the line where the breakpoint was set (i.e. the execution point) through to the end of the current scope or method. The flow of data can be visualized using HUD like annotation and the user may perform time travel actions such as switching between different iterations (referred to as pivoting), stepping into arbitrary methods anywhere within the instrumented code block, and switching between different iterations in the callee method as well.

In one embodiment, the execution of a code fragment is captured in a nested data structure, such as a tree or a graph. To accomplish this, the source code is first instrumented by adding code to update the data structure at particular points of interest known as logpoints' such as: the start and end of a loop iteration, entering into a control flow block such as an 'if', 'catch', or 'case' statement, etc., or calculating the value of a sub expression. Each logpoint is indexed by a numeric value and is associated with a particular piece of code which caused it to occur (e.g., abstract syntax tree node). The instrumented code is then virtually executed out-of-process using any suitable well-known technique such as those described in U.S. Patent Publication No. 2009/0307528, entitled "Simulating Operations Through Out-Of-Process Execution", incorporated herein by reference in its entirety. The resulting nested data structure can then be mapped onto a graphical user interface in the form of a diagram or as visual annotations displayed within a code editor window. A memory delta buffer is generated for storing memory writes as they are generated chronologically during the code simulation. Checkpoints associated with the logpoints are generated and inserted into the nested data structure. Each checkpoint provides an index into the memory delta buffer corresponding to the particular logpoint.

A diagram illustrating an example code fragment is shown in FIG. 7. In this example, the code is instrumented such that every branching incident, loop iteration, and sub-expression evaluation is instrumented or 'hooked', as shown in FIG. 8. The instrumented code includes calls to methods such as LogBeginNewIteration and LogEnterBranch that perform logic to incrementally build the nested data structure, e.g., tree or graph, that captures the path and flow of the code execution. Methods such as LogValue capture the result of a computation at that particular point in time context. Each call to these methods passes a unique numeric indicator referred to as "part-id" which denotes the particular portion of the code (e.g., abstract syntax tree node) that causes that particular logical operation to occur.

Figure 9:
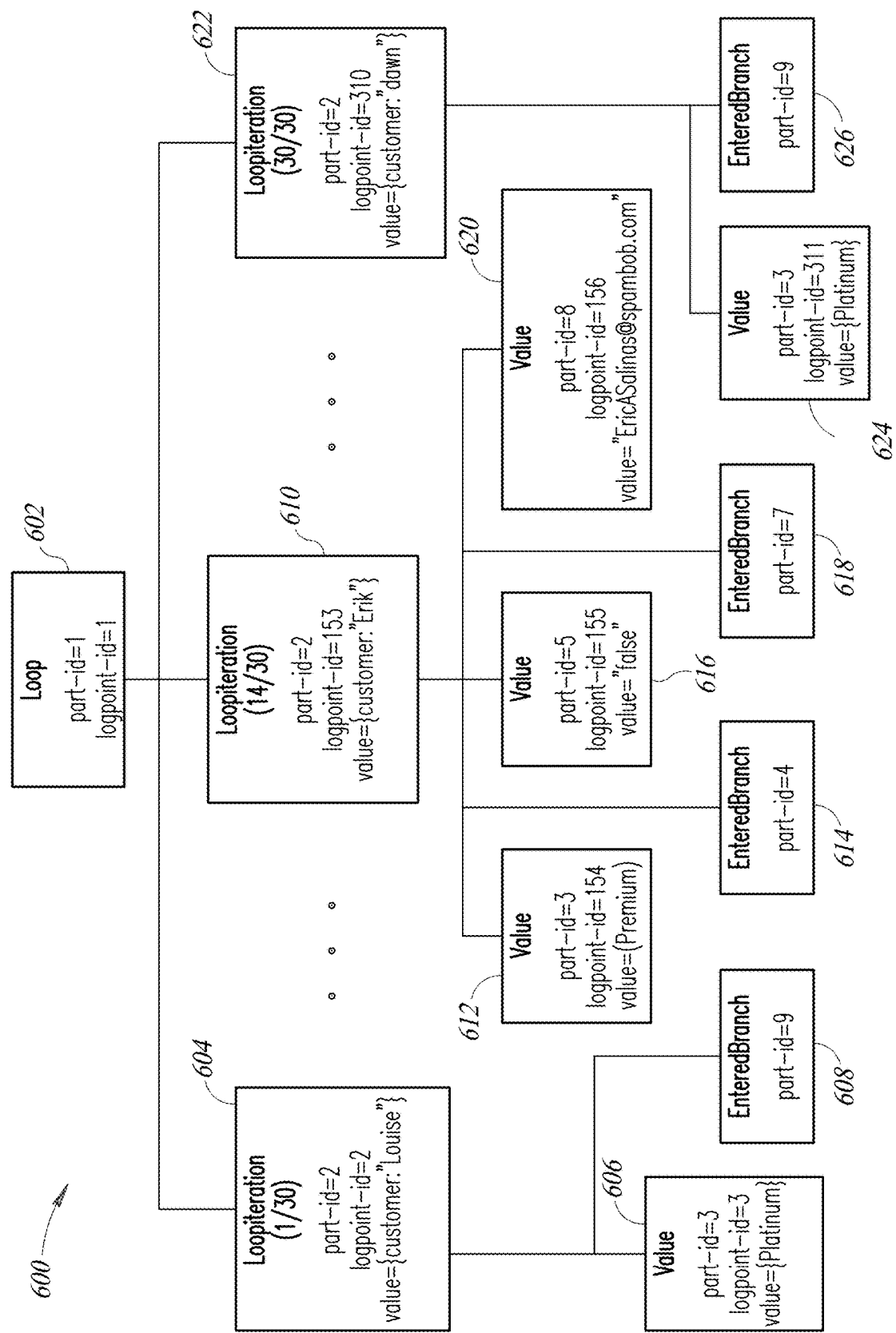
FIG. 9 is a diagram illustrating an example nested data structure created as a result of simulated code execution.
Figure 10:
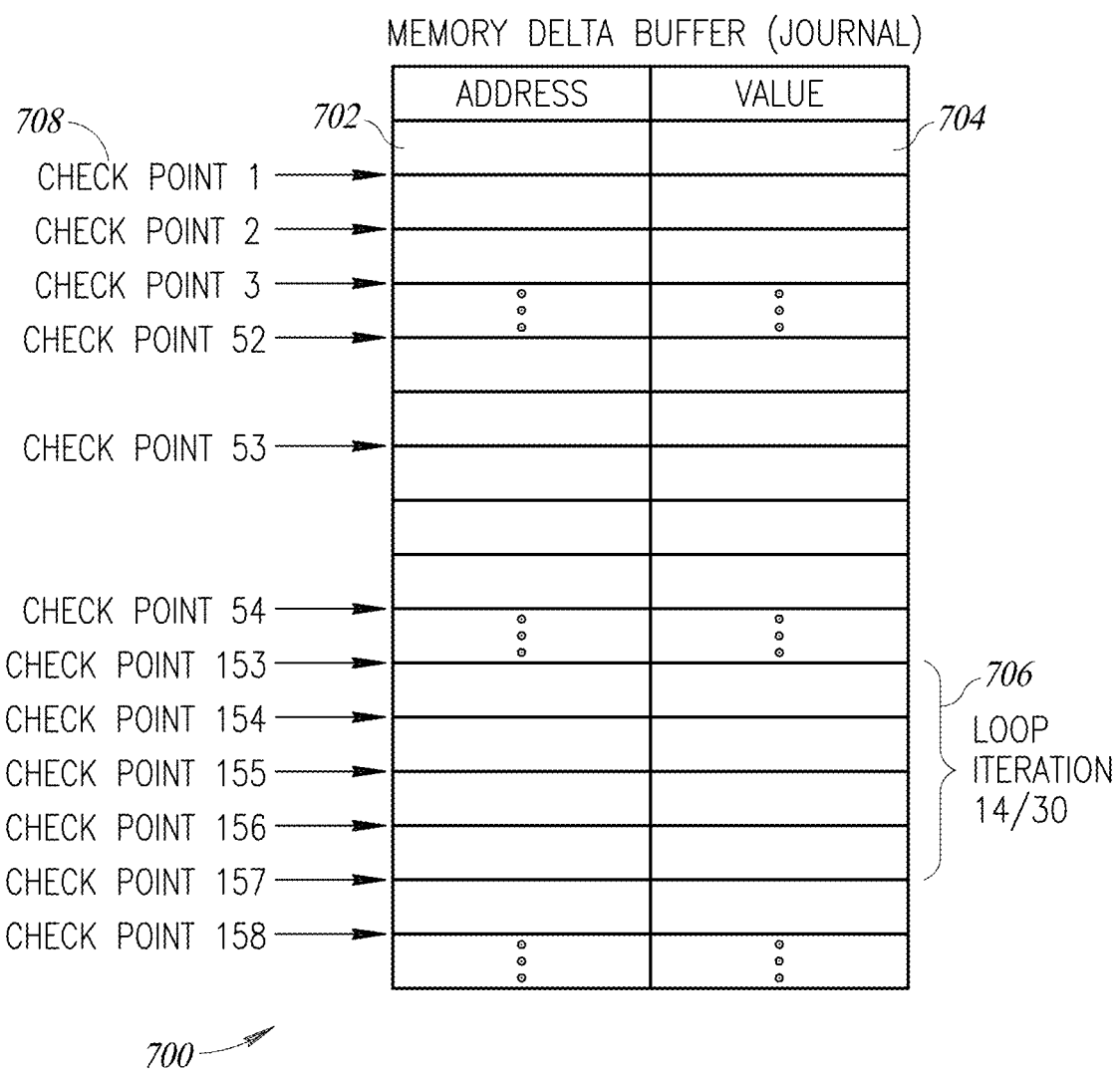
FIG. 10 is a diagram illustrating an example memory delta buffer.

Once the code is instrumented its execution is simulated in the isolated execution environment. The nested data structure and memory delta buffer, including checkpoints, are generated. A diagram illustrating an example nested data structure created as a result of simulated code execution is shown in FIG. 9. A diagram illustrating an example memory delta buffer is shown in FIG. 10. The memory delta buffer (or journal), generally referenced 70, comprises a plurality of entries for storing memory write data. For each entry in the buffer, a memory address 702 and corresponding value 704 are stored. Checkpoints 708 are indexes into the memory delta buffer that correspond to the logpoints generated during simulated execution of the code. Note that variable and expression values are written to the buffer in chronological order as they are generated over time as a result of the virtual execution of the instrumented code. After virtual execution, the resulting nested data structure and memory delta buffer can then be used to provide multiple time travel debugging user interface (UI) experiences as described in more detail infra.

With reference to both FIGS. 9 and 10, in the first iteration, the loop is entered with a customer named "Louise". The virtual evaluation of the expression 'customer.ClubMembershipType' yields a value of 'Platinum'. The value is recorded under part-id=3, and the instrumentation module 566 maintains a mapping to correlate each particular part-id to the abstract syntax tree node (i.e. nested data structure) which represents 'customer.ClubMembershipType'. Using that correlation, a visual annotation is displayed near the particular expression in the source code editor window, as shown in FIG. 11. In addition, it is noted that the tree node which represents the first iteration contains one node for 'Enter Branch' with part-id=9, but an 'Enter Branch' node for part-ids 4, 6, and 7 is absent. The rendering logic maps their absence by making the corresponding abstract syntax tree nodes (which represents 'case ClubMembershipTypes.Premium' and associated 'if' and 'else' blocks) as grayed out or otherwise visually de-emphasized. The total amount of such 'Enter Branch' nodes in the data structure per part-id is presented in the UI as numeric indicators. For example, it is shown that the 'case ClubMembershipTypes.Premium' branch was entered 18 times, the enclosed "if" statement 7 times, etc.

At the top of the nested data structure, generally referenced 600, is the main loop 602 having part-id=1 and logpoint-id=1 (and corresponding checkpoint 1). This corresponds to the 'foreach' statement in FIG. 7. Each iteration of the loop generates an additional entry in the nested data structure. Assuming 30 customers total, the first iteration (1/30) generates an entry 604 in the data structure with part-id=2, logpoint=2 (and corresponding checkpoint 2), and value for customer='Louise'. Assuming 'Louise' is a platinum customer, the code path taken is the lower case segment of the switch statement. In response, entry 606 is made which includes part-id=3 (i.e. the switch statement), logpoint=3, and value='Platinum'. The branch entered has a part-id=9 which is stored in entry 608 in the nested data structure. Code execution continues and as an example the entry for iterations 14 (entry 610) and 30 (entry 622) are shown.

The entry for loop iteration 14 includes part-id=2, logpoint 153, and value='Erik' for customer. Erik is a premium customer and thus the upper case segment path of the switch statement is taken. Entry 612 includes part-id=3 (i.e. the switch statement), logpoint-id=154, and value='Premium'. Entry 614 documents entering the upper case segment having part-id=4. Entry 616 documents the 'if' statement and includes part-id=5, logpoint-id=155, and value='false'. Similarly, entry 618 documents entering the 'else' branch with part-id=7. Entry 620 documents calculating the value of an expression with part-id=8 (SendThankYouLetter), logpoint-id=156, and value='ErikASalinas@spambob.com'. Checkpoints 153 through 157 are generated and point to the memory write values stored in the memory delta buffer for loop iteration 14.

FIG. 12 illustrates how the 14$^{th}$ iteration of the "foreach" loop (represented in the tree data structure in entry 610) is mapped onto the code editor. In this case, only code branches with part-ids 4 and 7 were entered, and so the other branches are grayed out. It is noted that the result of Boolean expressions may be visually presented on the code editor with colored annotations and/or color coding (e.g., green is 'true' and red is 'false'). For example, the expression within the "if" statement (part-id=5) yielded "false", and that maps onto a red background color on the code editor.

In similar fashion, loop iteration entry 622 documents the 30$^{th}$ and last iteration of the loop including part-id=2, logpoint-id=310, and value='Dawn'. Since Dawn is a premium customer, the upper case segment of the switch statement is taken and documented in entries 624 and 626.

Note that a logpoint-id and corresponding checkpoint are generated only for entries that calculate the value of a variable or expression which is then stored in the memory delta buffer (the dump file and application memory are not overwritten). Thus, entries that document only entering a branch of code do not generate a logpoint-id and related checkpoint but do generate an entry in the nested data structure.

A diagram illustrating the first iteration of the loop is shown in FIG. 11. This figure shows the nodes in the tree data structure that represent the first iteration of the loop mapped onto a graphical user interface in the form of visual annotations (i.e. HUD) in a code editor window. As indicated, the first iteration customer="Louise" and the variables and expressions 632 are evaluated for this iteration and displayed above their respective locations in the code. In addition, numbers 630 indicating the number of times a code segment is entered are also displayed near their respective locations in the code. For example, the 'Premium' case statement is entered 18 times out of the 30 iterations, while the 'Platinum' case statement is entered 12 times. Within the "premium" case statement, the 'if' path is taken seven times while the 'else' path is taken 11 times. Note that the 'Premium' path is grayed to indicate that for the first iteration, that case path is not taken, but rather the 'Platinum' case path is taken.

Similarly, FIG. 12 illustrates the 14$^{th}$ iteration of the loop. Visual annotations are displayed for variable and expression values and loop and code path iterations associated with the 14$^{th}$ iteration of the foreach loop. In addition, clicking or hovering over a numerical indicator brings up a list of values for all iterations that will occur in the future. Thus, even though the 14$^{th}$ of 30 iterations is displayed, hovering over indicator 635 (14/30) causes a list 634 to display. The particular contents of the list is configurable by the user. In this example, the iteration index 638 and FirstName 640 are displayed. As described in more detail infra, this information is already known as the code was virtually executed and variables and expressions evaluated and stored chronologically in the memory delta buffer. They are then extracted and presented to the user in the HUD.

In addition, line 636 is highlighted in red to indicate that the 'if' code path is not taken for the 14$^{th}$ iteration of the loop, but rather the 'else path is taken. The 'if' path is also grayed out to indicate this as well.

In accordance with the invention, the user interface is operative to draw numeric indicators on the code editor window near the relevant code constructs to denote how many items within a loop entered in a particular logical code branch. For example, 30 items were iterated over in the foreach loop; of those, 18 made it into the first "case" clause, of those, 7 made it into the "if" clause and 11 entered the "else" block instead.

In addition, the time travel debugger UI visually presents the items or objects that have been iterated over in a loop, and enables time travel based on those items. For example, Figure FIGS. 11 and 12 illustrate the UI exposing a way to obtain a list of all the items that were iterated over in a loop. Clicking or hovering over the (1/30) indicator 630 brings up list 634. By selecting one of those items 637 (customer "Erik"), the debugger UI moves to the point in time corresponding to that particular iteration, i.e. values for variables and expressions for the 14$^{th}$ iteration are displayed in the HUD. It is noted that expanding any item in the list 634 shows the members of that particular object at the moment of the iteration using the time travel fidelity mechanisms described in more detail infra.

The same mechanism can be used to determine items that entered a particular code branch, such as a "case" clause in this example. This list is extracted from the nested data structure and memory delta buffer shown in FIGS. 9 and 10, respectively, by finding all "Entered Branch" nodes within the tree, and correlating them to their parent "Loop Iteration" node to determine the value the loop was iterating over when said branch was entered.

A diagram illustrating HUD like visual annotations on the code display window is shown in FIG. 13. A condensed view for "if" statements in code is shown, where the items that passed through the if statement are marked with a visual annotation denoting whether the "if" statement returned true or false for that particular item. Clicking or hovering over indicator 644 brings up a list 642 of the 12 items that entered that code segment path (i.e. 'Platinum'). In this example, 12 customers entered the lower case segment and these are displayed in the list. The list acts as a pivot that can be used to select items and time travel to a point in time that is of interest. In addition, list 645 is displayed in red to indicate that the 'if' statement evaluated to false for the 14$^{th}$ iteration of the loop.

Figure 14:
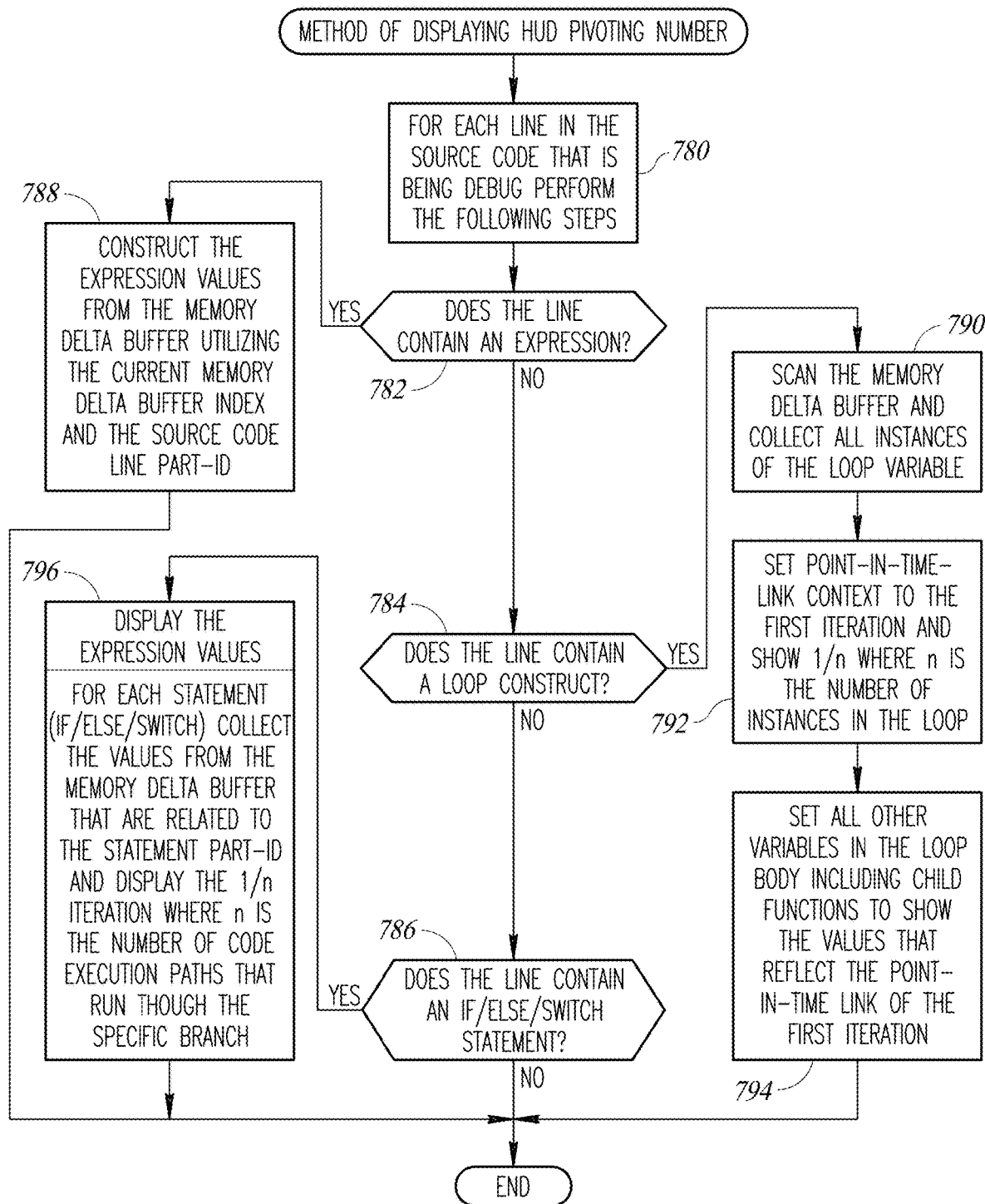
FIG. 14 is a flow diagram illustrating an example method of displaying HUD pivoting numbers.

A flow diagram illustrating an example method of displaying HUD pivoting numbers is shown in FIG. 14. To display HUD information, the user interface portion of the debugger collects information utilizing the code instrumentation (i.e. syntax rewriting) mechanism described supra. The method is performed for each line in the source code that is being debugged (step 780). When the debugger finds a code statement containing one or more sub expressions (step 782), it displays the values that collected utilizing the memory delta buffer and nested data structure (step 788). The expression values are constructed from the memory delta buffer using the checkpoints (i.e. indexes) and the source code line part-id.

When the debugger finds a loop construct (step 784), it uses the loop main variable as a navigation pivot (step 790). The memory delta buffer is scanned and all instances of the loop variable are collected. For example, consider a foreach loop over a collection of customers. In each iteration, the customer variable content is replaced with a new value from the collection. The debugger collects this information and associates a memory delta buffer checkpoint (i.e. index) for each iteration. Thus, the memory delta buffer contains all the instances, i.e. the list of customers, one for each loop iteration. To display visual annotations in the HUD that indicates the number of instances along with the current selected instance (i.e. iteration), the debugger consumes the list of customer instances associated with the loop code part-id from the nested data structure generated during the simulated execution (FIG. 6). The method sets the point in time link (described in more detail infra) context to the first iteration and displays (1/n) where n is the number of instances in the loop (step 792). All other variables in the body of the loop including child functions are set to show the values that reflect the point in time link of the first iteration (step 794).

When the user selects one of the customers, the debugger takes the associated memory delta buffer checkpoint and activates it as when moving to a shared point-in-time-link, described in more detail infra. The HUD replaces the values of all presented variables and expressions with the state generated by traversing the memory delta buffer from the new checkpoint backwards in time.

The debugger also uses the pivot list of the loop for inner loop control flows. For example, in an if/else/switch statement (step 786) the debugger shows a short list of values that make the code execution path go into the 'if' part, a short list that makes the execution path goes to the 'else' part, and another short list that makes the execution path goes to the "switch" part (step 796). The expression values for each if/else/switch statement are displayed from the memory delta buffer that are related to the statement part-id. The 1/n iteration is displayed where n is the number of code execution paths that run through the specific branch. The debugger "knows" if a pivot value enters the 'if' or the 'else' clause by examining the collected source code part-id. If for an iteration the part-id of the "if" clause has been collected, the debugger adds this entry to the 'if' corelated variable value list, otherwise it adds it to the 'else' variable list.

Figures 15, 16, 17:
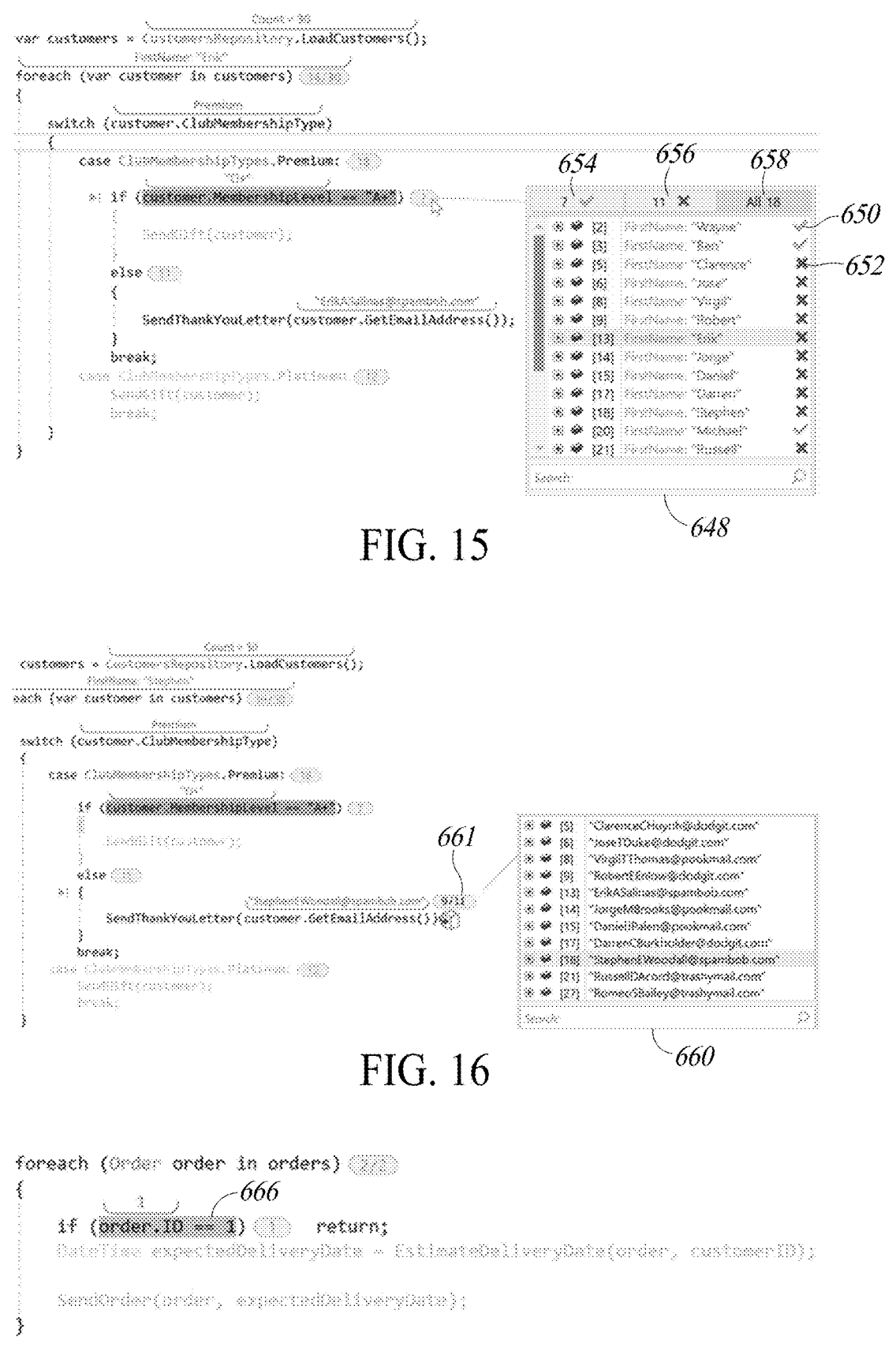

A diagram illustrating an example pivot on an 'if' statement is shown in FIG. 15. In one embodiment, the time travel debugger UI can use any expression in the code as a pivot for a time travel debugging experience. In this example, the 'if' statement 'customer.MembershipLevel==A+' is selected and the debugger UI presents all the values that the particular expression yielded across every iteration of the loop. Thus, of the 18 'Premium' customers, seven entered the 'if' segment and 11 entered the 'else' segment. Clicking or hovering over the '7' to the displayed to the right of the 'if' statement causes the UI to present a list 648 of all 18 iterations of the 'Premium' case statement path. A header line in the list 648 indicates 7 paths 654 evaluated to 'true' with a green check mark, 11 paths 656 evaluated 'false' with a red 'X' mark, and all 18 (658) as another display option. In this example, all 18 iterations are listed with green check marks 650 next to those that evaluated true and red 'X" marks 652 to indicate false. A developer may select a particular value to time travel to the moment in time that value was yielded. In this example, the 14th iteration ("Erik") is selected and the values of the variables and expressions for the 14$^{th}$ iteration are displayed in the HUD, e.g., FirstName="Erik", MembershipLevel="O+", EmailAddress="ErikASalinas@spambob.com", etc.

A diagram illustrating an example pivot on an 'else' statement is shown in FIG. 16. In this example, the expression 'customer.GetEmailAddressO' is selected and the debugger UI presents all the values that the particular expression yielded across every iteration of the loop. For the 'else' statement, indicator 661 shows (9/11) to the right of the 'SendThankYouLetter' expression. The list 660 displays email addresses for all 11 iterations of the code whose path includes the 'else' segment. Selecting the 19$^{th}$ iteration of the loop '[18]' (i.e. 9$^{th}$ out of 11 total) causes the debugger to time travel to the moment in time that value was generated during virtual execution of the code. The method sets the point in time link context to the 19$^{th}$ iteration and displays (19/30). All other variables in the body of the loop including child functions are set to show the values that reflect the point in time link of the 19$^{th}$ iteration.

FIG. 17 illustrates that when examining a point in time where control flow was terminated due to a termination statement such as 'return', 'break', or 'continue', etc., the part of the code path not executed appears grayed out. The 'if' statement is highlighted green to indicate that the expression (order.ID==1) 666 evaluated to true. Control is then terminated due to the 'return' statement. Furthermore, in one embodiment, the debugger UI visually indicates code paths that are not executed in a particular time context. In FIGS. 15 and 16 the code within the 'if' statement and second case clause is semi-transparent (i.e. grayed) because those branches were not entered during the virtual execution.

All annotations, e.g., value indicators, numeric annotations, Boolean value visual indicators, etc., are part of the live coding experience provided to users, such that when a user changes any part of the code, the prediction mechanism described herein is performed again and new annotations are displayed on the code editor window.

Figure 18:
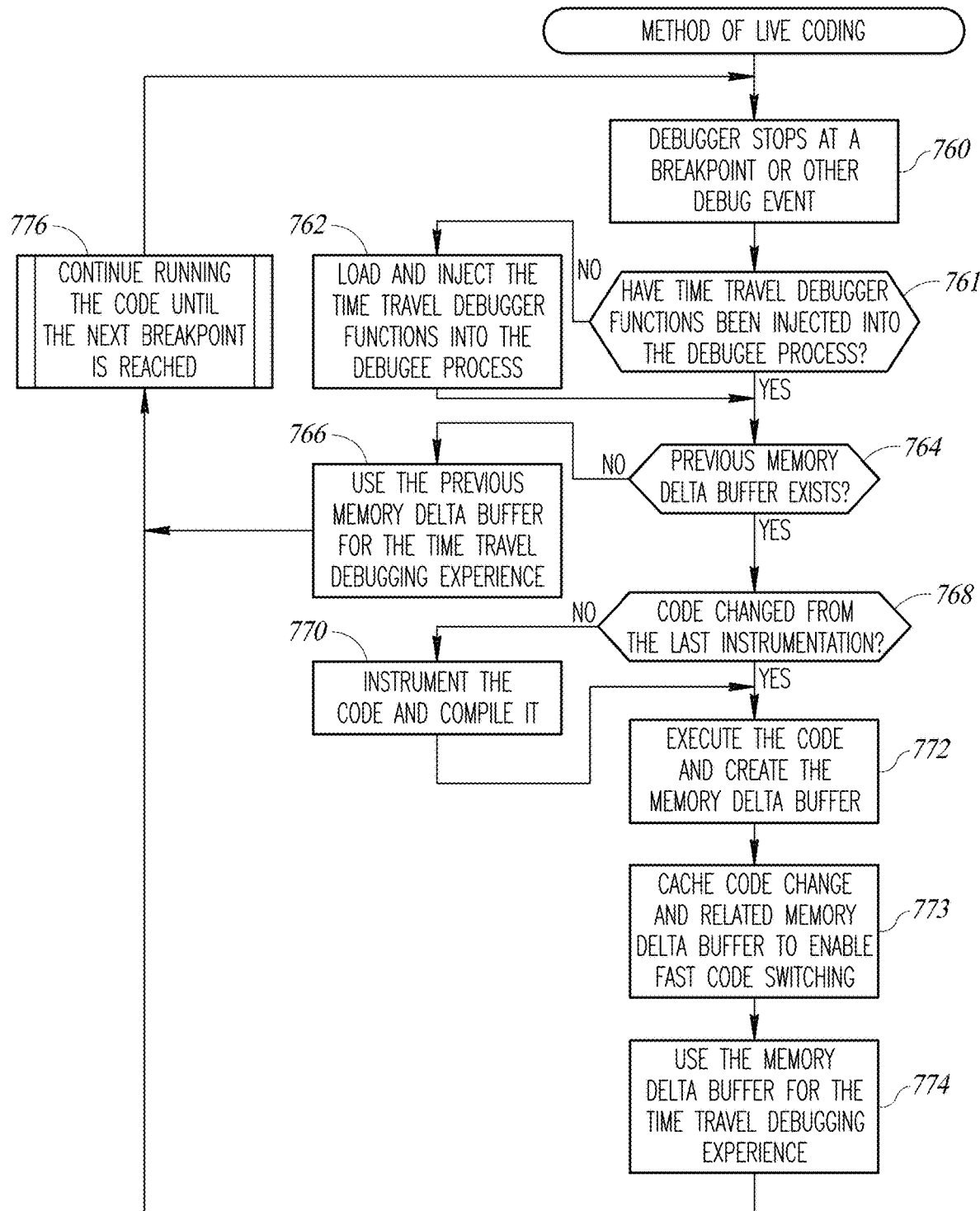
FIG. 18 is a flow diagram illustrating an example method of live coding.

A flow diagram illustrating an example method of live coding is shown in FIG. 18. When the user starts debugging and the debugger stops at a breakpoint or any other debugger event such as an exception (step 760), if there is a change in the code since the last time the process occurred, the time travel mechanism starts a code instrumentation task and preforms syntax rewriting on the code segment, starting from the current execution point (i.e. the instruction pointer) to the end of the function, including child functions that might be called from the current context. If time travel debugger functions have not been injected into the debuggee process (i.e. code instrumentation function support) (step 761), then they are loaded and injected into the debuggee process (step 762). If they have, then it is checked if the memory delta buffer already exists (step 764). If not, then it is checked if the code changed from the last instrumentation (step 768). If it did, then the code is instrumented and compiled (step 770). If not, the code is executed and a new memory delta buffer is generated (step 772). The code change and related memory delta buffer are cached to enable fast cache switching (step 773). The memory delta buffer is then used for the time travel debugging experience (step 774).

If the memory delta buffer already exists (step 764), then the previous memory delta buffer is used for the time travel debugging experience. In either case, the method continues running the code until the next breakpoint or other exception is reached (step 776).

Note that the instrumented code is compiled and runs in a virtual execution environment so that no changes to the original process memory are incurred. As described supra, during the simulated execution of the instrumented code, calls are made to the "hook" functions belonging to the debugger that were injected into the process being debugged. These hook functions collect the information about the runtime execution behavior of the code, which is stored in the nested data structure (FIG. 9) and also used to populate the memory delta buffer (FIG. 10).

Whenever the user changes the code, the above process is repeated from scratch and a new nested data structure and memory delta buffer are generated. In one embodiment, to ease going back and forth between code fixes, the debugger introduces code changes to the IDE or the cloud based edit and continue mechanism and utilizes the instrumentation-compile-run mechanism as described supra. The debugger caches each code change and its related memory delta buffer to enable fast code switching.

The debugger instruments and visualizes the execution of the code fragment from the current execution point until the end of the current scope, thereby allowing time travel debugging to the 'future'. Note, however, that the debugger cannot execute any arbitrary code fragment in the debugger as the execution may introduce unwanted side effects either (1) within the program or virtual machine memory, such as changing a static variable or an object's field; or (2) outside the program or virtual machine memory, such as deleting a file on disk, communicating with a database or network server, etc.

Thus, rather than execute code on the debuggee process (as performed by conventional mechanisms such as a debugger watch or immediate window), the debugger of the present invention simulates code execution by running the code in an out-of-process interpreter which emulates the execution of the code in the debuggee process without affecting the debuggee process.

With reference to FIGS. 3 and 5, the debugger 682 comprises an instrumentation module 566 such as a syntax rewriter that generates an instrumented method that can then be compiled into intermediary language (IL) and executed by an isolated execution environment 686 that resides within the debugger and 682 "mirrors" the debuggee process. The isolated execution environment emulates code execution within the debuggee and iterates over each intermediary language instruction, virtually executing it in an isolated environment.

If the instruction requires writing to a memory address, such as changing a field (e.g., stfld in MSIL or putfield in Java bytecode) or a local variable (e.g., stloc in MSIL or iload in Java bytecode), then rather than altering the memory of the debuggee, the system instead saves the change to a transient memory delta buffer 574 which functions to maintain a list of blocks of consecutive memory indexed by memory address which are different in the isolated execution environment space compared to the actual debuggee memory.

If the instruction requires reading from a memory address, such as reading a field (e.g., ldfld in MSIL getfield in Java), the interpreter first checks whether the requested memory address is already covered in the memory delta buffer. If not, the interpreter reads directly from the debuggee memory.

If the instruction requires calling another method (such a "call" instruction in MSIL or one of the 'invoke*' instructions in Java bytecode), the bytecode for that method is retrieved and the interpreter begins interpreting the callee method. There may, however, be a predefined list of methods called "hooks", such that rather than interpreting the method directly, the interpreter instead calls its own method, to perform bookkeeping that is external to the virtual process, such as creating a checkpoint into the memory delta buffer.

In this manner, the system provides prediction of code execution without causing any side effects whatsoever to the debuggee process. When the user changes the code of the debugged method, the memory delta buffer and the nested data structure are simply cleared and a new virtual execution is performed based on the code change, thus enabling an experience of live coding.

Note that in conventional debugger UIs, hovering the mouse cursor over specific expressions in the code may trigger a 'DataTip' window to appear with the result of evaluating the expression at the current execution point (i.e. the present). A diagram illustrating an example conventional debugging experience is shown in FIG. 19 where evaluating the expression 'totalPrice' 590 yields the number '0' because the execution point is located before the value is assigned.

In the time travel debugging experience of the present invention, examining an expression is not just a matter of looking at the current execution context (i.e. the current thread, the current frame in the callstack, and the current instruction point address) as in a conventional debugger. Rather, it is a point-in-time-context experience, meaning the current iteration within a loop or nested loop, the current line of code and method, and even the current location in the line within the flow of execution over time.

A DataTip having time travel fidelity is a mechanism by which inspecting an expression yields a pop-up or other UI element which displays the value of the expression the user hovers over at the exact moment in time in which it was (or will be) executed. For example, FIG. 20 illustrates the behavior of the time travel debugger in the same situation as FIG. 19. Rather than show the 'current' value of the expression (i.e. the value of the memory when the debugger entered the stop state), the value with respect to the moment in time it will be evaluated is displayed. Note that the instruction pointer is still in the same location as in FIG. 20. Now, however, the 'totalPrice'=35 is displayed since this is the value it will have in the 'future'. This was obtained during the virtual execution of the instrumented code. Similarly, FIG. 21 illustrates that examining the expression 'totalPrice' 594 in a different location, even within the same line of code, yields a value that is accurate to the respective point in execution time. In this example, the value of 'totalPrice'=$50 after the shipping cost of $15 ('order.ShippingCost') has been added is displayed.

As described supra, in order to implement DataTip functionality with time travel fidelity, the memory delta buffer uses a checkpointing mechanism whereby a checkpoint is generated at logpoints which can be reverted to at will. This is achieved by implementing the memory delta buffer as a versioned persistent data structure, or by simply performing a deep clone of the entire memory delta buffer at the logpoints and maintaining a dictionary mapping between each logpoint-id and the relevant memory delta buffer version.

When a user examines a value in a particular location in the code editor, the memory delta buffer is reverted to the state of the isolated execution environment at the point in time in which the expression was evaluated by using the matching logpoint-id The mechanism for viewing objects in a future-time-travel system with time travel fidelity described herein can be used to allow for a Side Effect Visualization and for comparing the same object across different points in time in program execution.

As described supra, the debugger generates point in time links to capture the current state of the debugger which includes the values of variables and expressions at that particular point in time which corresponds to a particular point in the virtual execution of the instrumented code.

Figure 22:
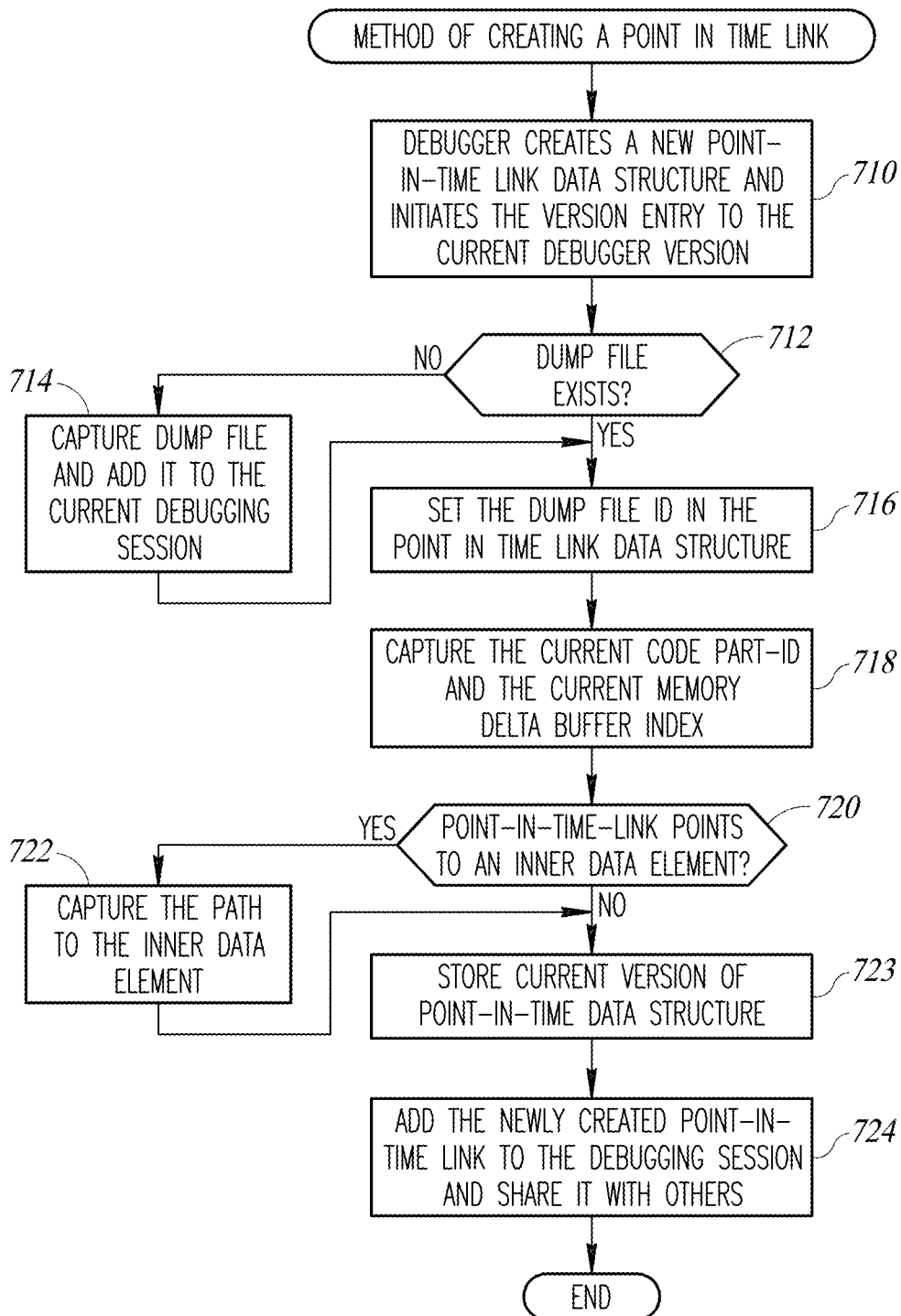
FIG. 22 is a flow diagram illustrating an example method of creating a point in time link.
Figure 23:
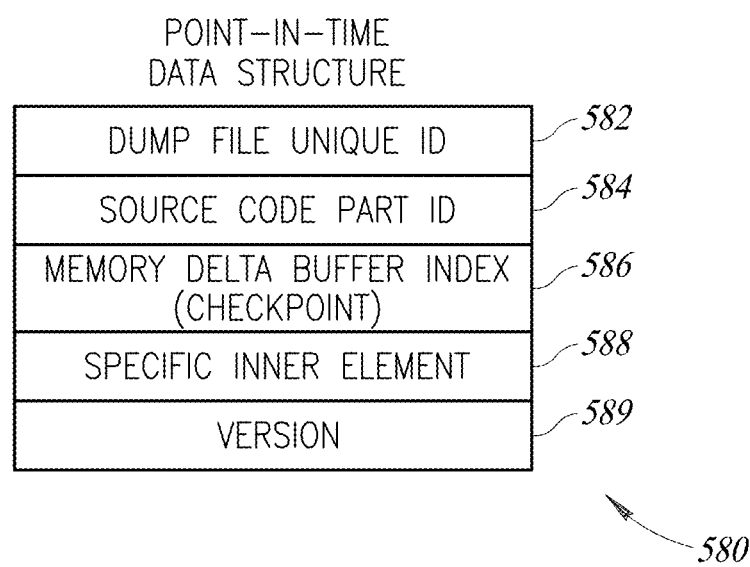
FIG. 23 is a diagram illustrating an example point in time data structure.

A flow diagram illustrating an example method of creating a point in time link is shown in FIG. 22. When a user created a point in time link, the debugger creates a new instance of the point-in-time-link data structure (step 710). A diagram illustrating an example point in time data structure is shown in FIG. 23.

TABLE 1

Point in Time Data Structure

| Field | Description |
| --- | --- |
| dump_file_unique_id | The specific dump file (i.e. specific version) |
| stack_frame_unique_id | The specific stack frame and specific thread within the dump |
| source_code_part_id | The specific location in the syntax tree; used to point to the specific location in the source code (e.g., source file, line number, source code version) |
| memory_delta_buffer_index | The location in the memory delta buffer; used to recreate the memory state |
| specific_inner_element | Optional path to a specific inner code element such as nested property, array member, etc. |
| version | The point in time data structure version for forward and backward compatibility |

If the dump file does not exist (step 712), the debugger captures the dump file and adds it to the current debugging session (step 714). The debugger records the current dump file identity in the data structure (step 716). It also records the current selected source code as the source part-id and the current index to the memory delta buffer (step 718). If the user pointed to a specific inner element such as nested property within a complex object graph (step 720), the path to this nested element is also stored in the point in time data structure (step 722). In addition, the data structure also stores the current version of itself (step 723), so that if a new version of the debugger opens an old point-in-time link object, it knows how to handle and convert it to a newer version, or if an old version of the debugger opens a point-in-time-link that was generated by a newer version of the debugger, it knows that there might be different fields that may break compatibility and warns the user accordingly.

The created point-in-time-link becomes part of the current debugging session (step 724). This debugging session may be shared with other parties and can be stored in a bug-tracking system (as described in more detail infra). Note that a debugging session may contain multiple dump files with different code representations and memory states associated with each, i.e. the original code version as well as modified code versions created when a developer shares the session and creates what-if scenarios. Point-in-time-links capture this state and enable restoring the state at a later time when a user that takes part in a collaborative debugging session chooses to activate the link. For example, user Jim can create a point in time link and pass it as part of a chat message while user Joan receives this message and activates the point-in-time link in her own development environment or web based production debugger. A user can also restore a previously stored debugging session such as from the bug tracking system or other persistent storage and activate the point-in-time link in the development environment.

Figure 24:
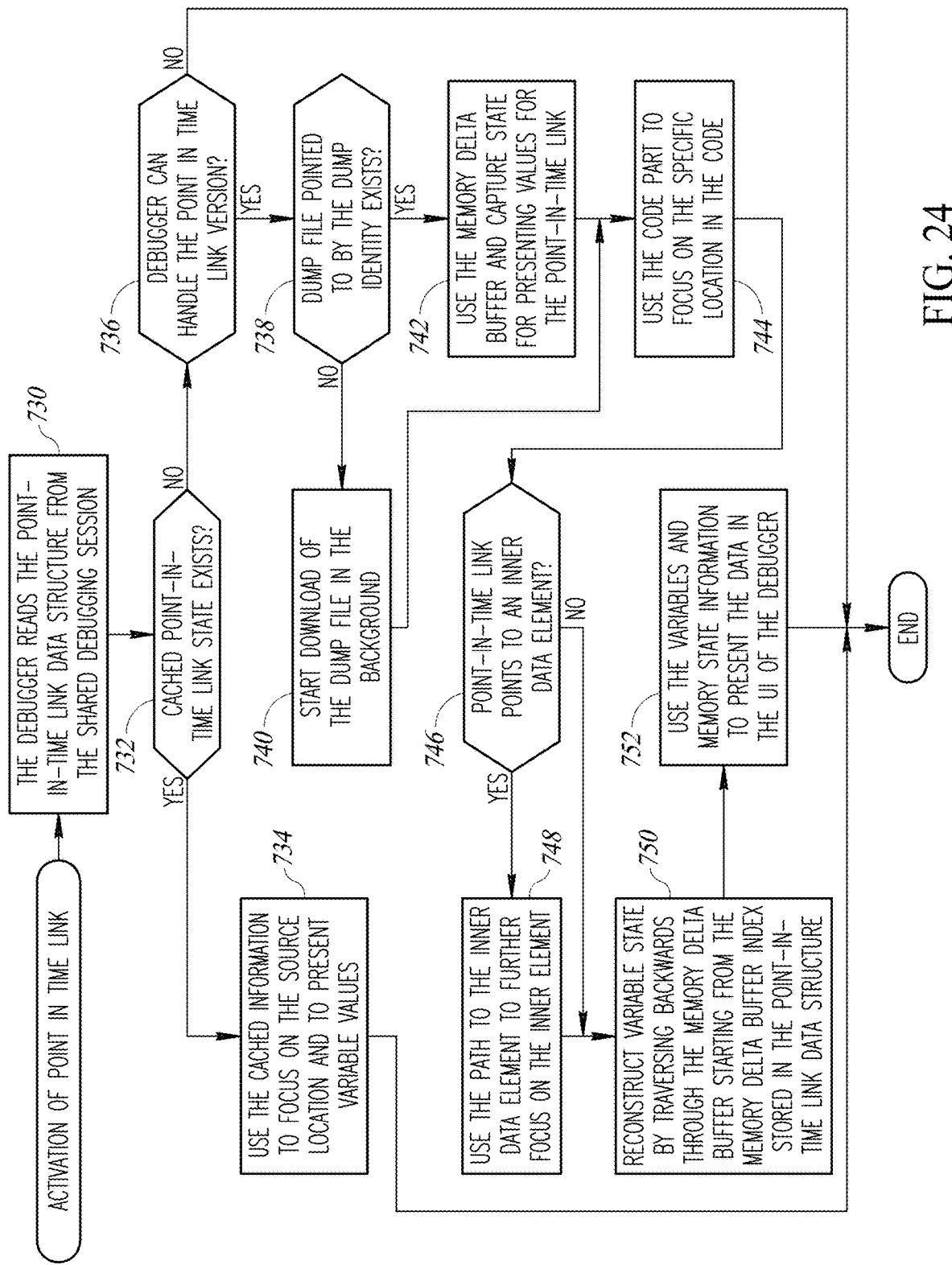
FIG. 24 is a flow diagram illustrating an example method of activating a point in time link.

A flow diagram illustrating an example method of activating a point in time link is shown in FIG. 24. When a user activates a point-in-time link the debugger changes its current state to reflect the captured state that is stored in the point-in-time link data structure. If the user activates another point-in-time link, the debugger again switches to the new state. As a performance optimization, the debugger may cache the point-in-time link generated information. If the user reactivates a cached point-in-time link state, the debugger does not need to generate the state but rather reloads the state from the cache. The debugger can also use a spare CPU core and memory to generate and cache point-in-time links that are part of the shared debugging session before the user requests to activate them, such that by the time they are needed, their resulting associated memory delta buffer and data structures have already been prepared and cached. This enables fast point-in-time link activation and switching.

When the user activates a point-in-time-link, the debugger gets the data structure instance that represents the specific point-in-time link (step 730). It then checks whether the point in time link state was previously cached (step 732). If it was, then the cached information is used to focus on the source location and to present variable and expression values (step 734). If a cached version does not exist, then the version of the point-in-time link is checked whether it can be handled (step 736). If there is a match between the version of the point-in-time link and the version of the debugger or if the version of the point-in-time link data structure was created by an older version of the debugger and the debugger knows how to handle it, it continues with the method. Otherwise, the method informs the user that there is a version mismatch.

The debugger then checks if the current dump file matches the dump file identity that is stored in the point-in-time link data structure (step 738). If there is no match, the debugger uses the stored identity to fetch the dump file from the cloud or the on-premise debugger server, the IDE of the user that initiates the debugging session, the bug tracking system, or any persistent storage that holds dump file images (step 740). In the case that the debugger does not yet possess the dump file (i.e. the upload is not complete), but it has the cached variable data, it performs a 'best effort' to switch to the point-in-time location. It uses the memory delta buffer and capture state for presenting variables related to the point in time link (step 742). The code part-id is used to focus on the specific location in the code (step 744). At a later time, the debugger fills out the point-in-time state when the dump file become available.

To change the position in the source code and to highlight the specific point-in-time location in the source file, the debugger takes the data from the source code part-id. In the case where the point-in-time link points to a specific inner element (step 746), the debugger extracts the path to the element from the specific_inner_element field of the point-in-time link data structure (step 748). To present the correct variable and expression information and memory state of the current execution context (as described by the point-in-time link) the debugger uses the checkpoint that points to an entry in the memory delta buffer. It then performs a reconstruction process whereby the debugger traverses backwards from the checkpoint index entry and constructs the variable data (step 750). When the debugger traverse back in the memory delta buffer (i.e. going back in time), it scans the changes that occurred during the execution of the code. Once the debugger finds a value to a memory location (i.e. variable), it sets the variable value and ignores any further changes to that specific variable, since subsequent changes found must have occurred prior to the last change that was taken as the final value for the specific point-in-time link (step 752).

Figures 25, 26:
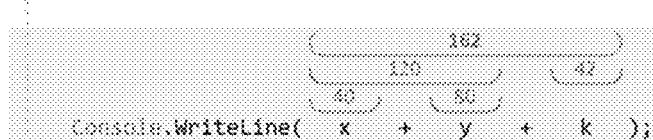
FIG. 25 is a diagram illustrating an example unannotated code snippet.
FIG. 26 is a diagram illustrating an example code snippet annotated in accordance with the present invention.

The operation of the memory delta buffer will now be described in more detail. A diagram illustrating an example unannotated code snippet is shown in FIG. 25. The code is a simple code snippet that does not show loops and other complex code execution flows such as if/else branches. This aids in explaining the operation of the memory delta buffer mechanism. Each of the five points in the code represents a change in the memory delta buffer.

TABLE 2

Sample memory delta buffer at time A

| Index | Variable (Memory address) | Data |
|---|---|---|
| 1 | x | 10 |
| 2 | y | 20 |
| 3 | z | 30 |
| 4 | x | 40 |
| 5 | y | 80 |

Assume that the user has created a point in time link in the point 2 line. In this case, the entry to the memory delta buffer is checkpoint (index)=2. The debugger finds that the value of the variable y is 20 and the value of the variable x is 10. The value of the variable z is currently undefined since execution has not reached there yet.

TABLE 3

Sample memory delta buffer at time B

| Index | Variable (Memory address) | Data |
|---|---|---|
| 1 | x | 10 |
| ➡ 2 | y | 20 |
| 3 | z | 30 |
| 4 | x | 40 |
| 5 | y | 80 |

The user then sets a point-in-time link to point 3. In this case, the variable z is set to 30, y to 20, and x to 10.

TABLE 4

Sample memory delta buffer at time C

| Index | Variable (Memory address) | Data |
|---|---|---|
| 1 | x | 10 |
| 2 | y | 20 |
| ➡ 3 | z | 30 |
| 4 | x | 40 |
| 5 | y | 80 |

When the user sets the point in time link to point 4, the checkpoint is 4 and the debugger traverses the table backwards from entry 4 to entry 1. Now the value of x is 40, z is 30, y is 20, however, and in index 1, the value of x is 10, but since the debugger has already set the value 40 to x and since this is the last change to the value before the current point in time link or current checkpoint, entry 1 with the value 10 is ignored.

TABLE 5

Sample memory delta buffer at time D

| Index | Variable (Memory address) | Data |
|---|---|---|
| 1 | x | 10 |
| 2 | y | 20 |
| 3 | z | 30 |
| ➡ 4 | x | 40 |
| 5 | y | 80 |

When the user sets the point in time to point link to 5, the value of y is 80, x is 40, z is 30, and entries 2 and 1 are ignored since the final values of x and y have already been set.

TABLE 6

Sample memory delta buffer at time E

| Index | Variable (Memory address) | Data |
|---|---|---|
| 1 | x | 10 |
| 2 | y | 20 |
| 3 | z | 30 |
| 4 | x | 40 |
| ➡ 5 | y | 80 |

Note that if there is a variable that does not appear in the memory delta buffer, it means that its value did not change from its original value to the specific point-in-time link location. In this case, the debugger takes the value from the original dump file if the dump file exists (i.e. upload or download is complete). If the dump file is not available yet, the debugger does not show the value of the variables.

A diagram illustrating an example code snippet annotated in accordance with the present invention is shown in FIG. 26. In this example, the debugger takes the value 42 for the variable k from the dump file.

TABLE 7

Sample memory delta buffer at time F

| Index | Variable (Memory address) | Data |
|---|---|---|
| 1 | X | 10 |
| 2 | Y | 20 |
| 3 | Z | 30 |
| 4 | X | 40 |
| 5 | Y | 80 |

As shown in FIG. 26, the HUD presents the values of the variables to the user. The window is annotated with the values of variables z, x, and y. Above the WriteLine statement, the values of x, y, and k, individually and summed are displayed.

In debugging of object oriented systems or any software system written in an imperative style of programming, some of the most difficult problems to solve deal with mutating state. Understanding when and how an object's state was incorrectly modified by manually stepping through many lines of code containing many potentially errant mutations is time consuming and extremely challenging. The use of conventional debugging watch, locals and immediate windows is often required to track down the changes that occurred to an object and to try and pinpoint the exact moment in the program execution where the errant change has occurred. Since conventional debugger watch, locals and immediate windows only reflect the state at a particular moment in time (reflected in the current instruction pointer address), however, developers most often memorize or write down on paper the various states they encounter, thereby increasing cognitive load and making the chain of causality that led to a software error appear elusive. The future time travel debugger of the present invention is operative to enable a user to compare the same variable or object (or different object derived from the same class) across different points in time.

Figures 27, 28, 29:
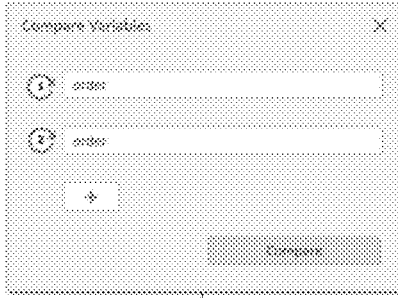
FIG. 27 is a diagram illustrating example imperative programming code.
FIG. 28 is a diagram illustrating an example compare tool for comparing a variable at different points of execution.
FIG. 29 is a diagram illustrating example results of the compare tool.

A diagram illustrating example imperative programming code is shown in FIG. 27. The code is written in an imperative programming style. The function performs some calculation and then sends an order to a customer. The method calls other methods, where each method call may include surprising and potentially incorrect changes (i.e. side effects) on the Order object, Customer object, nested objects that these objects contain, or any other statically reachable object in memory. The method may also call other methods, which in turn call other methods that cause further side effects. Using the time travel debugger, when a developer suspects that an errant side effect has occurred in the virtual code execution, a comparison feature may be used.

A diagram illustrating an example compare tool for comparing a variable at different points of execution is shown in FIG. 28. Using the compare tool, the developer selects two or more occurrences of the same variable at different points of execution. For example, the user selects the starting order.ID 670 and the ending order.ID 672. By selecting these two (or more) comparison candidates, they are highlighted in the code editor and appear in the compare tool 668. The comparison, therefore, enables a "code side effect visualization," where any mutation to the object's state over time can be examined and analyzed by comparing the "before" and "after" states of the object.

A diagram illustrating example results of the compare tool is shown in FIG. 29. Both the before and after views of the same object at different points in the program execution are shown side by side. For example, the value of the order's "Name" property is shown. This view is achieved utilizing the technique described supra for displaying DataTips with time travel fidelity. To display the before data (i.e. left side), the memory delta buffer is rolled back to the checkpoint that correlates to the logpoint-id of the syntax node that represents the variable at the first location the user selected. The memory delta buffer is then rolled forward to the checkpoint representing the second location. Each time the user clicks the "expander" UI element or otherwise drills in to see members of a specific child field or property of the object, the members displayed in the left and right columns are extracted after reverting the member delta buffer to the first and second checkpoint, respectively.

Figure 30:
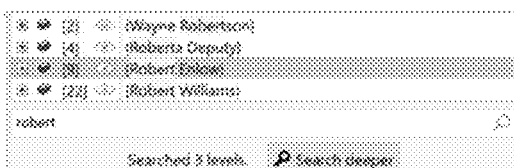
FIG. 30 is a diagram illustrating a conditional based text search through time.

In one embodiment, the mechanism for pivoting across different points in time based on data as described supra is augmented further by incorporating textual search and a conditional (i.e. predicate based) search. FIG. 30 illustrates a text-based search for time travel debugging. In this example, the user types in "robert" and in response the debugger displays a list 662 of all objects whose value or one of their member values contains the specified string. It is noted that data structures tend to be large and complex, e.g., a "Customer" object may not only have simple properties such as "Name", but also other nested objects such as "Address" which in turn contain their own fields such as "City", "Country", etc. and any of these may be changed in the code at any point in time. Therefore, the text based search is performed with time travel fidelity. This means that if the "Name" property was changed from "Robert Enlow" to a different string after that particular loop iteration has begun, the item must still be able to be found by searching. To achieve this, when a user initiates a search, the debugger retrieves the data member of each item in turn, after first rolling back the memory delta buffer to the point in time at which the item was logged. The values are then inserted into a text-indexing engine for full text search, thus yielding fast retrieval. The entries in the search index are correlated back to the point in time from which they were extracted.

Figure 31:
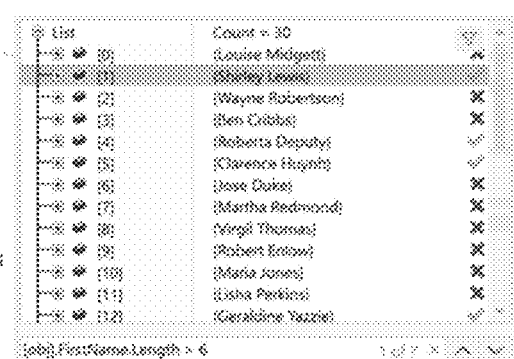
FIG. 31 is a diagram illustrating a time travel search based on name length.

FIG. 31 illustrates that conditional based search through time. This mechanism is in essence 'a reversible conditional breakpoint'. In a conventional debugger, a conditional breakpoint is a way to run the application forward in time to a particular line of code, but unlike a normal breakpoint, a condition can be used to make sure the breakpoint is only hit if a certain predicate holds true. The difficulty in using conditional breakpoints is that if the developer has entered an errant or imprecise condition and runs the program, the conditional breakpoint may not be hit when expected. The developer is then forced to restart execution of the program from scratch under the debugger and reproduce all the steps needed to reproduce the bug, which is extremely time consuming. Note that another issue with traditional conditional breakpoints is that the debugger stops on each breakpoint debug event, evaluates the condition, and if not matched, continues to execute the code until the next iteration, i.e. next debug event. Since stopping on a breakpoint is time consuming, conditional breakpoints are not practical if the number of loop iterations is large. Further, conditional breakpoints involve the passage of time, meaning that once a conditional breakpoint is hit twice, you cannot go back in time and revisit the former point in time.

In the time travel debugger of the present invention, a conditional search capability is provided to enable the developer to enter different conditions as a way of intercepting the particular moments in time that are of interest, as well as going back and forth between them.

To initiate a conditional search, the user uses one of the time travel pivoting mechanisms described supra and enters a predicate based upon the object that is being used as a pivot (e.g., '[obj].FirstName.Length>6'), or any other variables or expressions that are available in that scope. As shown in FIG. 31, the debugger UI may visually annotate each item in the list 664 whether the condition is true or false for that particular item (e.g., red X's for false and green checkmarks for true). Thus, the debugger filters the results to show only the items which matched the predicate across time via a visual indicator on a scrollbar or other UI that acts as a timeline with visual markers for the points in time in which the condition held true.

In one embodiment, a conditional search may be implemented by using an instrumentation module as described supra, such that the predicate is injected into the instrumented code. For example, in order to perform a conditional search on the predicate '[obj].FirstName.Length>6' where '[obj]' is a special keyword that denotes the current object, the instrumented code differs slightly from that shown in FIG. 8.

Rather than have:
'Hook.LogBeginNewIteration(2, customer);'

The instrumented method call passes the predicate as a higher order function or lambda expression, for example, into the hook method:
Hook.LogBeginNewIteration(2, customer, ( )=>customer.FirstName.Length>6);

Since the condition may contain side effects, such as method calls that change static variables, etc., when the call is virtually executed, the virtual execution is performed in a special manner. The memory delta buffer is checkpointed right before evaluating the condition and once the Boolean result is acquired the memory delta buffer is reverted to that checkpoint immediately after the condition is evaluated. Thus, the chance that one evaluation of the predicate might affect the next evaluation is eliminated.

In a conventional current debugger, when a developer wants to inspect the execution of a method called from the current execution point, they issue a 'step over' command which moves the execution point forward into the callee method. The developer can then perform step overs in that method and eventually step out into the caller method. The act of stepping into, like all stepping, is nonreversible. Once stepped out, the developer cannot go back into the method. This increases cognitive load and requires developers to memorize code paths that they had previously seen as they step through new code and try to grasp the chain of causality that led up to the appearance of the software bug.

The time travel debugger of the present invention provides a 'go to execution' feature comprising the ability to virtually 'step into' (i.e. navigate to another point in time link) any method call in the virtual code execution. Consider, for example, the 'foreach' code loop shown in FIG. 32. If a developer steps through the foreach loop they must slowly step into the SendGift method for each item in the collection. In order to compare and contrast the path of execution for different customers (e.g., in order to differentiate between faulty and correct execution), rather than perform a nonreversible 'step into' (of a conventional debugger), the developer performs a 'go to execution'.

As a result, the debugger displays both the callee method 667 and caller method 665 next to each other. If the developer uses one of the time travel mechanisms described supra to travel to a different iteration of the loop, the execution reflected in the callee method is updated. The 'go to execution' feature is achieved by instrumenting both the callee and caller methods as described in connection with FIG. 8 and then virtually executing the callee method. The resulting nested data structure contains logpoints from both which are then displayed in the code editor window as described supra.

Asynchronous Collaborative Debugging

The asynchronous collaborative debugging mechanism of the present invention is operative to enhance one of the most complicated debugging scenarios, i.e. production debugging. In production debugging, a problem is discovered after the software is deployed, while it is serving real customers, and has to be solved by utilizing the information captured in the production environment. Unlike standard debugging, the debugging session starts after the code has finish executing, in an offline manner. Fixing the production issue is often very urgent, as the issue may be hurting real customers and causing real business financial loss. The collaborative asynchronous debugging environment allows people having different roles in the software organization to work together and combine their perspectives and knowledge in order to understand the root cause of the issue and propose the best fix in an extremely efficient manner.

Figure 34:
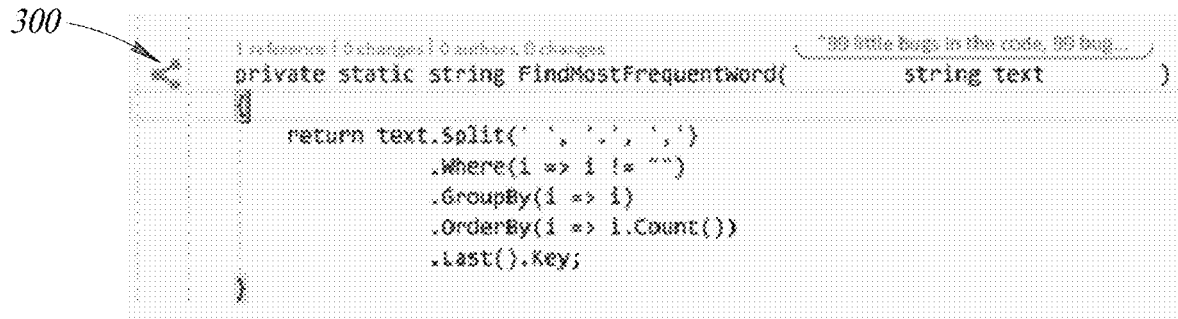
FIG. 34 is a diagram illustrating an example debugging IDE based window incorporating a share button.

In accordance with the invention, a developer starts an asynchronous collaborative debugging session collaboration process from (1) within an IDE or a debugger running on a development machine, or (2) within a web browser, i.e. cloud debugger. In the former case, as shown in FIG. 34, the developer presses a "Share" button 300 or any other UI element that invokes the collaborative debugging features. The "Share" button 300 is in the IDE window. The sharing session initialization flow is described in more detail infra. The collaborative debugger enables a developer to share their point of view of the code and express the problem using a rich text messaging/chat system that includes point-in-time links to the particular expressions in the source code that is being debugged including the values they evaluated to at particular points of interests.

Figure 35:
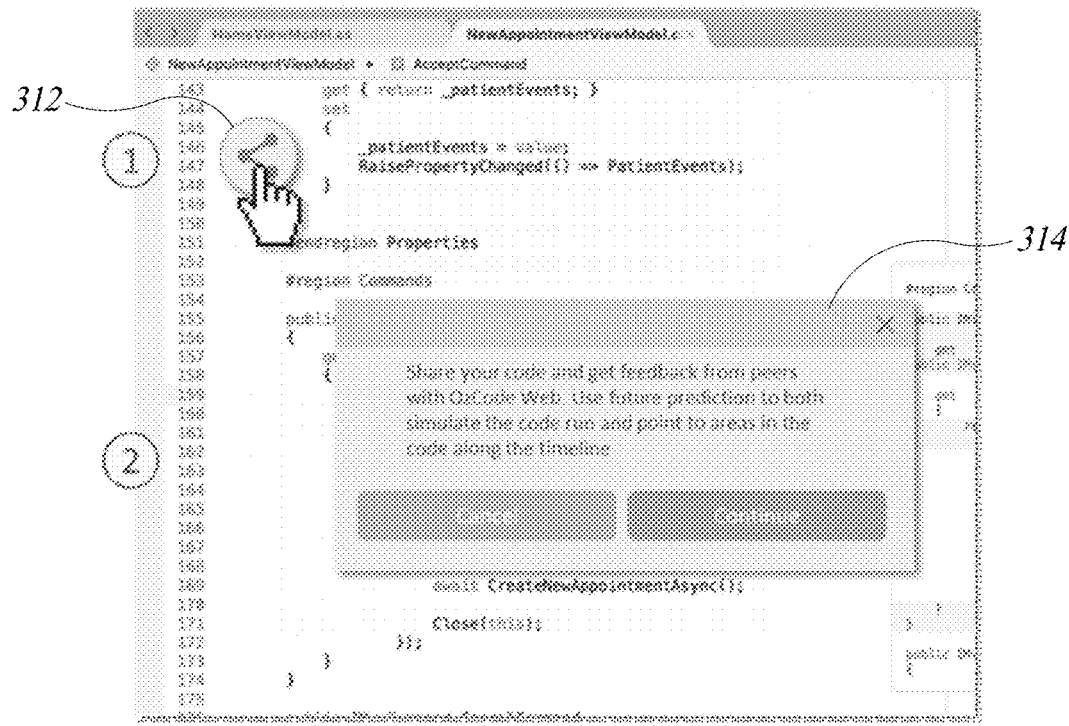
FIG. 35 is a diagram illustrating an example web based debugger incorporating a share button.

Another starting point for a collaborative debugging session is from within the production environment. In this case, the DevOp professional or developer does not need access to the IDE tool. Instead, a web browser is utilized. The cloud debugger described supra is used to enable a debugging session not connected to a specific IDE. In one embodiment, the cloud debugger is a service hosted in the public or private cloud or in an on-premise server and provides collaboration debugging services. A diagram illustrating an example web browser debugging window exposed as a web single page application incorporating a share button 312 is shown in FIG. 35. When the button is pressed, a dialog window 314 is presented to proceed with sharing the session with other participants.

In one embodiment, the collaborative debugger is able to initiate a debugging session regardless of whether the inviter and invitees are on an IDE or web browser cloud based debugger. When the user requests to share their debugging session, the debugger initiates the debugging session. The current debugger state is captured using two different mechanisms more or less contemporaneously. The first mechanism is the operating system process dump mechanism or lightweight process dump mechanism that captures the process memory. If a previous dump file already exists, only the changed memory sections are uploaded. Upon receipt, the dump file is then reconstructed by merging the changed sections with the unchanged sections into the old dump file. If an old dump file does not exist, then the complete dump file is uploaded to the cloud or on-premise production debugger. Future dump file upload processes will use this dump file as a base.

The second mechanism uses a data structure to hold the immediate (i.e. the current) state of the debugging session, including the current thread, the current process, the current stack location, and current variable states, CPU core registers, etc. The captured memory delta buffer and other state information is then downloaded and used for basic debugging until the dump file arrives.

Note that although the dump file contains all the process information including the current state, it typically takes time to upload the dump file to the cloud or organization server and then download it to the engine process which runs in the cloud to serve the collaboration session. A data structure holding the current state can be transmitted substantially quicker than the dump file. Thus, it is used to quickly allow all participants to see at least a portion of the current debugging state before full dump file data is available. When the dump file becomes available, the collaboration debugging session participants can then drill down and read the full state of the debuggee (e.g., view member object values). Note that to save time and networking resources, if the cloud server has a previous dump file of the debuggee, only the memory sections that have changed are transferred to the cloud. A dump reconstruction process functions to recreate the same dump file to be saved in the cloud or the server file system.

In parallel to capturing the current debugger state using the two methods described supra, when the user requests to share a debugging session, the debugger initiates the session by sending a collaboration request message. This message includes the collaboration details, e.g., a session identification GUID that enables other parties to join to the same session. This can be embedded in a session request link that is sent using any well-known communication mechanism such as email, chat system, SMS, or even sending a written note with a URL. A cloud debugger collaborative share request can also be sent using the IDE itself assuming it provides such a feature, e.g., Microsoft Visual Studio "Live Share" feature.

When the session participants open the session link, either from a web browser or from within an IDE, the debugger, i.e. cloud debugger in the case of a web browser, local debugger in a case of an IDE, downloads the immediate debuggee state information data structure to show the current state as soon as possible. The debugger also initiates the full dump download process to run in the background. If the debugger already has a previous dump file that originated from the same debuggee process, then only the memory sections that are different between the two dump files need be transferred. In one embodiment, the debugger uses a remote diff reconstruction algorithm, e.g., rdiff, diff, etc. to reconstruct the dump file locally.

In one embodiment, the collaborative debugger is able to initiate a debugging session regardless of whether the inviter and invitees are on an IDE or web browser cloud based debugger. The flows for several combination are described infra.

Figure 36:
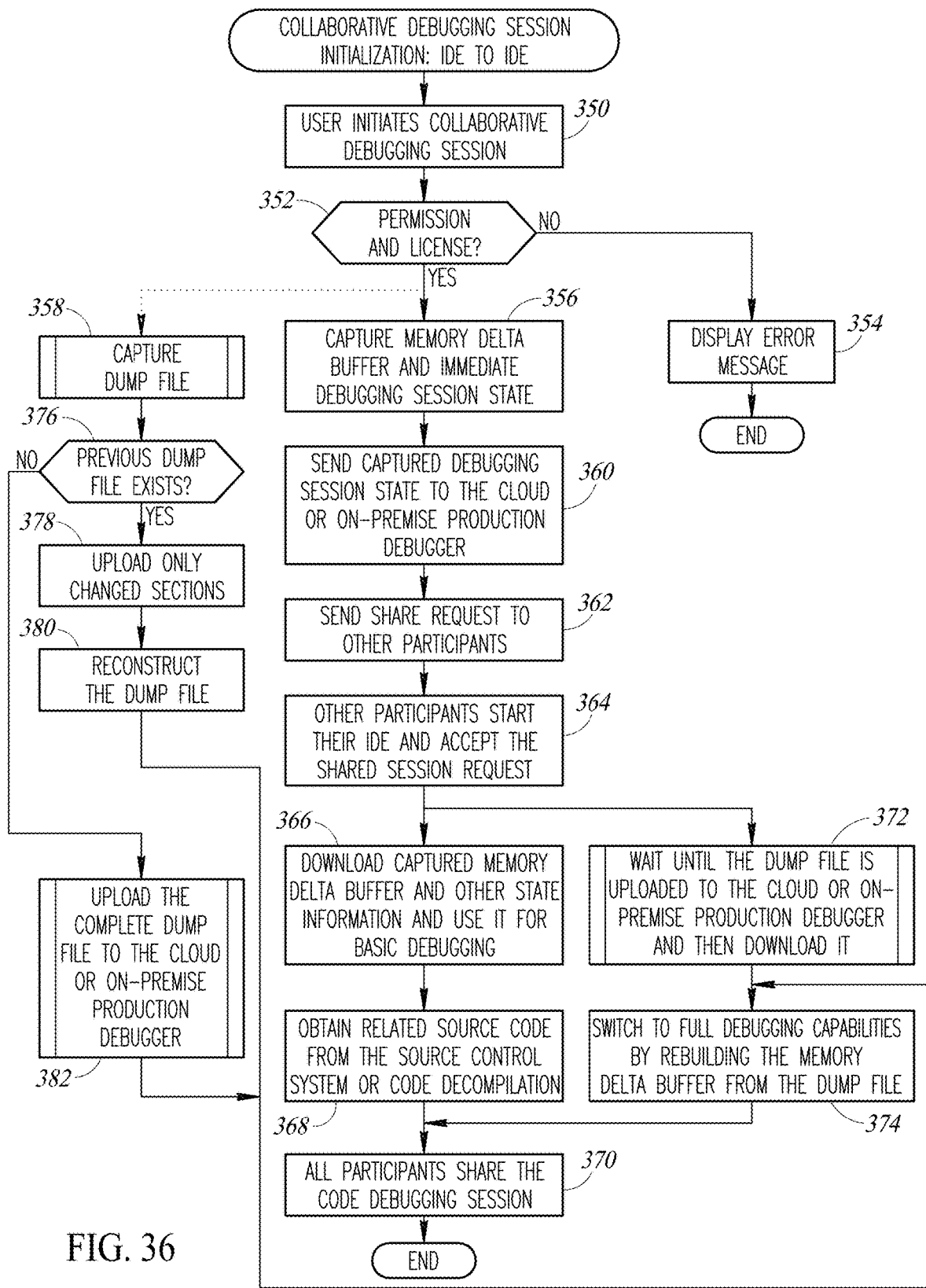
FIG. 36 is a flow diagram illustrating an example collaborative debugging session initialization from IDE to IDE.

A flow diagram illustrating an example collaborative debugging session initialization from IDE to IDE is shown in FIG. 36. When the user requests to share their debugging session, the debugger initiates the debugging session (step 350). First, permission and license are checked whether the user is allowed to initiate the session (step 352). If they are not authorized, an error message is presented to the user (354) and the method ends. Otherwise, the current debugger state is captured using two different mechanisms more or less contemporaneously. The first mechanism is the operating system process dump mechanism or lightweight process dump mechanism that captures the process memory (step 358). If a previous dump file already exists (step 376), only the changed sections are uploaded (step 378). The changed sections can be found using any suitable technique, e.g., diff, rdiff, etc. Upon receipt, the dump file is then reconstructed by merging the changed sections into the old dump file (step 380). If an old dump file does not exist, then the complete dump file is uploaded to the cloud or on-premise production debugger (step 382).

The second mechanism uses a data structure to hold the immediate (i.e. the current) state of the debugging session, including the current thread, the current process, the current stack location, and current variable states, CPU core registers, etc. (step 356). The captured debugging session state is sent to the cloud or on-premise production debugger (step 360). A share request is then sent to one or more other participants (step 362). The other participants launch their IDE applications and accept the shared session request (step 364). The captured memory delta buffer and other state information is then downloaded and used for basic debugging until the dump file is received (step 366). The related source code is then obtained either from the source control system or by performing code decompilation (step 368). All participants at this point share the code debugging session using the captured memory delta buffer (step 370). The method waits for the dump file upload to the cloud or on-premise production debugger to be complete and then downloads it (step 372). Once the download is complete, the debugger switches to full debugging capabilities by rebuilding the memory delta buffer from the dump file (step 374) and the code is debugged using the new memory delta buffer (step 370).

Figure 37:
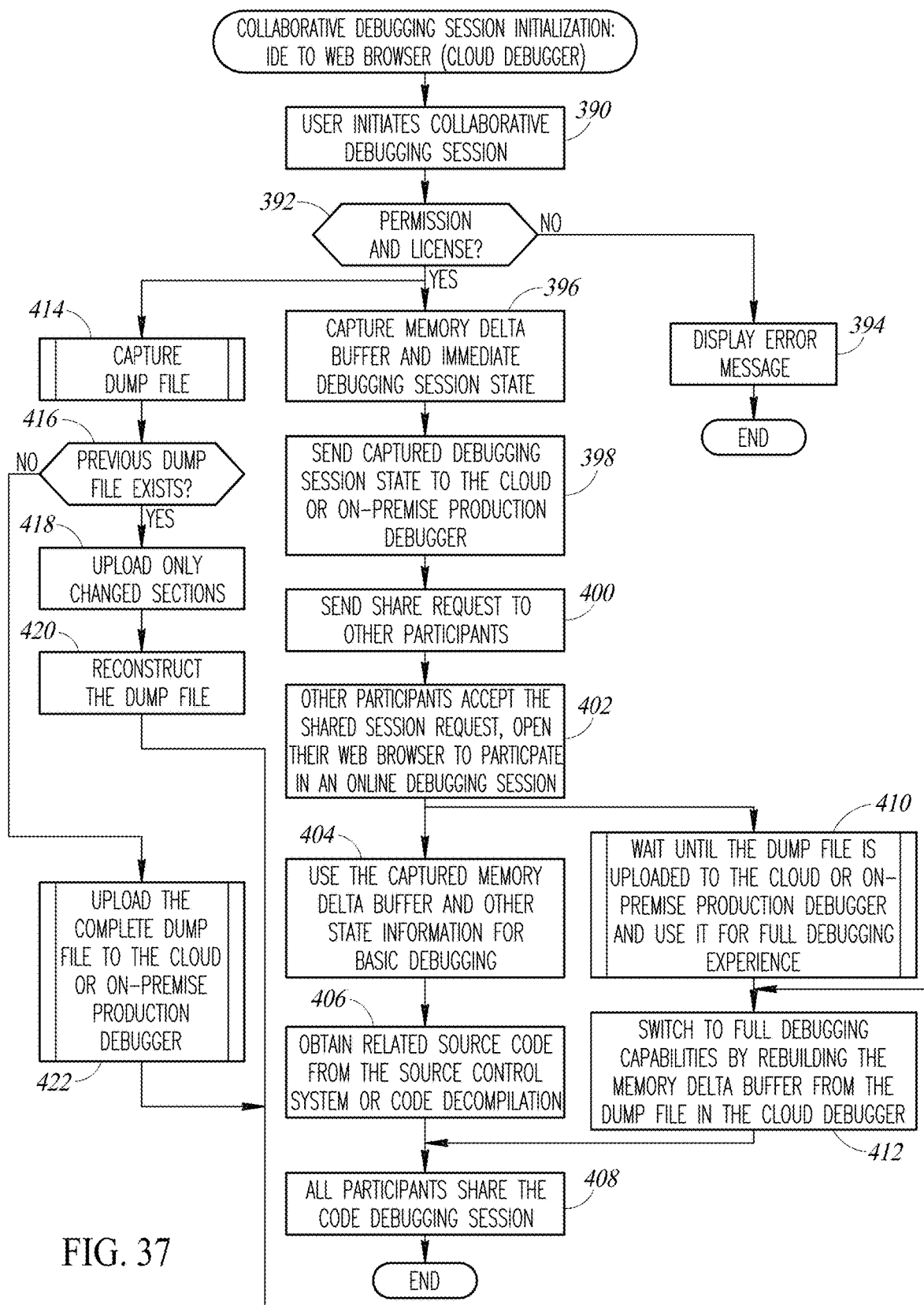
FIG. 37 is a flow diagram illustrating an example collaborative debugging session initialization from IDE to web browser (cloud debugger)

A flow diagram illustrating an example collaborative debugging session initialization from IDE to web browser (cloud debugger) is shown in FIG. 37. When the user requests to share their debugging session, the debugger initiates the debugging session (step 390). First, permission and license are checked whether the user is allowed to initiate the session (step 392). If they are not authorized, an error message is presented to the user (394) and the method ends. Otherwise, the current debugger state is captured using two different mechanisms more or less contemporaneously. The first mechanism is the operating system process dump mechanism or lightweight process dump mechanism that captures the process memory (step 414). If a previous dump file already exists (step 416), only the changed sections are uploaded (step 418). The changed sections can be found using any suitable technique, e.g., diff, rdiff, etc. Upon receipt, the dump file is then reconstructed by merging the changed sections into the existing dump file (step 420). If an old dump file does not exist, then the complete dump file is uploaded to the cloud or on-premise production debugger (step 422).

The second mechanism uses a data structure to hold the immediate (i.e. the current) state of the debugging session, including the current thread, the current process, the current stack location, and current variable states, CPU core registers, etc. (step 396). The captured debugging session state is sent to the cloud or on-premise production debugger (step 398). A share request is then sent to one or more other participants (step 400). The other participants accept the shared session request and open their web browsers to participate in the online debugging session (step 402). The captured memory delta buffer and other state information is then downloaded and used for basic debugging until the dump file is received (step 404). The related source code is then obtained either from the source control system or by performing code decompilation (step 406). All participants at this point share the code debugging session using the captured memory delta buffer (step 408). The method waits for the dump file upload to the cloud or on-premise production debugger to be complete and then downloads it (step 410). Once the download is complete, the debugger switches to full debugging capabilities by rebuilding the memory delta buffer from the dump file (step 412) and the code is debugged using the new memory delta buffer (step 408).

Figure 38:
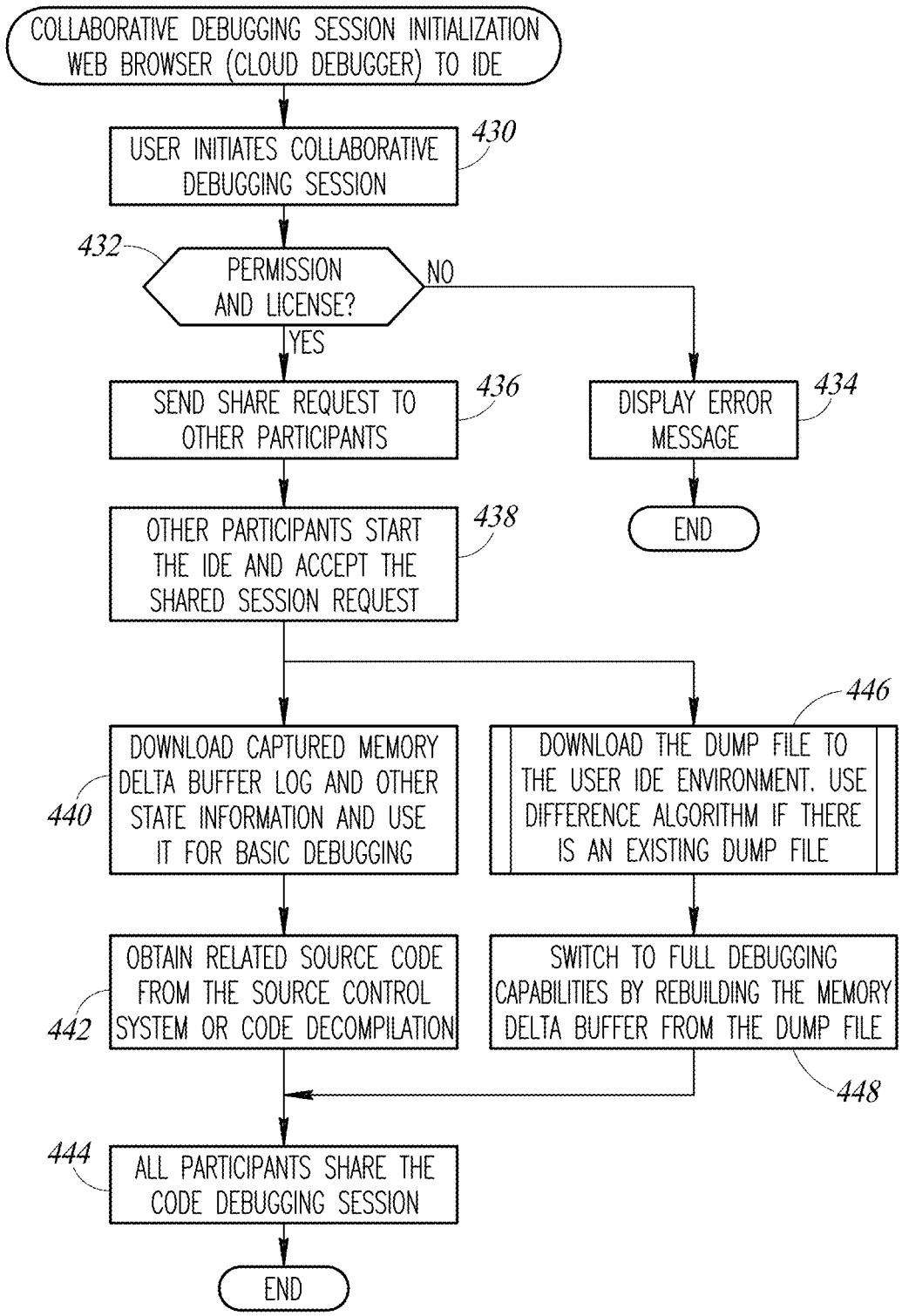
FIG. 38 is a flow diagram illustrating an example collaborative debugging session initialization from web browser (cloud debugger) to IDE.

A flow diagram illustrating an example collaborative debugging session initialization from web browser (cloud debugger) to IDE is shown in FIG. 38. When the user requests to share their debugging session, the debugger initiates the debugging session (step 430). First, permission and license are checked whether the user is allowed to initiate the session (step 432). If they are not authorized, an error message is presented to the user (434) and the method ends. Otherwise, a share request is sent to one or more other participants (step 436). The other participants start their IDE application and accept the shared session request (step 438). The captured memory delta buffer and other state information is then downloaded and used for basic debugging until the dump file is received (step 440). The related source code is then obtained either from the source control system or by performing code decompilation (step 442). All participants at this point share the code debugging session using the captured memory delta buffer (step 444). Contemporaneously, the method downloads the dump file to the user IDE environment, and uses a difference algorithm if an existing dump file is present to reduce the amount of data to be sent to the IDE (step 446). The debugger switches to full debugging capabilities by rebuilding the memory delta buffer from the dump file once received (step 448) and the code is debugged using the new memory delta buffer (step 444).

Figure 39:
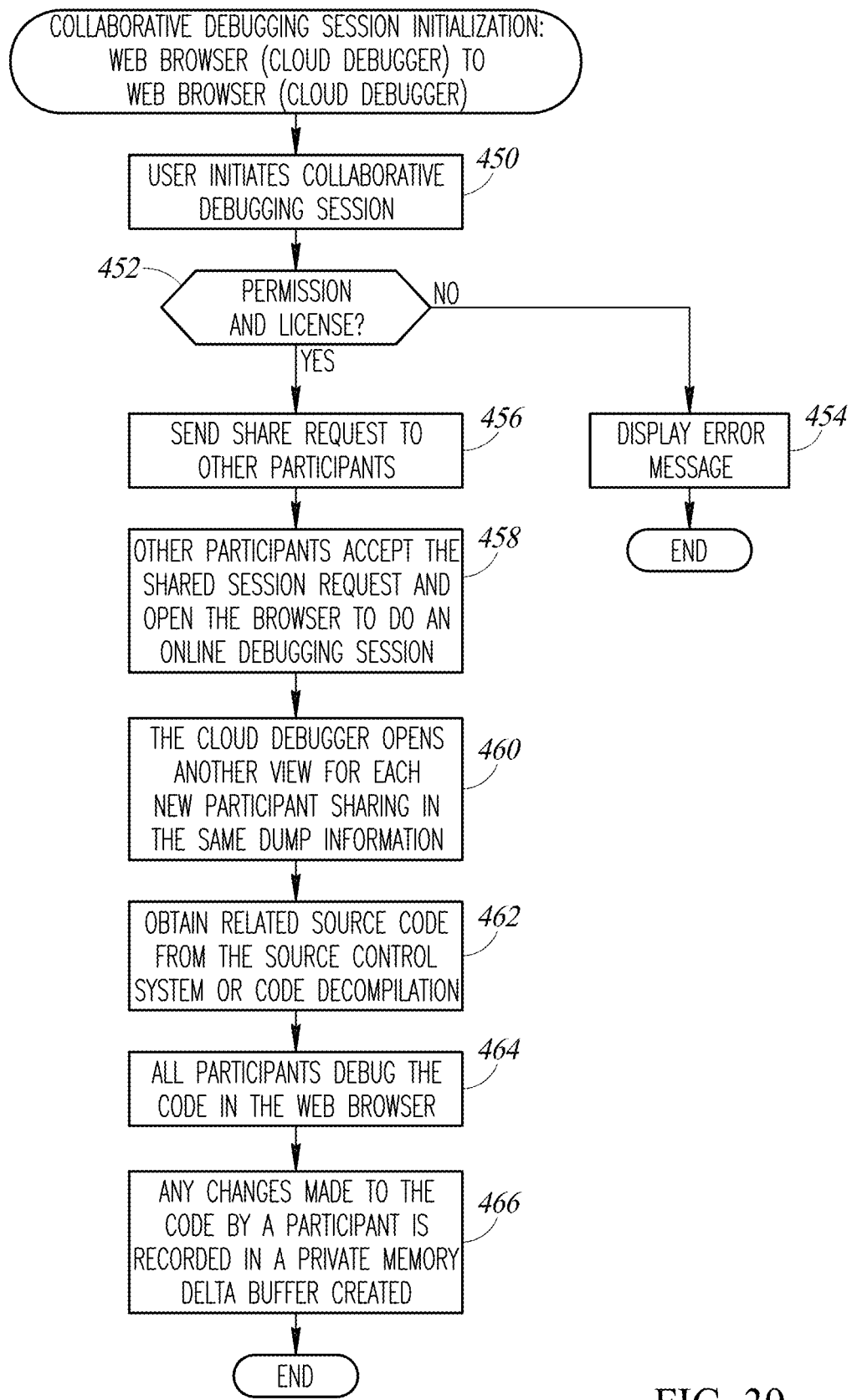
FIG. 39 is a flow diagram illustrating an example collaborative debugging session initialization from web browser (cloud debugger) to web browser (cloud debugger)

A flow diagram illustrating an example collaborative debugging session initialization from web browser (cloud debugger) to web browser (cloud debugger) is shown in FIG. 39. When the user requests to share their debugging session, the debugger initiates the debugging session (step 450). First, permission and license are checked whether the user is allowed to initiate the session (step 452). If they are not authorized, an error message is presented to the user (454) and the method ends. Otherwise, a share request is sent to one or more other participants (step 456). The other participants accept the shared session request and open their web browsers to start the online debugging session (step 458). The cloud debugger opens another view for each of the new participants sharing the same dump file (step 460). The related source code is then obtained either from the source control system or by performing code decompilation (step 462). All participants at this point debug the code in their web browser using the shared dump file (step 464). Any changes made to the code by a participant is recorded in a private memory delta buffer created for each participant (step 466).

Figure 40:
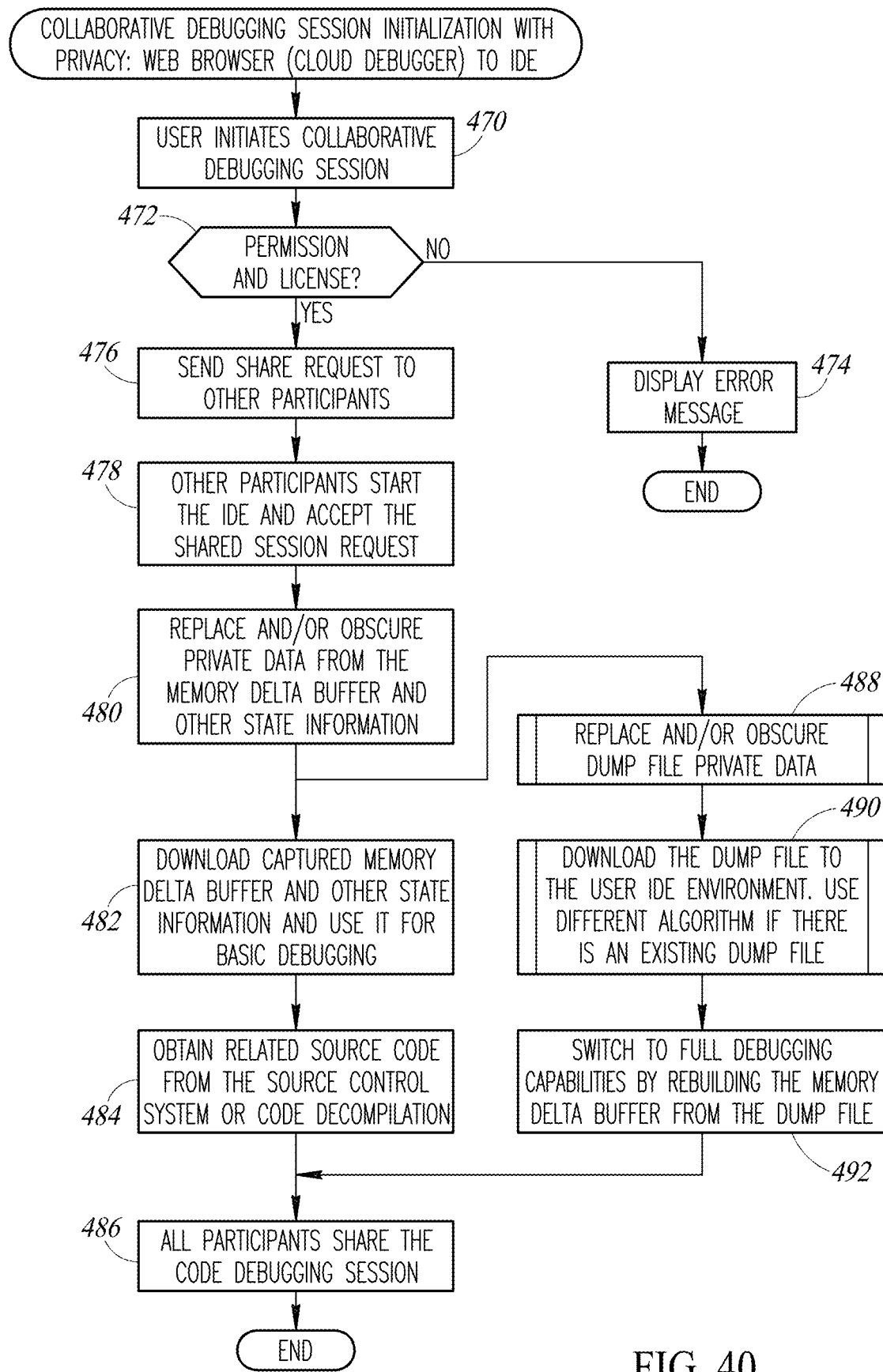
FIG. 40 is a flow diagram illustrating an example collaborative debugging session initialization from web browser (cloud debugger) to IDE with privacy option set.

A flow diagram illustrating an example collaborative debugging session initialization from web browser (cloud debugger) to IDE with privacy option set is shown in FIG. 40. When the user requests to share their debugging session, the debugger initiates the debugging session (step 470). First, permission and license are checked whether the user is allowed to initiate the session (step 472). If they are not authorized, an error message is presented to the user (474) and the method ends. Otherwise, a share request is sent to one or more other participants (step 476). The other participants start their IDE application and accept the shared session request (step 478). In the event redaction of private data option is set, the private data in the memory delta buffer and other state information is replaced or obscured using the redaction techniques described in more detail infra (step 480). The captured memory delta buffer and other state information is then downloaded and used for basic debugging until the dump file is received (step 482). The related source code is then obtained either from the source control system or by performing code decompilation (step 484). All participants at this point share the code debugging session using the captured memory delta buffer (step 486). Contemporaneously, the method downloads the dump file to the user IDE environment, and uses a difference algorithm if an existing dump file is present to reduce the amount of data to be sent to the IDE (step 490). The debugger switches to full debugging capabilities by rebuilding the memory delta buffer from the dump file once received (step 492) and the code is debugged using the new memory delta buffer (step 486).

Figure 41:
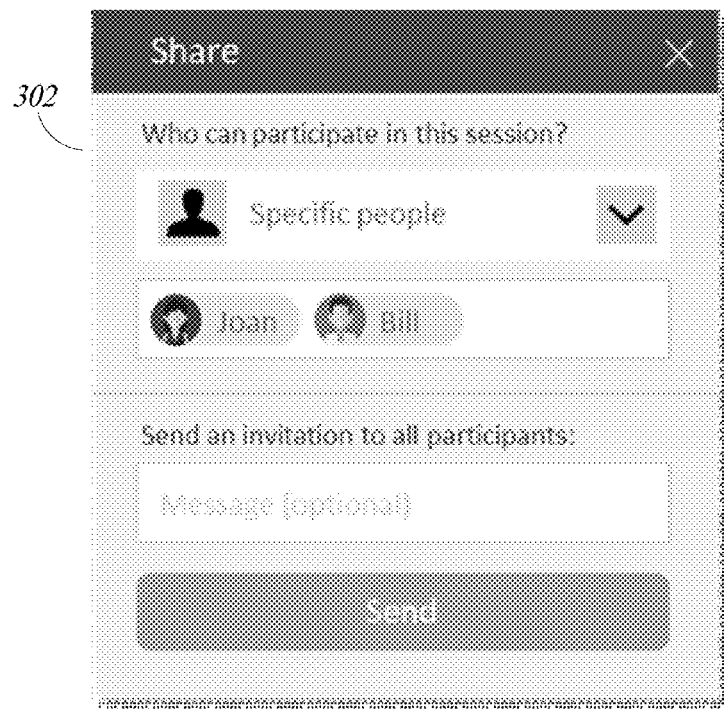
FIG. 41 is a diagram illustrating an example sharing window inviting several participants to a collaborative debugging session.
Figure 42:
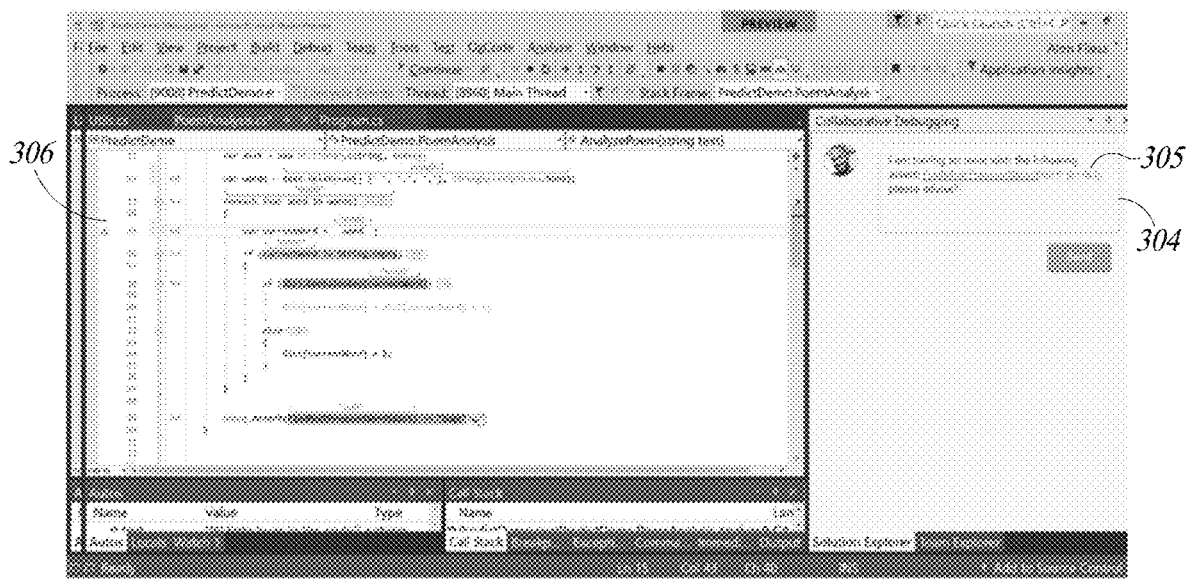
FIG. 42 is a diagram illustrating a second example IDE based debugging window including a chat window.
Figure 43:
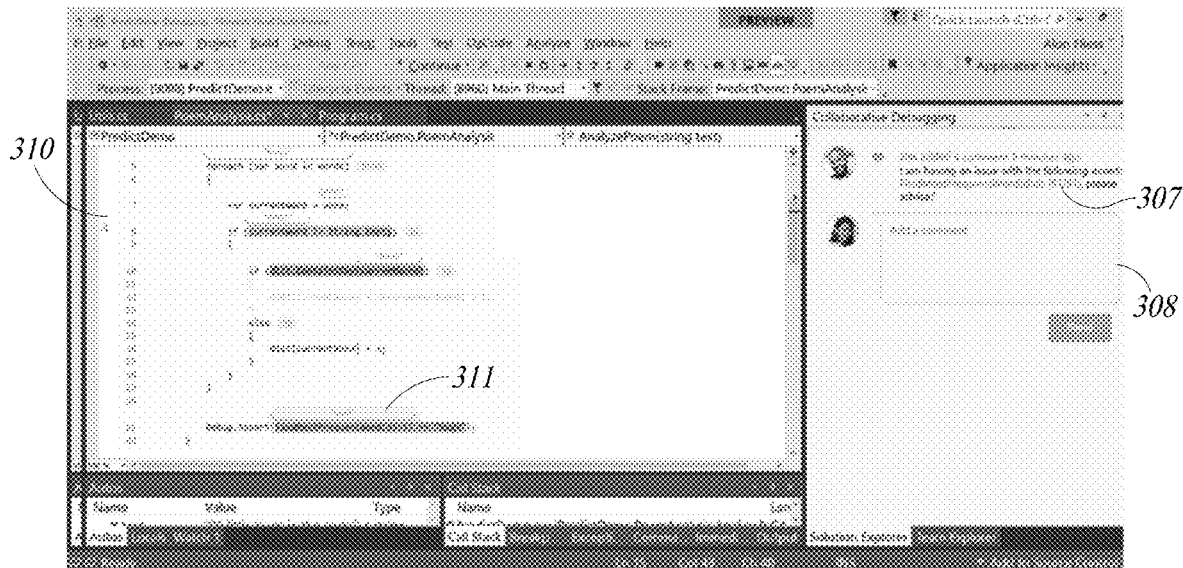
FIG. 43 is a diagram illustrating a third example IDE based debugging window incorporating a chat window.

To illustrate the operation of the collaborative debugger mechanism of the present invention, consider the following example. A diagram illustrating an example sharing window 302 inviting several participants to a collaborative debugging session is shown in FIG. 41. Multiple participants can use the asynchronous messaging service of the debugger to communicate with each other. Jim, a developer, seeks for help from Bill and Joan on a problem with the application. As shown in FIG. 42, Jim writes details 305 about the problem in a chat window 304 provided by the IDE based debugger next to the code window 306. In FIG. 43, Joan sees Jim's message in her IDE environment next to the code window 310. The request that Jim wrote includes a point in time link 307 to the code. Joan can write a response in box 308. The link steers her to a specific location in the code and to a specific point in time in the code's execution, e.g., iteration 81 out of 81 total iterations. As described supra, when debugging participants share a point in time link, they actually share the location in the source code as well as the execution context, i.e. the state of the program at that exact location, including the specific version of the source code, e.g., git commit hash and the state of the program variables. Sharing point-in-time locations enables rich communication. When Joan presses the point-in-time link 307, the current context is moved to iteration 81 and the assert line 311 is highlighted which is the area Jim found to have a problem and asked for assistance.

Figure 44:
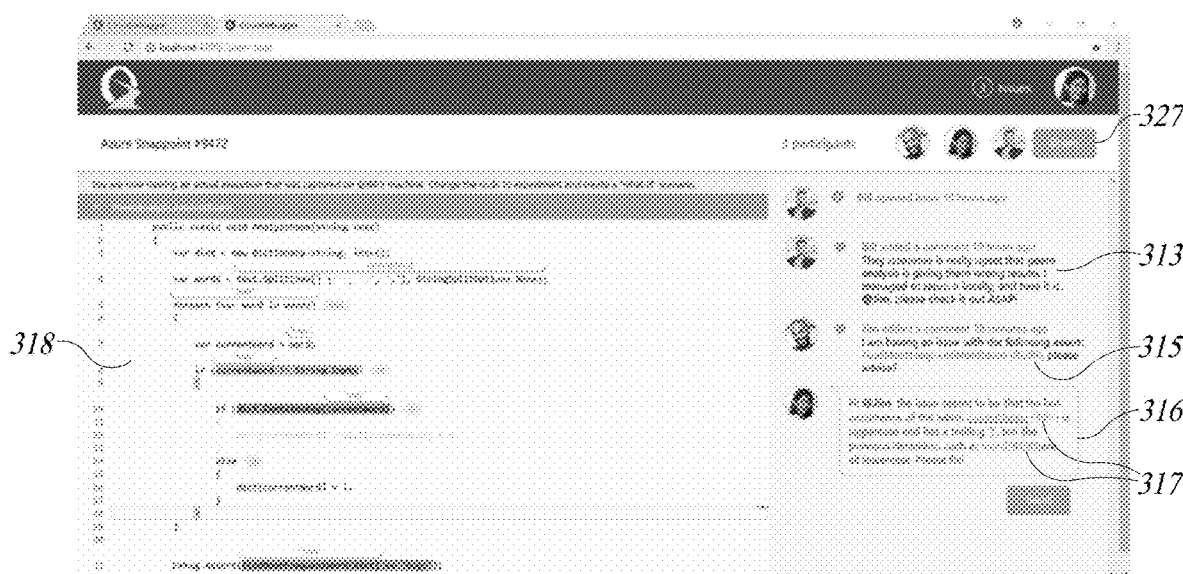
FIG. 44 is a diagram illustrating a fifth example web browser debugging window incorporating a chat window.

In FIG. 44, Joan has switched to a web browser based debugging session. A share button 327 in the upper right can be used to invite additional participants to the session. As indicated, Bill found an issue 313 about 10 hours ago. Jim received the request and consulted Joan and shared link 315. In this case, Joan uses a web interface instead of an IDE to collaborate. Using web based, application based, or non-IDE based tools as clients for the cloud debugger frees the team to work from anywhere on the globe, using any device and any operating system that can host a web browser.

Figures 45, 46:
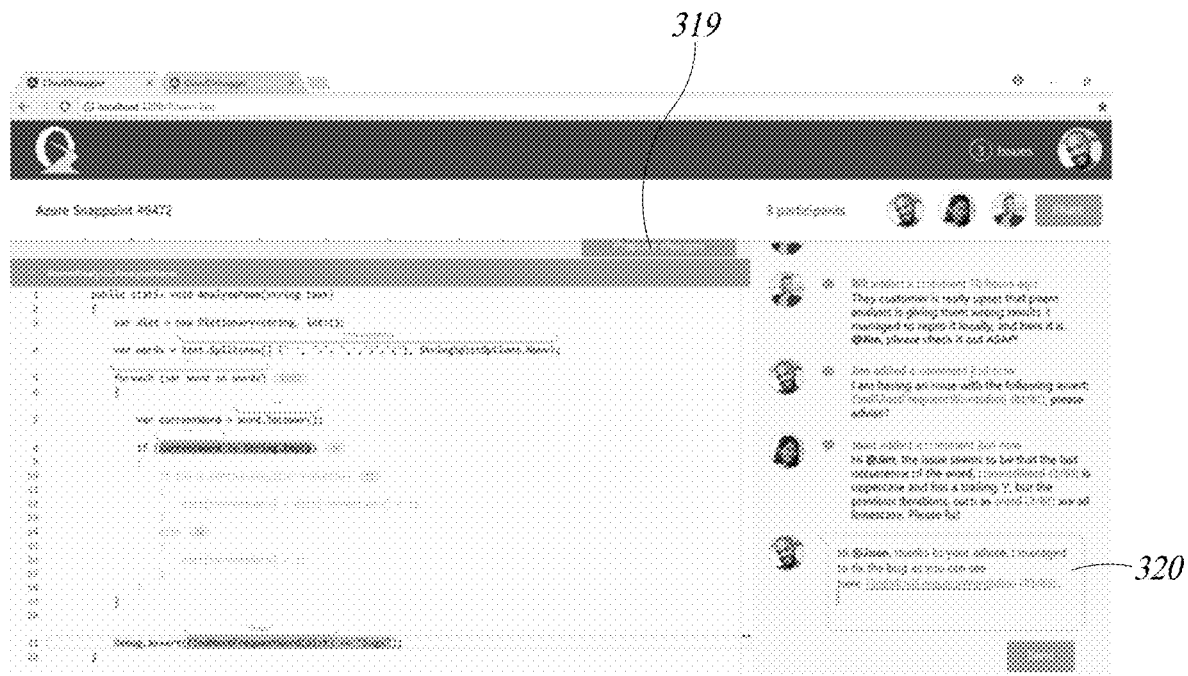
FIG. 45 is a diagram illustrating a sixth example debugging window.
FIG. 46 is a diagram illustrating a seventh example web browser debugging window incorporating a chat window.

Joan, as a veteran developer finds the root cause of the problem and explains it to Jim in box 316 by adding two point-in-time links 317. Armed with this knowledge, Jim starts a speculative what-if scenario as shown in FIG. 45. Note that Jim can do this either from the IDE or from the web browser. Jim edits the code and gets an immediate response from the debugger, as part of a live coding/debugging experience. As describes supra, the debugger uses the information that was captured by (1) utilizing a production debugging snapshot as described in U.S. Patent Publication No. 2015/0143344, entitled "Diagnosing Production Applications," incorporated herein by reference in its entirety, or (2) using a dump file that was uploaded from an IDE to enable the what-if scenario analysis.

Figure 47:
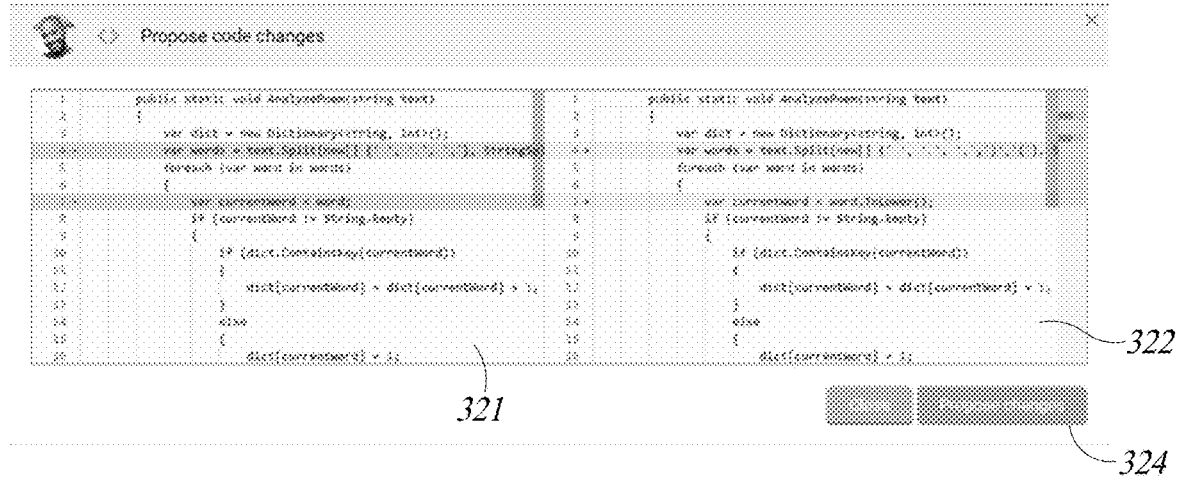
FIG. 47 is a diagram illustrating an eighth example debugging window showing proposed code changes.
Figure 48:
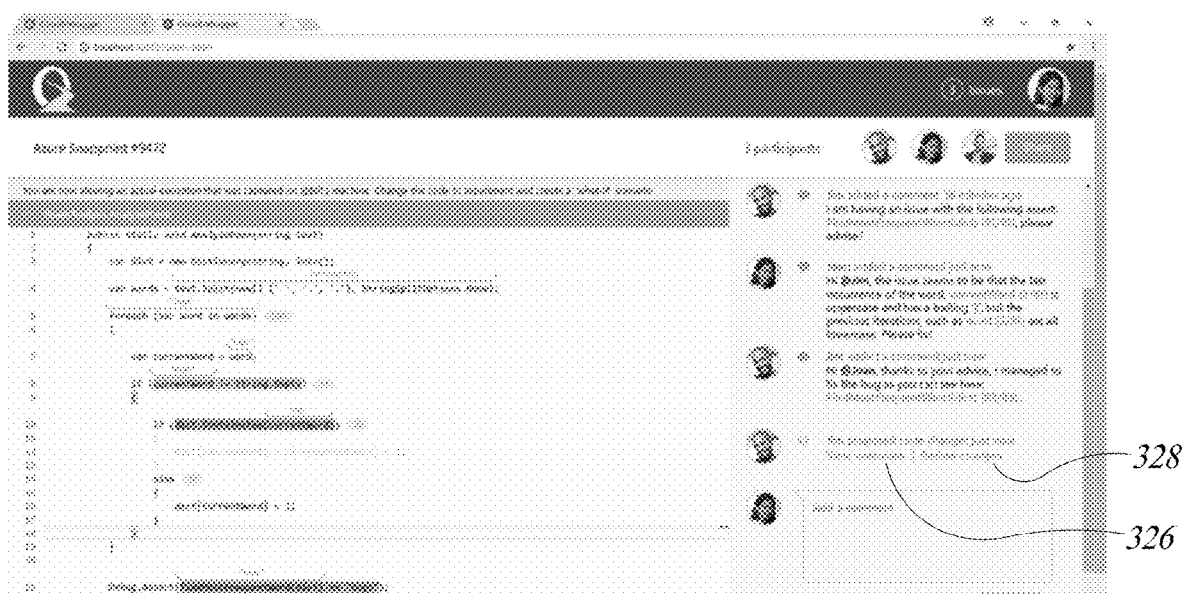
FIG. 48 is a diagram illustrating a ninth example web browser based debugging window incorporating a chat window.
Figures 49, 50:
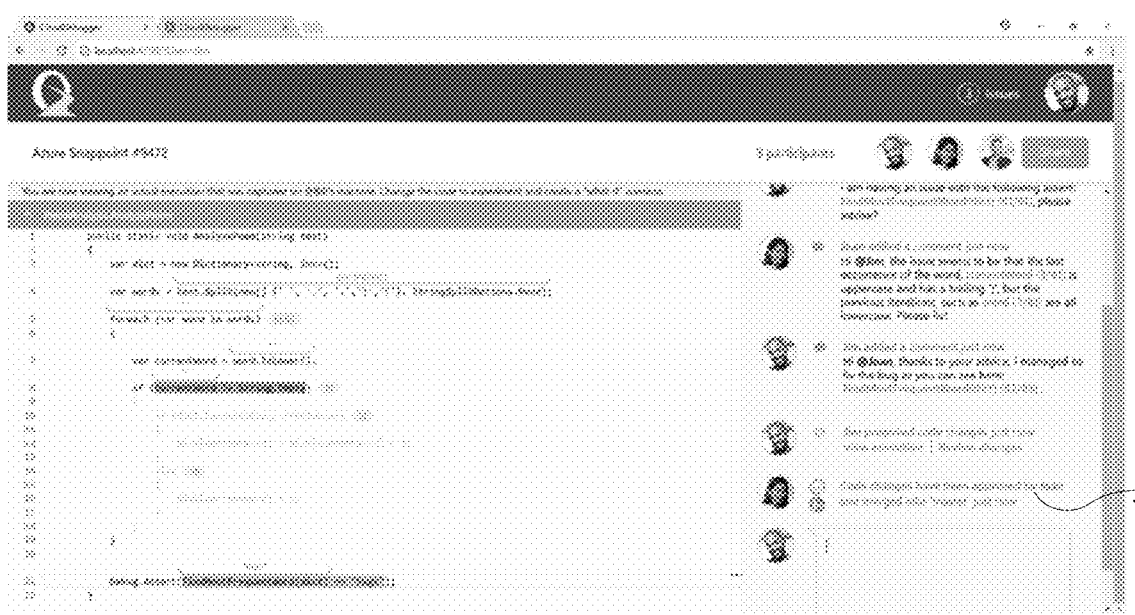
FIG. 49 is a diagram illustrating a tenth example debugging window requesting approval for a code bug fix.
FIG. 50 is a diagram illustrating an eleventh example web browser based debugging window incorporating a chat window.

As shown in FIG. 46, Jim solves the problem and tells Joan in box 320 that he thinks he fixed it and provides a point in time link. A button "Propose Changes" is provided that Jim can use to offer a solution. In response to pressing the Propose Changes button 319, the original code 321 and code with Jim's changes 322 are shown for inspection in FIG. 47. Once Jim is satisfied with changes, he submits the change by pressing the "propose Changes" button 324. In response, in FIG. 48, Joan sees in her chat window that Jim offered a code change proposal that fixes the bug. Joan is provided two links: "View Execution" 326 and "Review Changes" 328. As shown in FIG. 49 clicking "review changes" allows Joan to view the code execution before (330) and after (332) the change and exploit a fully interactive debugging experience with each. Joan inspects the change using a diff window. Joan can approve the change by clicking on "Approve bug fix" button 334. As shown in FIG. 50, once the changes are approved, an indication in the chat box 336 is generated. In one embodiment, once approved, the changes are sent to the source control system which then triggers a continuous delivery pipeline.

Thus, asynchronous collaborative debugging enhances the DevOps process, by providing rich messaging between (1) the field professional that usually is the first to find production debugging problems, (2) the development team including veteran team leaders and architects, and (3) to the developer that is responsible for the buggy code.

In the scenario described supra, Jim fixed the problem and Joan approved it and automatically merged the change with the source control system. If the team uses development management tools, e.g., Azure DevOps, JIRA, etc., the collaborative debugging is farther integrated into the development and operation process. For example, Microsoft Azure DevOps is a well-known cloud service for collaborating on software development. Integrating the collaborative debugger with development management services such as Azure DevOps, JIRA, and source control systems such as Git, enables advanced problem mitigation scenarios.

Figure 51:
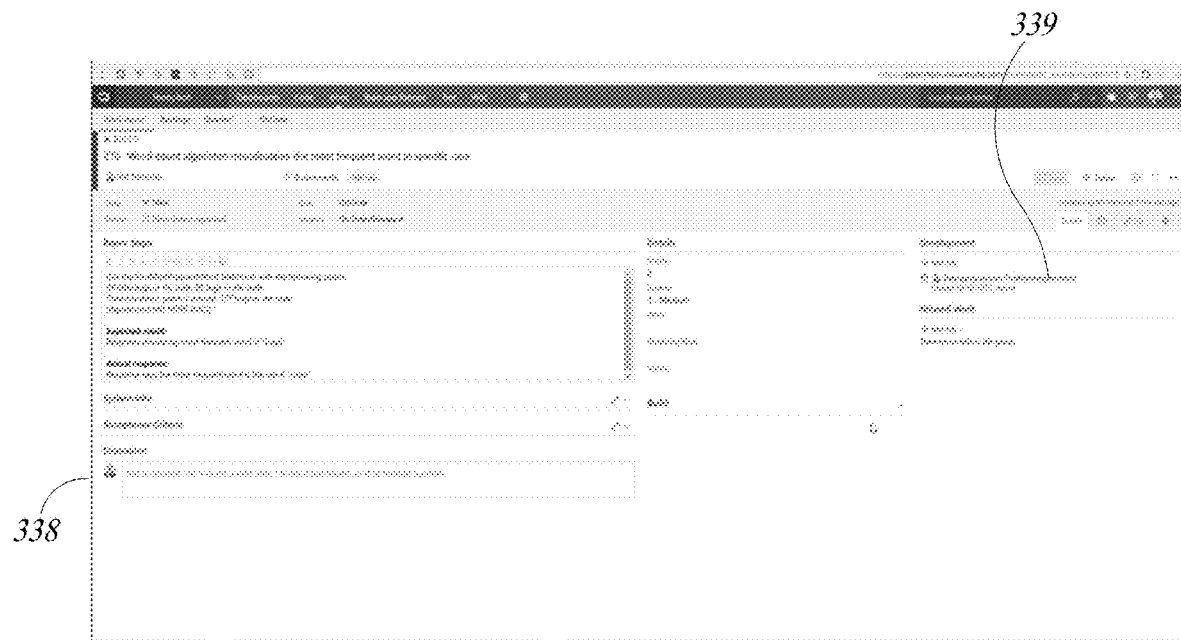
FIG. 51 is a diagram illustrating a window from an example bug tracking system.

A diagram illustrating a window from an example bug tracking system is shown in FIG. 51. For example, the DevOps person Bill has opened a bug ticket 338 in the bug tracking system of Azure DevOps. The Azure DevOps work item is used by the development team to track their progress and is correlated with the collaboration debugging session 339. Clicking on the link opens the collaborative debugging session exactly in the state it was left. The integration with a tool such as Azure DevOps provides additional metrics and tracking capabilities. A user that opens the work item and enters the cloud debugging session several years later, for example, will be able to perform postmortem analysis of old problems by entering a fully interactive cloud debugging session since the state of the debugging session is archived. The cloud debugging session, and the accompanying conversation and proposed code changes, are an artifact documenting the root cause analysis of a software defect and is correlated to the specific version of the software in which the defect was originally reproduced.

Note that integrating with a source control system provides the ability to easily extract the source code version used to build the code being debugged. With production debugging, or even with bugs that are found during QA, a big problem faced by developers is how to correlate between the binaries being tested or deployed upon which the bug was reproduced, including the exact matching version of the source code files used to compile them. As is typical, developers continue to implement new features for the next version of the software. Thus, the source code on their local machine is completely different than that deployed or being tested. Integrating the collaborative debugger with the source control system, enables the debugger to pull the correct version being debugged. Moreover, using the cloud debugger, developers are able to fix the problem with no need to go back to an older version of the source code on their development machine which sometimes require the installation of old IDEs and even old versions of the operating system.

Note that in one embodiment, if the collaborative debugger cannot access the source code from the source control, it utilizes a decompiler to create a source code file from the software binaries. The advantage is that the resulting code is highly correlated with the program being debugged. The experience of looking at decompiled code, however, is less convenient as the developer is likely to miss important aspects of the original source code such as variables name, formatting, and code comments.

Note also that a typical challenge in debugging is performing a root cause analysis on defects where the core of the problem is not isolated to one particular code fragment but rather requires the developer to understand a chain of causality, putting breakpoints in various pieces of code in order to fully understand both cause and effect. In modern software architecture, a business request passes through numerous layers, stages, services and microservices. Debugging such a system is therefore a challenging task. To overcome these challenges of problem solving in complex distributed systems, in one embodiment the cloud debugging session includes multiple dumps coming from multiple services. Thus, the developer must take multiple memory dumps from each service which then must be correlated with the original business request.

Figure 52:
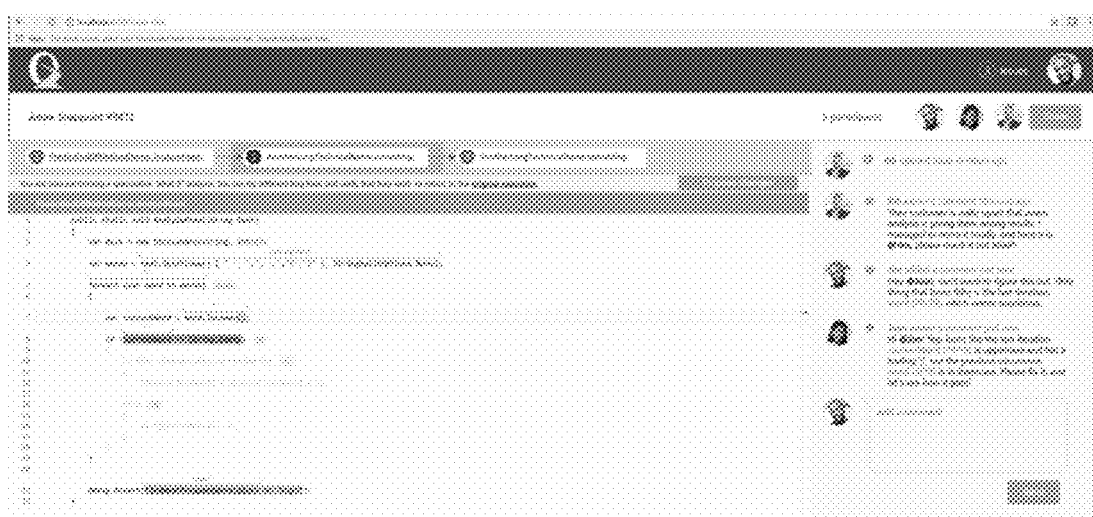
FIG. 52 is a diagram illustrating a twelfth example web browser based debugging window incorporating a chat window.

The collaborative cloud debugger of the present invention provides a solution by leveraging technologies such as Microsoft Azure Application Insights correlation-id, which enables the correlation of events across different services. Utilizing this technology, the cloud debugger adds the different dumps to a single cloud debugging session as shown in FIG. 52. It is advantageous to have multiple dumps from multiple production debugging sources of the same logical flow (i.e. business request) in one place. Each cloud service has its own associated host environment. Typically, applications include call chains from hop from service to service. The debugger of the present invention combines all the services into a single collaborative debugging session. In addition, the debugger provides the developer the ability to add a point-in-time link that spans all of these moments in time, even if they span multiple services.

The mechanism of combining multiple point in time links from several dump files into a single debugging session is based on having a collection of debugging sub-sessions. Each debugging session contains the session id (based on process id, or any other unique identifier from the hosting environment of the process), process dump file, memory delta buffer, and CPU and thread state. The mechanism functions to take a single time-travel debugger session from each service and unite them enabling the user to navigate between the debugger sessions whenever the user moves from one service context to the other. Table 8 below shows the data structure of a multiple process debugging session.

TABLE 8

Multiple Process Debugging Session Data Structure

| Field | Description |
| --- | --- |
| version_id | The version of this data structure |
| business_request_correlation_id | Represents the call chain |
| debugging_sub_sessions | A collection of debugging sessions that take part in the combined session |
| session id | The debug session id |
| memory_delta_buffer | The memory delta buffer of a specific session |
| process_state | The state of the process such as CPU core register values, thread related data, etc. |
| dumpfile | The dump file of the sub-session |

The developer can jump between the different functions in the different services the same manner as if it they were debugging a single process on their local machine. This greatly simplifies the debugging process when multiple services are used in the application to be debugged. Note that using (1) the correlation-id defining the entire flow between services as well as (2) the result of each service derived from the specific service debugging sub-session memory delta buffer), a what-if scenario performed by the user in one service can change the input value of another service in the call sequence. This provides developers the appearance that they are debugging a single process session, while in fact they are debugging a cross process (service) flow.

Figure 53:
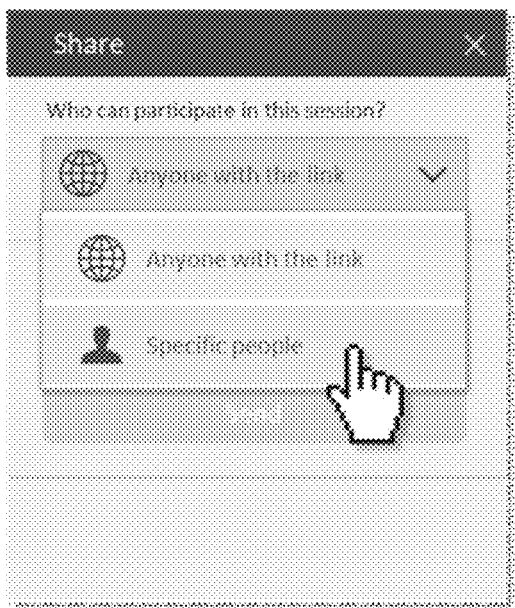
FIG. 53 is a diagram illustrating a first example dialog for configuring participation to the debugging session.
Figure 54:
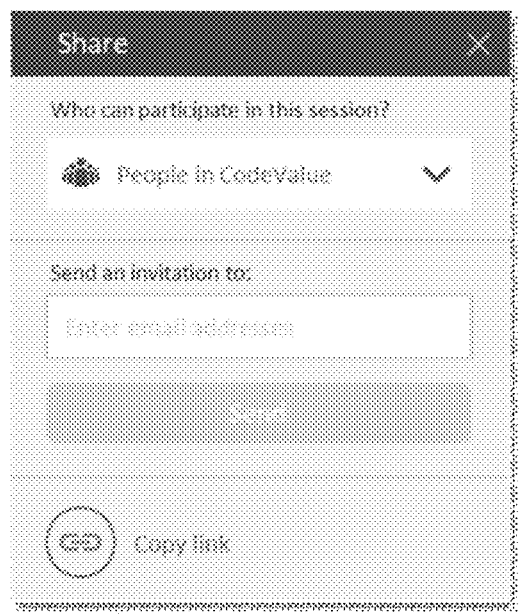
FIG. 54 is a diagram illustrating a second example dialog for configuring participation to the debugging session.
Figure 55:
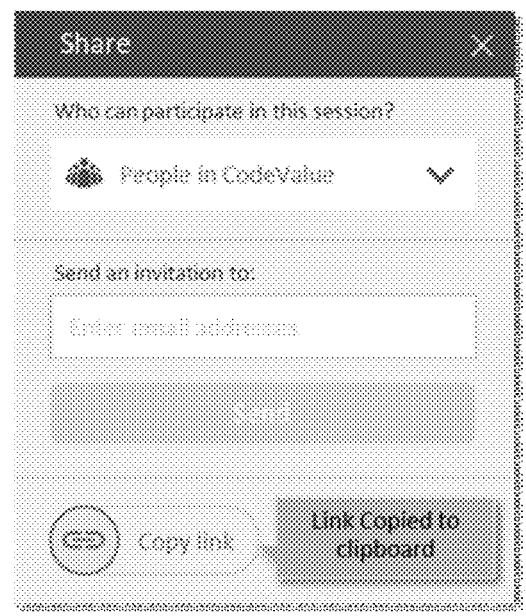
FIG. 55 is a diagram illustrating a third example dialog for configuring participation to the debugging session.

Regarding security, a collaborative debugger may introduce a security risk to its users since a developer can invite others to share their debugging session, giving them access to the code. They may change the code and introduce security breaches and see information that was captured when the debugging session was started which often times includes sensitive and personally identifiable information from the production environment. In one embodiment, the collaborative debugger provides a security and permission mechanism that is managed by the organization administrator. First, an administrator defines whether public permission is available for all participants. This may be suitable, for example, for an open source project. When this option is enabled, a user can invite anyone to participate in the debugging session, e.g., individual, organization member, or anyone that can receive the share session link as shown in FIGS. 53, 54, and 55. When public permission is enabled, users receive an email asking them to participate in the debugging session, regardless of who the user is and if they are part of the organization. As example email invitation is shown in FIG. 56. If the public permission option is disabled, only specific users can take part in the debugging session. Administrators have an access to the list of users in the enterprise that are eligible to use the collaborative debugger. Administrators can set user names and passwords and are able to add, edit, and remove users.

In one embodiment, the collaborative debugger integrates with identity and authorization services such as Active Directory, etc. For each user and group of users in the organization, the administrator gives access to view code and chat messages, to edit and propose fixes, and to approve and accept changes. To provide security mechanisms, the debugger leverages either a role based or claim based security mechanism. In the role base security mechanism, the administrator assigns a developer to a group of users that have permission to share and participant in a debugging collaborative session for a specific project. The user identity and the groups that the user belongs to are passed in the security token when calling the cloud debugger, enabling the debugger to grant or prevent access. The administrator can create groups for viewing only, or for proposing and accepting code changes. If a developer is a member of the project viewer group, they can see the code but not change it. In the claim base security model, the debugger checks whether the developer poses a specific set of claims, a claim for viewing the code, a claim that enables editing the code, and a claim that determines whether the developer can accept changes in the code. The administrator provides these claims to each user, and the claims populate a security token that is passed and used by the debugger.

Redaction of Sensitive Information

In one embodiment, sensitive information is obscured in the production debugging session. With reference to FIG. 4, since the cloud debugger is hosted in an isolated environment, it is impossible for a developer/user to access the original dump file information. The cloud debugger accesses the dump file and prevents direct access by users. The cloud debugger is operative to replace sensitive information in the dump file on the fly, thus developers never see the original values stored in the dump file thereby safeguarding customer information privacy and adhering to privacy regulations such as the European Union's General Data Protection Regulation (GDPR).

In one embodiment, the debugger itself is hosted in the cloud. The cloud debugger is operative to redact/replace sensitive private information in the cloud. Developers using the cloud debugger cannot access the dump file and can only see non-sensitive information. If the dump file is downloaded for debugging within the IDE, only a redacted dump file 76 is transferred having no sensitive information. The original dump file is thus never accessible to the developer.

To obscure sensitive information, the cloud debugger 74 (also referred to simply as "debugger") first obtains a dump file 88 and/or log file 90 generated by the production code system/services 82, which has access to the production database 84 holding sensitive information. The debugger pre-processes the field values before starting the debugging session or at the startup thereof. In order to obtain access to the dump file, the cloud debugger is configured with the required access keys and connection string(s) to the organization cloud storage account which may be manually obtained and entered or obtained programmatically via the access credentials database 75.

Initially, the developer indicates to the debugger the sensitive properties and fields in the source code. The developer can either (1) instrument (i.e. annotate) these properties in the source code itself or (2) provide a configuration file for the same purpose. Alternatively, the sensitive item list can be assembled via a user interface (UI). An example of a class annotated with sensitive information hints is shown in FIG. 57. In this example, "SensitiveDebuggingInformation" is used to signal to the debugger that the subsequent variable contains sensitive information. Using such an annotation, the debugger algorithm can determine which variables are sensitive and which are not.

The developer can choose to protect all properties and fields of a complex type, or specific fields and properties within the type. The developer also provides a property type hint that indicates the purpose of the target property with regard to the type of value it holds. For example, the property type hint marks a property as a first name, last name, number, unique id that can be correlated to a person (directly or indirectly), currency, or any other common data type.

In FIG. 57 the Person class is annotated with a SensitiveDebuggingInformation hint. This means that all fields and property values of the class, coming from a memory dump are to be obscured. The NationalInsuranceNumber property is treated as sensitive since the whole class is annotated as such, regardless that fact that it itself does not have an annotation. The Gender property value will reflect the real production environment value since it is annotated as non-sensitive (i.e. SensitiveDebuggingInformation.Ignore).

The cloud debugger then obtains the dump file 88 from cloud storage 86 written previously by the production code system/services 82. Once the dump file is obtained, the debugger determines which fields and properties possess sensitive information. In one embodiment, the source code is annotated with information regarding which variables contain sensitive information as described supra.

Alternatively, information regarding sensitivity may come from a configuration file. In this case, either the original code can be instrumented before the compilation, resulting in code similar to that of FIG. 57, or the configuration information can be deployed as part of the product deployment assets.

The debugger algorithm then steps through all the memory locations of variables in the dump files that hold sensitive data. Utilizing standard dump debugging tools (e.g., WinDbg, a multipurpose debugger for the Microsoft Windows operating system or debugger support libraries such as DbgHlp.dll and ImgHlp.dll in Windows and gdb functions in Linux), the debugger algorithm reads and changes the values in the memory dump file. Alternatively, a fork can be made and the obscuring of sensitive information may be performed as part of writing the fork memory to disk. The debugger algorithm holds an internal data structure for this purpose. The data structure has a table of variables, their types, original values and replacement values. In this embodiment, the replacement value consists of obscuring text such as '****', "123", "$%#@$%", or any other non-meaningful obscuring text.

Figures 58, 59:
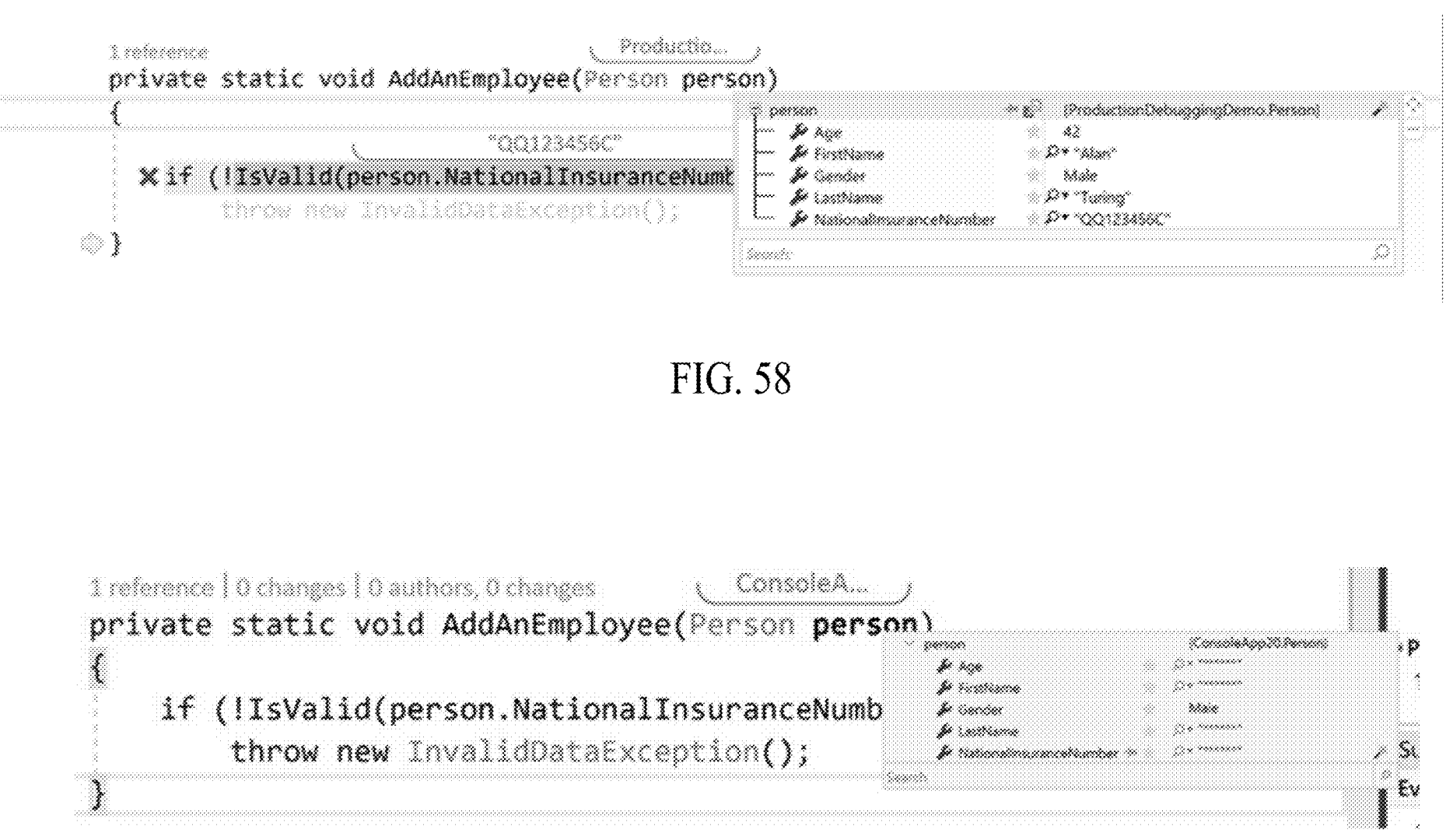

A diagram illustrating an example of standard production debugger values is shown in FIG. 58. In this example, the properties of a 'person' of type 'Person' includes Age, FirstName, Gender, LastName, and NationalInsuranceNumber. The values shown for these properties are the original sensitive values.

A diagram illustrating an example of obscured production debugger values in accordance with the present invention is shown in FIG. 59. In accordance with the invention, the debugger has analyzed the dump file and determined that several of these properties are sensitive. Thus, the values of the sensitive fields have been replaced with obscuring text '****'. Note that the Gender property has not been obscured since it is annotated in the source code as non-sensitive (i.e. SensitiveDebuggingInformation.Ignore). In addition, NationalInsuranceNumber is obscured even though there is no specific annotation. This is because the entire class Person definition is annotated "[SensitiveDebuggingInformation]".

Figure 60:
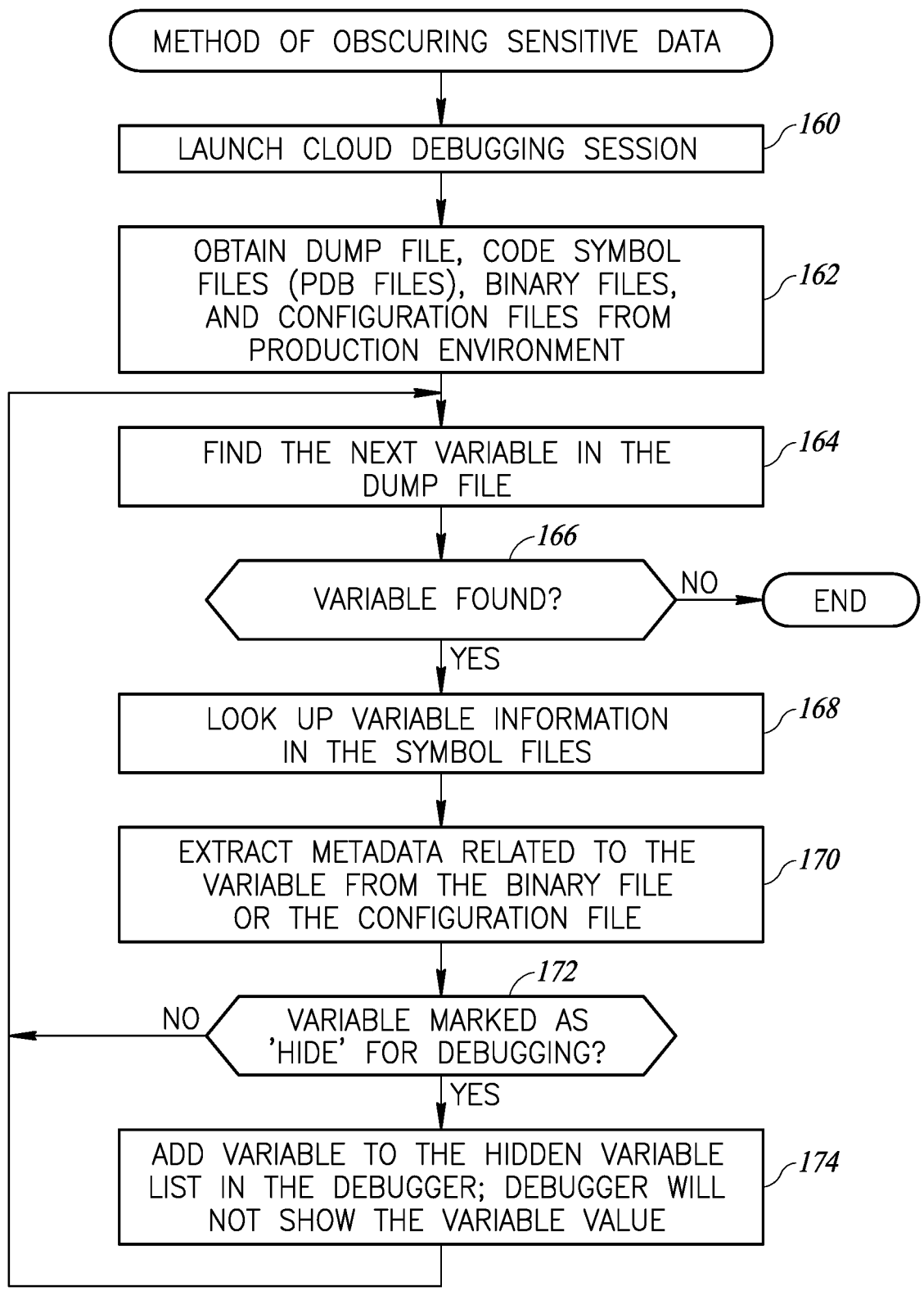
FIG. 60 is a flow diagram illustrating a method of obscuring sensitive data in a production code debugging session.

A flow diagram illustrating a method of obscuring sensitive data in a production code debugging session is shown in FIG. 60. With reference also to FIG. 4, after launching the cloud debugging session (step 160), the debugger 74 obtains the dump file 88 from cloud storage and reads it into its memory. The debugger also obtains one or more code symbol files (e.g., PDB files) 85, binary files 87, log files 90, and configuration files 89 from the production environment 70 (step 162).

The debugger than searches through the dump file looking for sensitive variables. The next variable in the dump file is found (step 164). If no further variables are found (step 166), than the method ends. Otherwise, the method looks up information related to the variable in the symbol files (step 168). The method then extracts metadata related to the variable from the binary file or the configuration file (step 170). If the variable is found to be marked as 'hide', 'hidden', 'obscure' or similar, (step 172), then the variable is added to the hidden variable list in the debugger (step 174). Once the variable is on this list, its real value will not be displayed but rather will be obscured with meaningless text such as '****'.

It is noted that obscuring or hiding sensitive information effective at keeping sensitive information from developers/users of the debugger. Sensitive information can be hidden by removing, encrypting, or otherwise replacing the sensitive information. There are, however, disadvantages with such an approach.

A first problem is that when developers need to solve a production debugging problem, many fields are replaced with arbitrary non-meaningful values. Instead of seeing a name field having the value "John", they see values such as "****", "123", or "$%#@$%" which are hard to understand and determine context. This makes the debugging experience very confusing and increases cognitive load.

A second problem is that program execution control flow may be affected by the data stored in the obscured fields. For example, consider if statement that checks whether the first name belongs to a certain group of names. The execution flow is different when the name field holds the value "John" versus the value "****". The developer will therefore not be able to ascertain whether the if statement was executed, nor will execution prediction and any subsequent logic for the if statement be able to be performed.

A third problem is that if all personally identifiable information is obscured or otherwise unavailable, and a certain problem can only be reproduced for a very small subset of users, there is no way to pinpoint and examine the faulty code paths that execute for the specific customer which reported the problem, even if the customer gives explicit consent for their personally identifiable information to be made available to the developers who are trying to fix the issue.

Replacing Sensitive Information

The debugger of the present invention enables redaction of sensitive information in production debugging environments and provides a better debugging process experience, solving the problems described supra. In particular, rather than simply obscure sensitive information, the sensitive information is replaced with meaningful fake data.

Firstly, the developer indicates to the debugger the sensitive properties and fields in the source code. The developer annotates those properties in the code or provides a configuration file. Alternatively, the list can be assembled via a UI. A diagram illustrating a second example of source code annotated with debugging information (i.e. sensitive information hints) is shown in FIG. 61. The developer can protect all properties and fields of a complex type, or specific fields and properties within a certain type. The developer also provides a property type hint that indicates the purpose of the target property with regard for the type of the value it holds. This hint can mark a property as a first name, or last name, a number, a unique id that can be correlated to a person (directly or indirectly), a currency, or any other common data types.

As shown in FIG. 61, the Person class is annotated with the SensitiveDebuggingInformation hint. This means that all fields and properties values of the class, coming from a memory dump must be obscured. The Gender property value will reflect the real production environment value since it is annotated as non-sensitive (i.e. ".ignore").

The debugger of the present invention thus is operative to present an alternative value for each property and replace sensitive user information with meaningful fake data. If the meaning of the property is unknown, the debugger presents a readable string, or a sequence number. For example, in the event the developer does not provide a debug hint for the type of the National Insurance Number, the debugger would replace the property value with a readable string such as "apple". The word "apple" is not a valid national insurance number. We note that in this case, obscuring the NationalInsuranceNumber with a random readable value would be very confusing. The developer, however, can still remember the value and can track it throughout the debugging session. the national insurance number value may be replaced by the word "apple".

As described supra, when debugging production code, the cloud debugger is operative to not show variable values marked as sensitive (or private). There are two options for the cloud debugger, to show the real value replaced with a fake value, or to hide the value and show stars or any other user interface indicator. For human developers, it is much easier to find problems in the code using values that provide some kind of context. Sometimes the replaced value can mislead developers and they will prefer to hide the values. Thus, in one embodiment, the debugger development environment comprises a user interface option such as a menu item, tool bar button, preferences or any other suitable means, to let the user choose whether to hide or replace one or more variables marked as private during the debug session, or even across debugging sessions.

Note that during the debug session, the behavior of the debugger regarding replacement values is consistent, i.e. it always presents the same readable string value and same number for all views of a particular field or property. If the developer provided a property type hint, the debugger replaces the original value with a value having the same purpose. For example, replacing the FirstName value from the production environment with a FirstName value from a predefined common FirstName table. A diagram illustrating an example JSON representation of a table of replacement values is shown in FIG. 62.

In another embodiment, a developer/user can provide a meaningful value to sensitive fields while debugging. When a user sees a value such as "FirstName", they can request the debugger/IDE to replace the value with a meaningful alternative value ("John", "Jack", etc.).

The values from the non-redacted production environment such as with a standard production debugger are shown in FIG. 58 described supra. As a result of searching and analyzing the dump file for sensitive variables, the debugger is operative to replace the sensitive information with meaningful fake information. A diagram illustrating an example of production debugger values replaced with fake values in accordance with the present invention is shown in FIG. 63. As shown, the only real information is the Gender property value that was marked 'to be ignored' in FIG. 61.

Note that in FIG. 63, the developer added an annotation for the National Insurance Number property and the debugger chose a valid value from a predefined National Insurance Numbers table. As shown in FIG. 63, the National Insurance Number has a different value from the one that is in the real production environment (i.e. FIG. 61), however it is a valid value and it does not change the code execution path.

Replaced values are indicated by a visual indicator to assist developers in understanding that the value shown is not the same value that came from the production environment. An example visual indicator 'fake' is shown in FIG. 63 next to the replaced text values.

In one embodiment, since there are many different property and field types, the debugger of the present invention enables developers to extend known common types by extending the SensitiveDebuggingInformation annotation and by providing a corresponding type value table for each additional type. Since a table (such as shown in FIG. 62) is limited by the amount of values it holds, and since the debugger guarantees that it will use the same value for all occurrences of a specific field instance, the values table needs to be large enough. To overcome the need to create large tables, the developer alternatively can provide a generator function to be used in place of value tables.

A diagram illustrating example source code for a custom generator adapted to generate replacement values in accordance with the present invention is shown in FIG. 64. The generator function shown is operative to generate valid National Insurance Numbers. It is appreciated, however, that a custom generator can be written for any data type as required by the particular implementation.

Figure 65A:
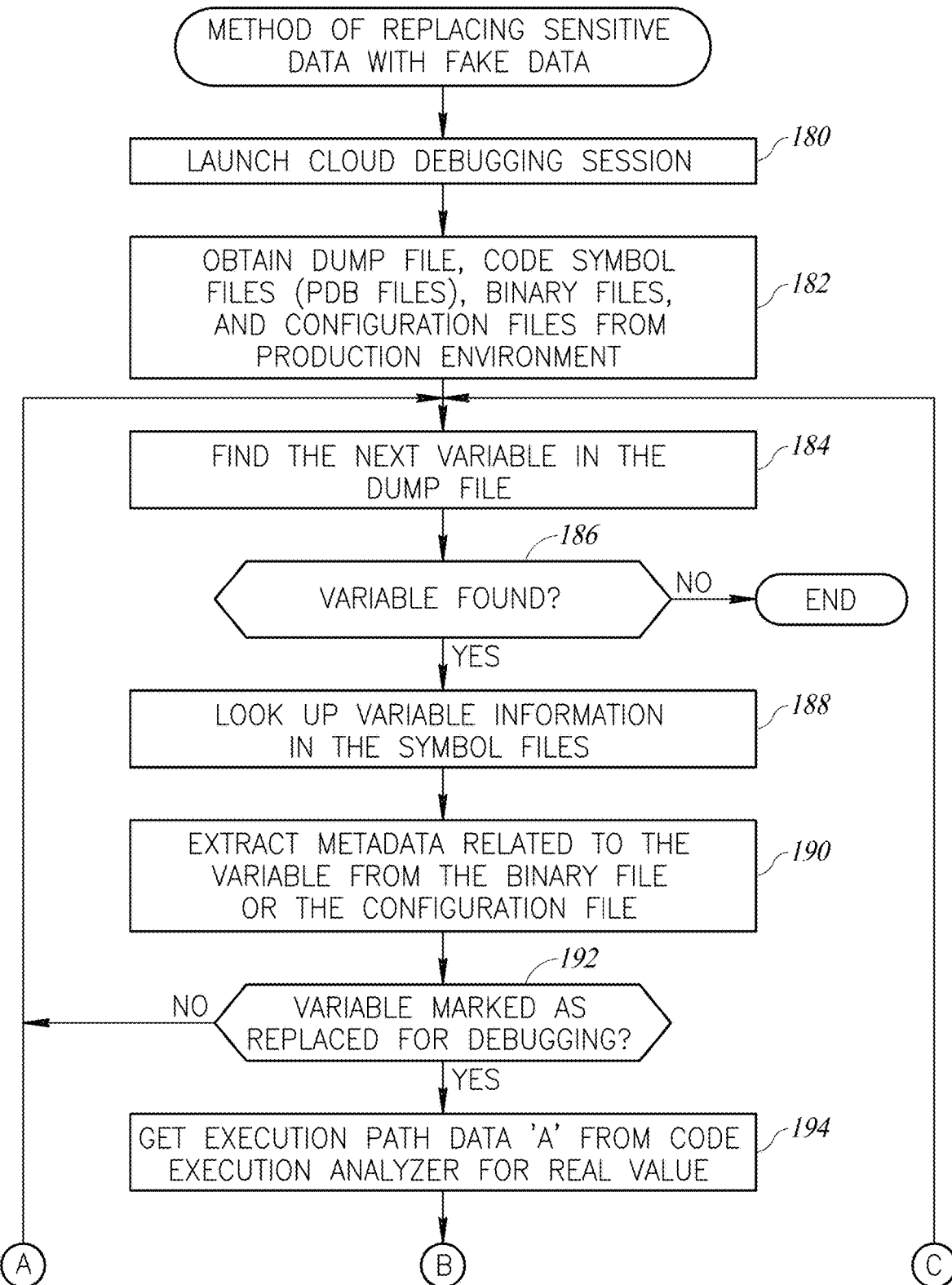
FIGS. 65A and 65B are a flow diagram illustrating a method of replacing sensitive data with fake data in a production code debugging session.
Figure 65B:
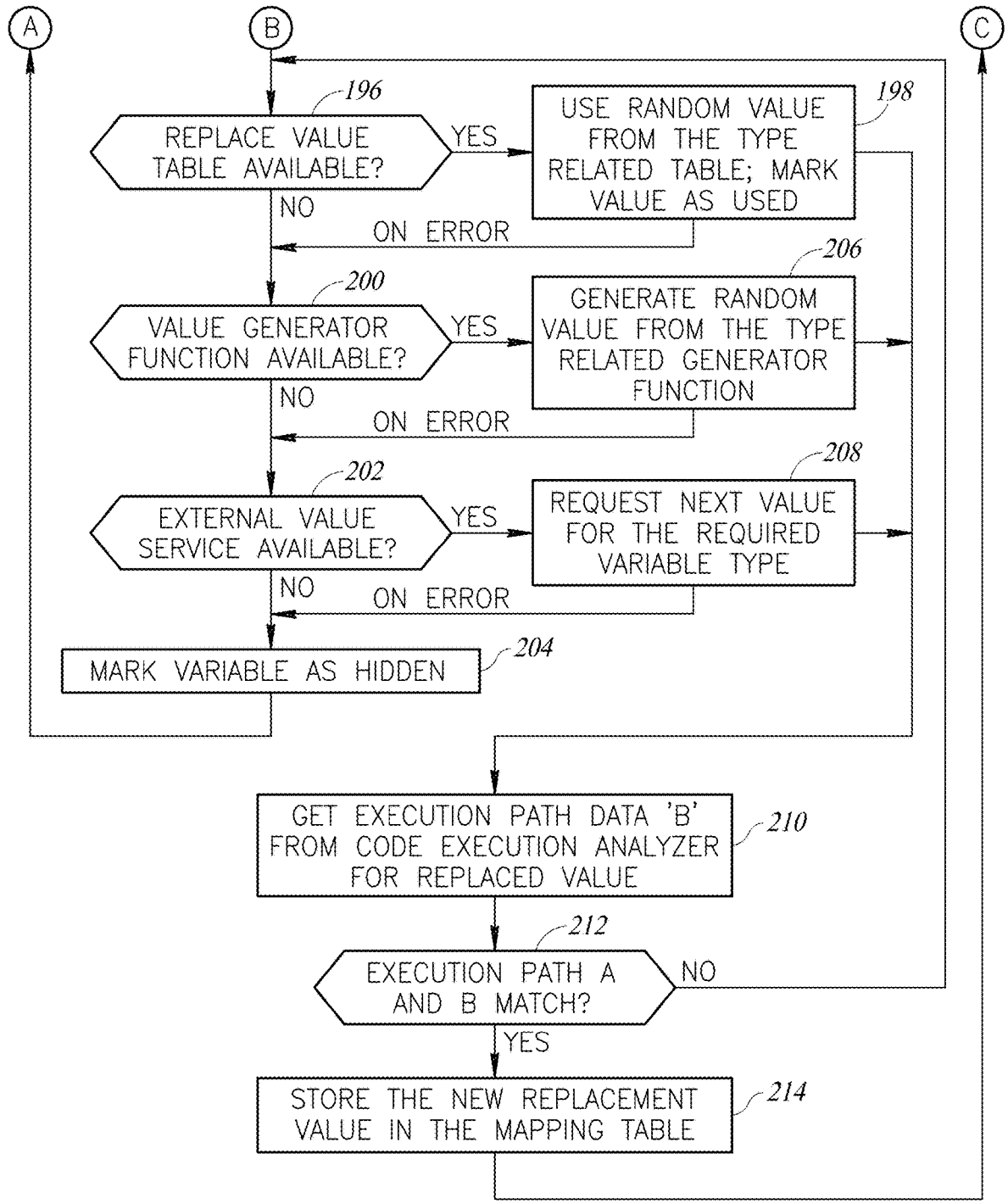

A flow diagram illustrating a method of replacing sensitive data with fake data in a production code debugging session is shown in FIGS. 65A and 65B. With reference also to FIG. 4, after launching the cloud debugging session (step 180), the debugger 74 obtains the dump file 88 from cloud storage and reads it into its memory. The debugger also obtains one or more code symbol files (e.g., PDB files) 85, binary files 87, log files 90, and configuration files 89 from the production environment 70 (step 182). The debugger than searches through the dump file looking for sensitive variables. The next variable in the dump file is found (step 184). If no further variables are found (step 186), than the method ends. Otherwise, the method looks up information related to the variable in the symbol files (step 190). The method then extracts metadata related to the variable from the binary file or the configuration file (step 190).

If the variable is not marked '_replace for debugging_' (step 192) the method returns to step 184 and the next variable in the dump file is found. Otherwise, the execution path (path 'A') for the real value (i.e. the value read from the dump file) is determined using a code execution analyzer (step 194). If an appropriate type related replacement value table is available (step 196), then a random value is read from it and the value is marked as used (step 198) and the method continues with step 210. Otherwise if an appropriate type related custom value generator function is available (step 200), then a random value is generated and used (step 206). Otherwise, if an external value service is available (step 202), then a value is requested for the required variable type to be used as the replacement value (step 208).

If neither a value table, generator function, nor external service are available, then the method defaults to marking the variable as hidden (step 204) and continues with funding the next variable (step 184).

Once a replacement value is obtained using either a value table, generator function, or external service, the execution path (path 'B') for the replacement value is determined using a code execution analyzer (step 210). If the execution paths 'A' and 'B' match (step 212) then the new replacement value is stored in the mapping table (step 214), otherwise an alternative replacement value is obtained and the method continues with step 196. Note that the cloud debugger is operative to generate a modified or redacted dump file 76 with replacement values for sensitive information. A replaced values files 78 storing candidate values for replacement is also stored in the cloud debugger memory.

In one embodiment, the debugger of the present invention is operative to check whether replacement values it has selected for sensitive information affect the flow of code execution. One problem that may occur is that since the value replacement algorithm of the debugger replaces values, the original code execution path may be altered which will likely confuse the developer. A diagram illustrating example code that enters a function during normal production execution is shown in FIG. 66. In this example, the value of variable Age is 42 (FIG. 58) and the expression p.Age<44 evaluates to true 100. The Education( ) function is therefore entered. Whereas in FIG. 67, the example code fails to enter a function during debug execution because of the replacement value chosen. In this case, the sensitive Age property value 42 was replaced with the fake value of 54 (FIG. 63). Now, the if statement p.Age<44 evaluates to false 102 and the Educate( ) function is not entered, thus changing the execution flow of the code.

Thus, in the debug session, the code does not enter the Educate( ) function, while in the real production environment the code execution path did enter the Educate( ) function. In one embodiment, to avoid artificially altering code execution flow, the debugger chooses values that result in the same code execution path, i.e. that does not alter execution flow. Since the debugger has access to the original dump file, it is able to analyze the original past and future execution path, and select replacement values that do not alter the execution path. This is highly desirable for achieving an effective debugging session.

An example technique of determining whether replacement data affects code execution will now be described. A diagram illustrating an example original Algorithm function is shown in FIG. 68. As shown, the original function has several optional paths within the code. Each if/else or trinary operator '?:' can fork the execution path to two different sub-paths. The debugger then inserts '_trace' statements 280 into the original code to generate instrumented code. A diagram illustrating an example syntax rewriting (i.e. instrumenting) of the instrumentedAlgorithm function is shown in FIG. 69. The code is instrumented with a tracing mechanism. In one embodiment, the debugger collects the execution path in a string variable '_trace' 280. It is appreciated, however, that the information can be collected using suitable graph representation data model. The source code now includes statements that implement a tracing function during runtime when the code is executed. The '_trace' statements are injected into the original code at strategic locations such as inside loops, decision points, variable updates, etc. The variable 's' is also calculated as in the original code. After execution, the value of 's' along with the trace results are compared between candidate replacement values.

If replacement data does not affect code execution, then the trace results and value of 's' after execution will match that of the original unredacted data. If the replacement data does affect execution then the trace and 's' values will differ.

A diagram illustrating an example function that determines whether candidate fake replacement data effects the original execution path is shown in FIG. 70. In this program, three data values are run through the instrumented code of FIG. 69, i.e. the original value "second" that is to be replaced with fake data and two candidate replacement values "hour" and "moscow". A diagram illustrating results of the execution of the program is shown in FIG. 71. As indicated, the 's' and trace results of both "second" 290 and "moscow" 294 are 150 and '124124124124124124123123123123', respectively, while those of "hour" 292 are 10 and '15151515151515151515', respectively. Since the value 's' and the trace of "second" and "moscow" match, it is concluded that both "second" and "moscow" have the same corresponding code execution path. Thus, "moscow" can replace "second" as fake data that will not alter the execution path of the original code.

Another side effect of replacing sensitive variable data that might confuse a developer is having a variable value that originally was the result of an expression that uses other sensitive variables. Since the new value is taken from a table (such as shown in FIG. 62), it lost the relation to the original value. For example, consider a field A, with the value of 2 (A=2), and a field B whose value is expressed in the code as A multiplied by 2 (B=A*2), and both A and B are marked as sensitive fields. In this situation, the result might be A=10, and B=5, or any other arbitrary value that the debugger chooses.

In one embodiment, to overcome this problem, the debugger utilizes any suitable well-known code analysis tool operative to find the correlation between fields, and to recommend the user omit the sensitive annotation of calculated fields, such as field B. Note that the debugger must assign the value for B by taking the scrambled value of A, for example 10, and evaluating the expression 10*2, resulting in a value of 20 for B.

Similar to the process of obscuring sensitive information, to redact sensitive data, the debugger first obtains the dump file and pre-processes the field values before starting the debugging session. Table 9 below shows the original variable values in the production debugging dump. These values correspond to those shown in FIG. 58.

TABLE 9

Production Side Dump

| | |
|---|---|
| Age | 42 |
| FirstName | Alan |
| LastName | Turing |
| Gender | Male |
| NationalInsuranceNumber | QQ123456C |

The debugger then steps through all the memory locations of variables in the dump files that hold sensitive data. For each original value found in the dump file there is one and only one corresponding identifier. Table 10 below shows the resulting dump file after the execution of the scrambling agent. For example, occurrences of 'Age' are replaced with identifier '1', occurrences of 'FirstName' are replaced with identifier '2', and so on. This dump, which does not contain sensitive information, is used by the cloud debugger for the debugging session.

TABLE 10

Replaced Value Dump

| | |
|---|---|
| Age | 1 |
| FirstName | 2 |
| LastName | 3 |
| Gender | Male |
| NationalInsuranceNumber | 4 |

The debugger takes the dump, along with knowledge of the data types that hold sensitive information, and the resulting identifier values, and replaces the values utilizing either the value tables (e.g., FIG. 62), a custom generator function (e.g., FIG. 64), or a meaningful word replacement algorithm. Table 11 below shows the resulting dump information that is actually used by the debugger for the production debugging session.

TABLE 11

Production Debugging Developer Session Values

| | |
|---|---|
| Age | 54 |
| FirstName | David |
| LastName | Cohen |
| Gender | Male |
| NationalInsuranceNumber | AB657320B |

Figure 72:
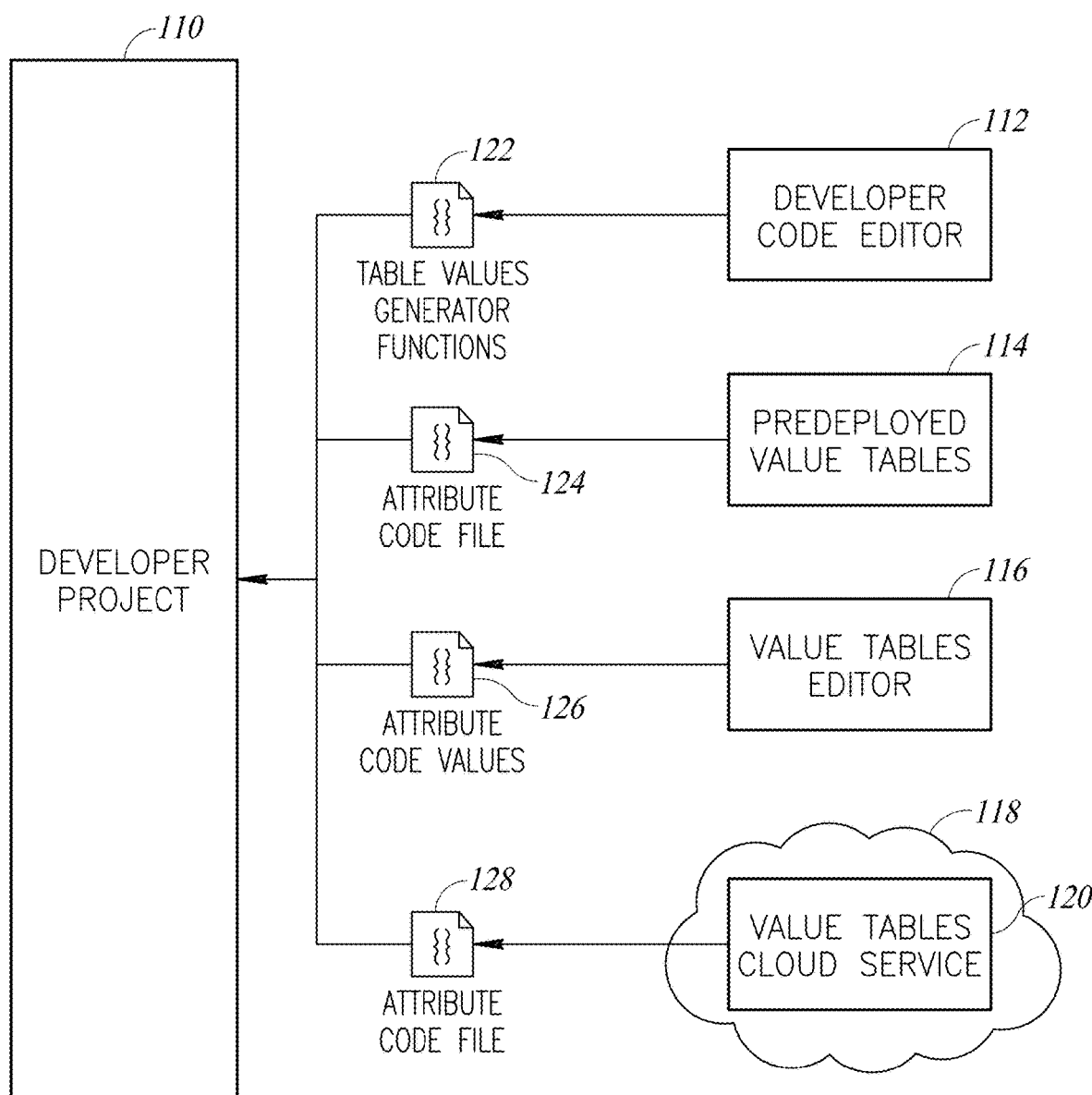
FIG. 72 is a diagram illustrating several examples of obtaining replacement values for the production debug session.

A diagram illustrating several examples of obtaining replacement values for the production debug session is shown in FIG. 72. It is noted that for a particular developer project 110, a developer may create a custom generator function 112 using a developer code editor or IDE. A library file of table attributes and values 122 is output from the custom generator function. In addition, a known value tables 114 (e.g., FIG. 62) may be included with and populated by the debugger itself or can be uploaded to the cloud debugger environment as a library file of table attributes and values 124. Alternatively, a values tables editor UI 116 can be provided that enables users to create their own tables as well as add new values for existing tables, to generate a library file of table attribute code values 126. For any new table, the editor emits code that creates a library. This library provides the table attribute and data that is used by the developer and by the cloud debugger as explained above. Further, a value tables cloud service 120 in the cloud 118 having a set of well-known table types and values can be provided. The service also provides the library 128 and the table attributes to be referenced by the target project. Note that any or all of these sources of replacement values sources may be used with the debugger of the present invention.

Requesting Explicit Authorization to Use Sensitive Information

Occasionally in the course of debugging in a production environment, a problem arises when reported bug correlates with specific personally identifiable customer information. In order to obtain relevant information to aid in fixing the bug, a dump is typically required that is based on a certain condition that is dependent upon the personally identifiable information. For example, assume one user out of thousands complains they did not receive the product they ordered. Without referring to specific personally identifiable information, such as the user's email address, etc., it is virtually impossible to take the correct dump and to examine the specific case. In other words, to fix the bug, the developer requires access to the customer's personally identifiable information which would run afoul of privacy regulations.

To overcome this problem, the cloud debugger of the present invention provides a service that permits the developer to request and obtain a customer's consent for accessing their sensitive data. When the developer issues such a request, the customer receives a message via email or any other suitable communications channel. When the customer gives the authorization to view the sensitive information, the cloud debugger modifies the value replacement algorithm for this specific customer. All other customers' sensitive information is not affected. This enables a scenario where the developer is able to perform a debugging session on that particular customer's case while preserving the privacy of all other users.

In order to indicate to the debugger the group of related customer information that can only be revealed based on the user consent, the developer annotates or configures the sensitive fields with a customer correlation key. The developer also provides a text describing the meaning of this information.

A diagram illustrating a third example of source code annotated with debugging information is shown in FIG. 73. In this example, the source code for the Person class is annotated with hints for requesting customer consent to access their sensitive information, e.g., "ConsentCorroborationId" and "ConsentDescription".

Figure 75:
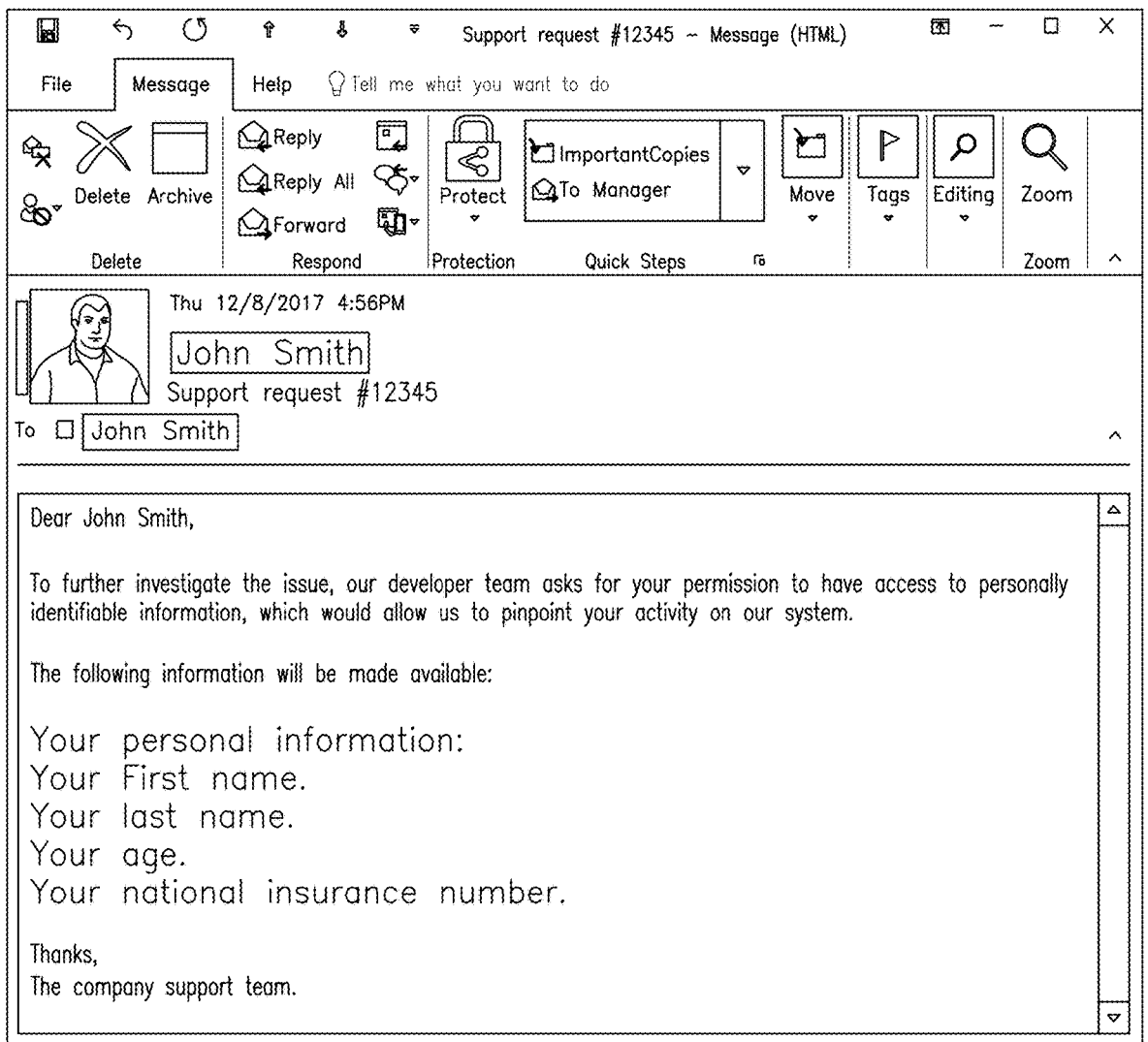
FIG. 75 is a diagram illustrating an example email to a customer requesting consent to access sensitive personal information.

To request customer consent, the developer uses a form such as shown in FIG. 74. The Customer Consent Request Form, generally referenced 130, comprises several fields including email address 132, customer name 134, support request number 136, correlation ID 138, and sender name 140. A diagram illustrating an example email to a customer requesting consent to access sensitive personal information is shown in FIG. 75. The form presents the groups of field information that the developer can ask for. When the developer submits the form, an algorithm runs through the code and searches for those fields. The algorithm generates a message (e.g., email) as shown in FIG. 75.

Figure 76:
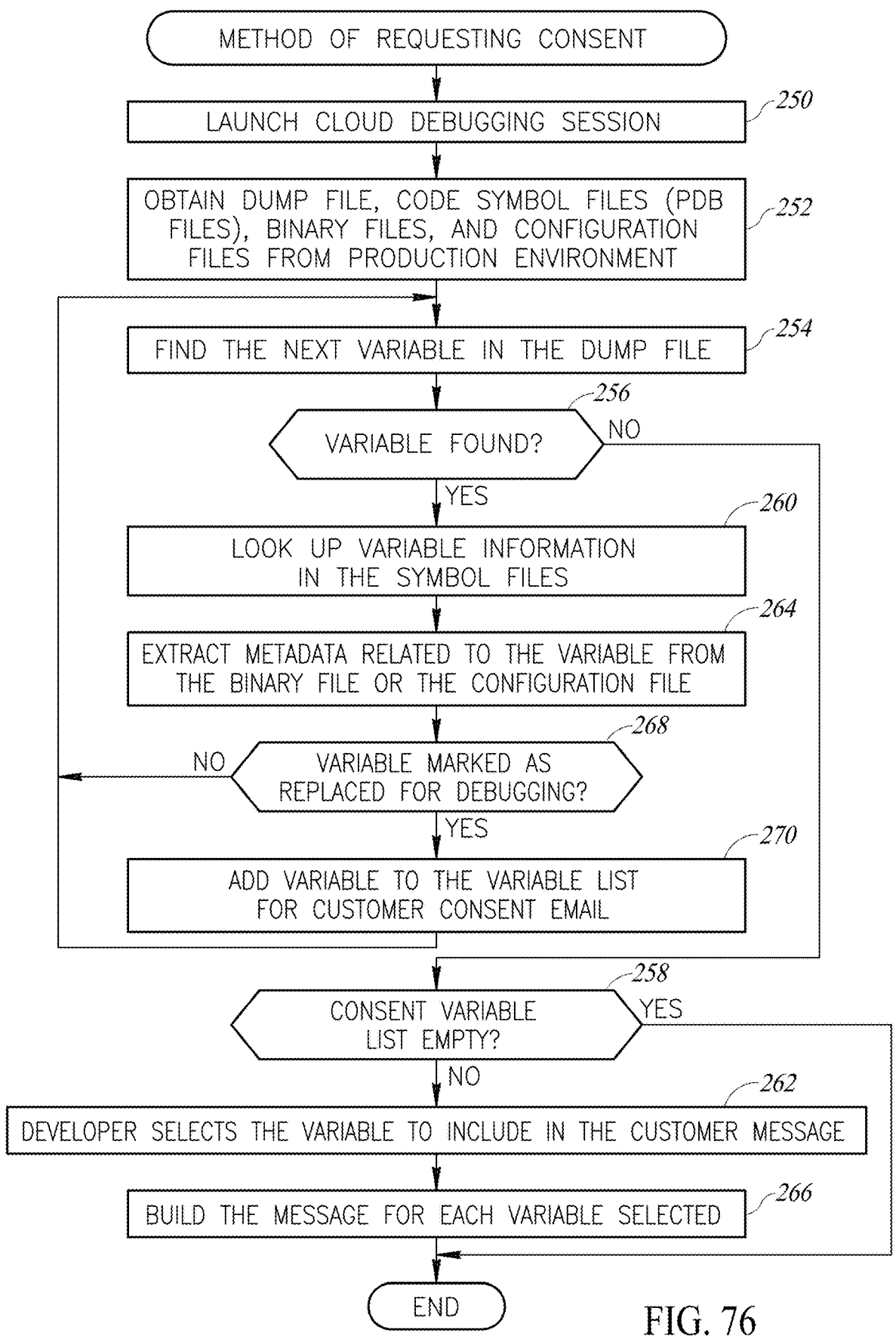
FIG. 76 is a flow diagram illustrating a method of requesting consent to access sensitive personal information from a customer in a production code debugging session.

A flow diagram illustrating a method of requesting consent to access sensitive personal information from a customer in a production code debugging session is shown in FIG. 76. With reference also to FIG. 4, after launching the cloud debugging session (step 250), the debugger 74 obtains the dump file 88 from cloud storage and reads it into its memory. The debugger also obtains one or more code symbol files (e.g., PDB files) 85, binary files 87, log files 90, and configuration files 89 from the production environment 70 (step 252). The debugger than searches through the dump file looking for sensitive variables. The next variable in the dump file is found (step 254). If a variable was found (step 256), the method looks up information related to the variable in the symbol files (step 260). The method then extracts metadata related to the variable from the binary file or the configuration file (step 264).

If the variable is not marked 'replace for debugging' (i.e. sensitive private information) (step 268) the method returns to step 254 and the next variable in the dump file is found. Otherwise, the variable is added to the variable list for customer consent email (step 270) and the method returns to step 254 and finds the next variable in the dump file.

If no further variables are found (step 256), than it is checked whether the consent variable list is empty (step 258). If it is, the method ends. Otherwise, the method enables the developer to select from the list of variables those that are to be included in the message to the customer (step 262). For each selected variable, the variable name and the consent text are used to build the message to the customer (step 270).

Example pseudocode to find sensitive information correlation IDs is shown below in Listing 2.

---
Listing 2: pseudocode to find sensitive information correlation IDs

1. Scan source file
2. For each type having a sensitive information annotation with a correlation id:
    a. Add the correlation id to an in-memory collection
    b. For each field and property that has a sensitive information annotation with a consent description
        Add the description to the table slot under the correlation id
---

This can be used to generate the consent message, and the form tool populates the correlation id using the method described supra and presents the form to the developer. Once the developer presses the submit button, the fact consent has been ascertained for these fields and this particular user is saved. The message generation code takes the information from the form fields and adds the comments that are related to the chosen correlation id from the in-memory collection. Once consent is received from the customer, the debugger can expose the relevant private information associated with the customer that consent was given for. All other private information, e.g., for other customers, remains obscured or hidden. Based on the consent information stored in the database, the cloud debugger is able to expose information accordingly.

Those skilled in the art will recognize that the boundaries between logic and task blocks are merely illustrative and that alternative embodiments may merge logic or task blocks or impose an alternate decomposition of functionality upon various logic or task blocks. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method, implemented on a computer that includes one or more processors, of asynchronous collaborative debugging of a debuggee application having source code associated therewith, the method comprising:

capturing, on a first computer, both a dump file and a current debugging session state, said dump file and said current debugging session state sent to at least one of a cloud debugger, and an on-premise production debugger;

generating and transmitting, on said first computer, a collaboration request message to one or more participants of a debugging session which includes a debug session link to said captured dump file and said current debugging session state;

generating and sharing, on said first computer, one or more point in time links with participants in the debugging session, each point in time link indicating a specific location in the source code and execution context including a specific point in time in the execution of the source code;

in response to the collaboration request message and utilizing said debug session link, obtaining, on a second computer, the current debugging session state captured previously on said first computer and utilizing it immediately for debugging while contemporaneously obtaining the dump file captured previously on said first computer;

obtaining on said second computer a memory delta buffer, ceasing using the captured current debugging session state, and utilizing the captured dump file and memory delta buffer for the debugging session; and reconstructing one or more variables, on said second computer, by traversing backwards through said memory delta buffer from a memory delta buffer index indicated by said point in time link whereby variables found in said memory delta buffer are set equal to values stored therein.

2. The method according to claim 1, further comprising obtaining source code from at least one of a source control system and code decompilation process.

3. The method according to claim 1, wherein capturing the dump file comprises utilizing a difference algorithm to generate and upload only changed sections of the dump file and reconstruct the dump file upon receipt thereof.

4. The method according to claim 1, wherein the dump file is captured using at least one of an operating system process based dump mechanism, and a lightweight process dump mechanism.

5. The method according to claim 1, wherein capturing the current debugging session state comprises creating a data structure holding at least one of an immediate state of the debugging session, current threads, current processes, current stack location, current variable values, current memory delta buffer, and current CPU registers.

6. The method according to claim 1, further comprising providing an asynchronous chat service for all participants of the debugging session.

7. The method according to claim 1, wherein obtaining the captured current debugging session state comprises at least one of downloading it to an integrated development environment (IDE), and utilizing it once uploaded to a cloud debugger.

8. The method according to claim 1, wherein one or more of said participants participate in the debugging session via at least one of a web browser, application, and an integrated development environment (IDE).

9. The method according to claim 1, further comprising:
redacting private information in said memory delta buffers to generate redacted memory delta buffers therefrom; and
redacting private information in said dump file to generate a redacted dump file therefrom.

10. The method according to claim 1, wherein said memory delta buffer is obtained by at least one of accessing a copy stored on a cloud debugger, and rebuilding said memory delta buffer from simulation in a virtual environment on said second computer.

11. The method according to claim 1, wherein said reconstructing one or more variables comprises searching in said captured dump file for those variables not found in said memory delta buffer.

12. A method, implemented on a computer that includes one or more processors, of asynchronous collaborative debugging of a debuggee application having source code associated therewith, the method comprising:

generating and transmitting, on a first computer, a share request to one or more participants of a debugging session;

generating and sharing, on said first computer, one or more point in time links with participants in the debugging session, each point in time link indicating a specific location in the source code and execution context including a specific point in time in the execution of the source code;

upon acceptance of said share request at a second computer, downloading current debugging session state previously captured by said first computer and utilizing it immediately for debugging while contemporaneously downloading a dump file captured by said first computer;

rebuilding, on said second computer, a memory delta buffer from the captured dump file once obtained, ceasing using the captured current debugging session state, and utilizing the captured dump file and rebuilt memory delta buffer for the debugging session; and reconstructing one or more variables, on said second computer, by traversing backwards through said memory delta buffer from a memory delta buffer index indicated by said point in time link whereby variables found in said memory delta buffer are set equal to values stored therein.

13. The method according to claim 12, wherein capturing the dump file comprises utilizing a difference algorithm to generate and upload only changed sections of the dump file and reconstruct the dump file upon receipt thereof.

14. The method according to claim 12, wherein the dump file is captured using at least one of an operating system process based dump mechanism, and a lightweight process dump mechanism.

15. The method according to claim 12, wherein capturing the current debugging session state comprises creating a data structure holding at least one of an immediate state of the debugging session, current threads, current processes, current stack location, current variable values, current memory delta buffer, and current CPU registers.

16. The method according to claim 12, further comprising:
redacting private information in said memory delta buffers to generate redacted memory delta buffers therefrom; and
redacting private information in the dump file to generate a redacted dump file therefrom.

17. The method according to claim 12, wherein said reconstructing one or more variables comprises searching in said captured dump file for those variables not found in said memory delta buffer.

18. A method, implemented on a computer that includes one or more processors, of asynchronous collaborative debugging of a debuggee application having source code associated therewith, the method comprising:
- capturing and uploading to a cloud debugger, on a first computer, a current debugging session state including a memory delta buffer, process dump file, and source code if not already present thereon;
- generating, on said first computer, a share request to one or more participants of a debugging session;
- upon accepting the share request on a second computer, opening an additional view for the added participant in a cloud debugger;
- downloading said current debugging session state including said memory delta buffer, said process dump file, and said source code previously stored on the cloud debugger, if not already present on said second computer, in the additional view opened on said second computer;
- providing, by said debugging session, an asynchronous chat service for all participants of the debugging session, whereby participants are able to transmit text messages between each other to facilitate said debugging session; and
- reconstructing, on said second computer, one or more variables by traversing backwards through said memory delta buffer whereby variables found in said memory delta buffer are set equal to values stored therein.

19. The method according to claim 18, wherein said reconstructing one or more variables comprises searching in said captured dump file for those variables not found in said memory delta buffer.

20. A computer program product for asynchronous collaborative debugging of a debuggee application having source code associated therewith, the computer program product disposed upon a computer readable storage medium, the computer program product comprising computer program instructions that, when executed by a computer program computer, cause the computer to carry out the steps of:
- capturing both a dump file and a current debugging session state on a first computer, said dump file and said current debugging session state sent to at least one of a cloud debugger, and an on-premise production debugger;
- generating and transmitting, on said first computer, a collaboration request message to one or more participants of a debugging session which includes a debug session link to said captured dump file and said current debugging session state;
- generating and sharing one or more point in time links with participants in the debugging session, each point in time link indicating a specific location in the source code and execution context including a specific point in time in the execution of the source code;
- in response to the collaboration request message and utilizing said debug session link, obtaining, on a second computer, the current debugging session state captured previously on said first computer and utilizing it immediately for debugging while contemporaneously obtaining the dump file captured previously on said first computer;
- obtaining on said second computer a memory delta buffer ceasing using the captured current debugging session state, and utilizing the captured dump file and memory delta buffer for the debugging session; and
- reconstructing one or more variables, on said second computer, by traversing backwards through said memory delta buffer from a memory delta buffer index indicated by said point in time link whereby variables found in said memory delta buffer are set equal to values stored therein.

\* \* \* \* \*